United States Patent
Dispensa et al.

(10) Patent No.: US 7,904,542 B1
(45) Date of Patent: Mar. 8, 2011

(54) PROBE DEVICE FOR TESTING BROADBAND WIRELESS SYSTEM

(75) Inventors: Steve Dispensa, Shawnee Mission, KS (US); Jason M. Sloderbeck, Kansas City, MO (US); James Landon, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2366 days.

(21) Appl. No.: 09/981,977

(22) Filed: Oct. 17, 2001

Related U.S. Application Data

(60) Provisional application No. 60/241,048, filed on Oct. 17, 2000.

(51) Int. Cl.
G06F 15/173 (2006.01)
(52) U.S. Cl. .......................... 709/224; 709/238; 455/428
(58) Field of Classification Search .................. 709/235, 709/230, 232, 224, 246, 203, 238, 223; 702/188; 455/428
See application file for complete search history.

(56) References Cited

U.S. PATENT DOCUMENTS

| | | | | |
|---|---|---|---|---|
| 5,062,055 | A * | 10/1991 | Chinnaswamy et al. | 702/182 |
| 5,347,304 | A | 9/1994 | Moura et al. | |
| 5,586,121 | A | 12/1996 | Moura et al. | |
| RE35,774 | E | 4/1998 | Moura et al. | |
| 5,818,845 | A | 10/1998 | Moura et al. | |
| 5,828,655 | A | 10/1998 | Moura et al. | |
| 5,859,852 | A | 1/1999 | Moura et al. | |
| 5,946,322 | A | 8/1999 | Moura et al. | |
| 5,956,346 | A | 9/1999 | Levan | |
| 5,959,660 | A | 9/1999 | Levan | |
| 5,959,997 | A | 9/1999 | Moura et al. | |
| 6,005,850 | A | 12/1999 | Moura et al. | |
| 6,016,316 | A | 1/2000 | Moura et al. | |
| 6,061,722 | A * | 5/2000 | Lipa et al. | 709/224 |
| 6,076,113 | A * | 6/2000 | Ramanathan et al. | 709/235 |
| 6,104,727 | A | 8/2000 | Moura et al. | |
| 6,130,892 | A * | 10/2000 | Short et al. | 370/401 |
| 6,247,050 | B1 * | 6/2001 | Tso et al. | 709/224 |
| 6,522,629 | B1 * | 2/2003 | Anderson, Sr. | 370/236 |
| 6,553,568 | B1 * | 4/2003 | Fijolek et al. | 725/111 |
| 6,671,265 | B1 * | 12/2003 | Hwang et al. | 370/331 |
| 6,798,742 | B1 * | 9/2004 | Mawhinney et al. | 370/230 |
| 6,807,515 | B2 * | 10/2004 | Vogel et al. | 702/188 |
| 6,829,642 | B1 * | 12/2004 | Giroir et al. | 709/225 |
| 7,088,727 | B1 * | 8/2006 | Short et al. | 370/401 |
| 7,689,716 | B2 * | 3/2010 | Short et al. | 709/246 |
| 2003/0051170 | A1 * | 3/2003 | Spearman | 713/201 |
| 2010/0115113 | A1 * | 5/2010 | Short et al. | 709/228 |

OTHER PUBLICATIONS

Dawson, Fred, "Broadband Wireless for Biz: Rumblings," Infrastructure Moves Suggest Rollouts Nearing, Adaptive Broadband Corp. Network Solutions pp. 52-66 Oct. 2000.

* cited by examiner

Primary Examiner — Asad M Nawaz
Assistant Examiner — Sargon N Nano

(57) ABSTRACT

A probe device tests a broadband wireless system. The probe device receives an instruction to execute a plurality of tests. The probe device then executes the plurality of tests to measure performance of the broadband wireless communication system based on the instruction. The probe device determines performance information from the plurality of tests. The probe device stores the performance information in a memory of the probe device.

54 Claims, 49 Drawing Sheets

WELCOME TO VERTEX! To navigate this site, links are located in the gray box below the thick red line. Inside the thick red line you will find a selection of categories to choose from. Click on one of these categories to display it's related links, then click on the link you want and you are there. One special note. The 'Markets' links will take you to the same report you are currently at, in the market you choose.

*Questions?*: Click on the button named 'HELP' in the upper right-hand corner.

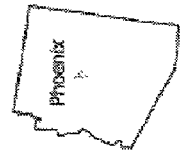

Visibility into the network is a primary concern of the Vertex team. It is the job of the network management architecture to enable this visibility. Without it, the network cannot be effectively run: faults cannot be located and corrected, capacity planning cannot be done, and progressive problems cannot be found and stopped from reaching a critical stage until it is too late.

The architecture is divided up into three parts: collectors (also known as 'probes'), data warehouses, and reporting tools. Collectors include devices such as the NetScout RMON probe and two in-house engineered probes, the Hybrid Probe and the Sector Probe. Data warehouses consist of Oracle databases residing on Market and National Vertex Servers. These databases run on Sun Microsystems UNIX workstations that have RAID mass storage systems built in. The reporting tools are primarily the web-based tools hosted by the Market VERTEX Servers.

FIG. 32

User/Channel Distribution by Sector

Load and Capacity for All Sectors.

Enter Query Date in YYYYMMDD format: 20011204 | Submit

Sector sb-035
Click on the summary for detailed graphs.

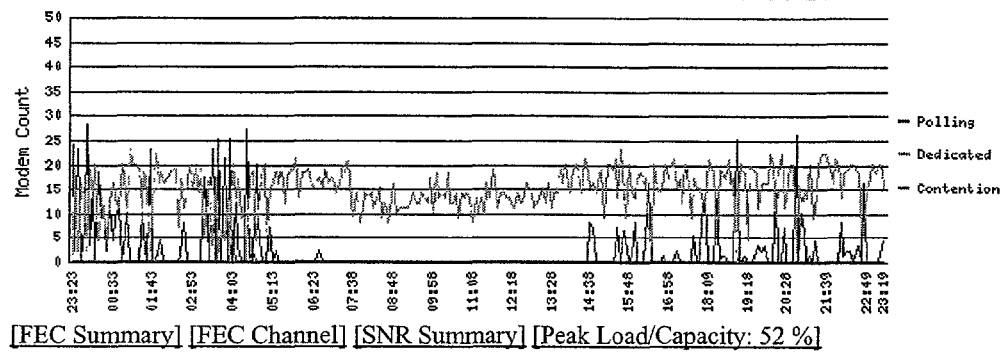

[FEC Summary] [FEC Channel] [SNR Summary] [Peak Load/Capacity: 52 %]

Sector sb-083
Click on the summary for detailed graphs.

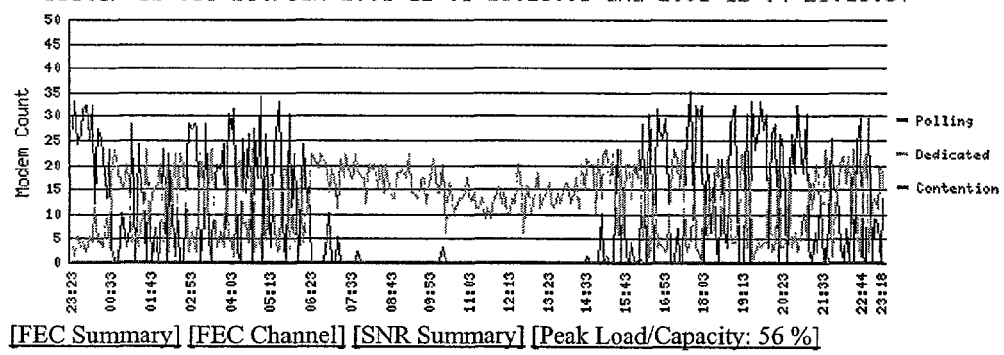

[FEC Summary] [FEC Channel] [SNR Summary] [Peak Load/Capacity: 56 %]

Sector sb203-32
Click on the summary for detailed graphs.

FIG. 33

Channel detail graph for sb203-32 channel 2
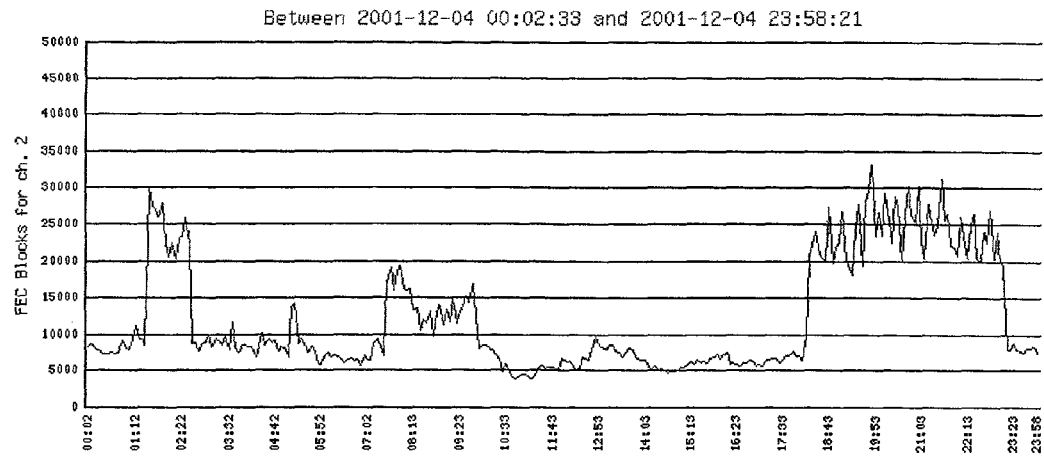
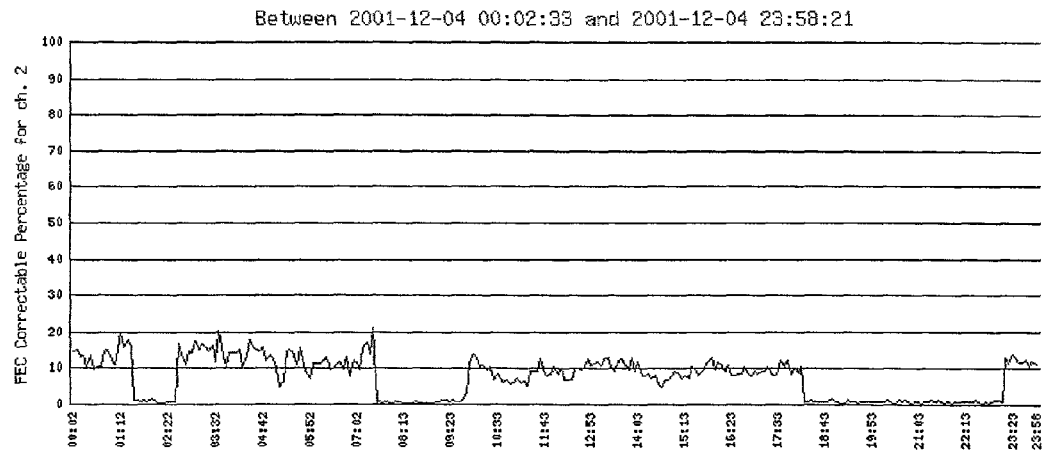
FIG. 35

Load and Capacity

Load: If the number of dedicated channels exceeds 50% of the total number of channels, Load = (poll + ded + con) * 1.1 else Load = [(ded * 8)+(poll)] * [1 + Con/(poll+ded)]. ded: Number of dedicated modems, poll: Number of polling modems, and con: Number of contention modems.
Capacity: (Number of channels - 1) * 8.

| | |
|---|---|
| \multicolumn{2}{c}{HSMP Gateway} ||
| Access Level | BWG Engineer |
| IP Address <br> e.g, 24.221.13.83 | *Note:* Enter a customer/WBR IP address -OR- a UUID |
| UUID <br> e.g, 149219 | *Note:* Enter the WBR's MAC address, per Merlin |
| Query Type | ⦿ Standard queries: <br><br> hybs <br> qpsk tstat <br> qpsk stat <br> qpsk gdump <br> qams <br> hostname <br> hybs so0 <br> hybs so1 <br><br> (Hold down the 'CTRL' key to select multiple queries) <br><br> ○ Custom query: _____ <br><br> *Note:* Only administrators can perform custom queries and only supervisors/leads can send *ginit*, *rngpwr*, and *exit* commands. |
| \multicolumn{2}{c}{Submit Request(s)} ||
| \multicolumn{2}{l}{*Warning:* This could take up to 30 seconds per query; please be patient} ||

FIG. 38

Hybrid Probe - Phoenix

Start date: 12-11-00   Start time: 00:00:00

End date: 12-11-00   End time: 21:34:07

Number of entries: 10

CSV Format ☐

Get Results

Start time: *12-11-00 00:00:00 GMT*
End time: *12-11-00 21:34:07 GMT*
Currently: *12-11-00 21:34:25 GMT*

| IP Address | Active - % | Ratio | Poll - Timer | Ded - Timer | Poll - Tx bytes | Ratio | Ded - Tx bytes | Ratio | Index | Ratio |
|---|---|---|---|---|---|---|---|---|---|---|
| Total (all) | N/A | N/A | 0:0:0:0:0 | 0:0:0:0:0 | N/A | N/A | N/A | N/A | | N/A |
| Average (all) | N/A | N/A | 0:0:0:0:1 | 0:0:0:0:1 | N/A | N/A | N/A | N/A | 1 | N/A |

FIG. 39

Top Talkers

Total Users = 476

Total number of upstream bytes for all users = 37959.79 MB
Total number of downstream bytes for all users = 78291.14 MB Average number of upstream bytes per user = 79.75 MB
Average number of downstream bytes per user = 164.48 MB Date Range Searched: From 2001-12-04 00:00:00 to 2001-12-04 23:59:59

| CMID | Up MB | % of Total | Information | | CMID | Down MB | % of Total | Information | |
|---|---|---|---|---|---|---|---|---|---|
| 10113995201 | 1396.48 | 3.68 | Info | Detail | 10033145001 | 4495.26 | 5.74 | Info | Detail |
| 10300017795 | 1252.04 | 3.30 | Info | Detail | 10113995201 | 3860.84 | 4.93 | Info | Detail |
| 10045700301 | 1185.84 | 3.12 | Info | Detail | 10300015592 | 2941.91 | 3.76 | Info | Detail |
| 10043134301 | 1074.78 | 2.83 | Info | Detail | 10046161801 | 2854.52 | 3.65 | Info | Detail |
| 10300024189 | 952.64 | 2.51 | Info | Detail | 10300036933 | 2353.44 | 3.01 | Info | Detail |
| 10045370901 | 945.70 | 2.49 | Info | Detail | 10300026883 | 1907.78 | 2.44 | Info | Detail |
| 10060649801 | 876.35 | 2.31 | Info | Detail | 10300049340 | 1602.27 | 2.05 | Info | Detail |
| 10300049099 | 861.39 | 2.27 | Info | Detail | 10043134301 | 1551.04 | 1.98 | Info | Detail |
| 10048528301 | 849.71 | 2.24 | Info | Detail | 10026884901 | 1520.79 | 1.94 | Info | Detail |
| 10300042276 | 835.36 | 2.20 | Info | Detail | 10063273601 | 1520.67 | 1.94 | Info | Detail |
| 10041614401 | 779.71 | 2.05 | Info | Detail | 10113986301 | 1489.38 | 1.90 | Info | Detail |
| 10080408901 | 746.92 | 1.97 | Info | Detail | 10300033843 | 1435.02 | 1.83 | Info | Detail |
| 10300014579 | 727.49 | 1.92 | Info | Detail | 10045370901 | 1430.11 | 1.83 | Info | Detail |
| 10300039579 | 702.54 | 1.85 | Info | Detail | 10063207801 | 1381.60 | 1.76 | Info | Detail |
| 10044769601 | 660.30 | 1.74 | Info | Detail | 10300042788 | 1323.12 | 1.69 | Info | Detail |
| 10063484801 | 654.68 | 1.72 | Info | Detail | 10045140201 | 1258.60 | 1.61 | Info | Detail |
| 10300067076 | 635.97 | 1.68 | Info | Detail | 10044181901 | 1210.90 | 1.55 | Info | Detail |
| 10043370701 | 621.19 | 1.64 | Info | Detail | 10113953301 | 1197.58 | 1.53 | Info | Detail |
| 10300080498 | 604.89 | 1.59 | Info | Detail | 10047055801 | 1122.13 | 1.43 | Info | Detail |
| 10300013790 | 569.02 | 1.50 | Info | Detail | 10040944301 | 1094.73 | 1.40 | Info | Detail |

FIG. 40

Detail Informaiton for CMID 10000002309

Breakdown By Protocol

| Protocol | Upstream Bytes | % of Total | Downstream Bytes | % of Total |
|---|---|---|---|---|
| HTTPS | 437990 | 0 | 3649130 | 0 |
| IP | 1077630687 | 99 | 1089385948 | 99 |
| Totals | 1078068677 | | 1093035078 | |

Breakdown By IP Address

| IP Address | Upstream Bytes | % of Total | Downstream Bytes | % of Total |
|---|---|---|---|---|
| 24.221.206.66 | 1077630687 | 99 | 1089385948 | 99 |
| 24.221.206.71 | 437990 | 0 | 3649130 | 0 |
| Totals | 1078068677 | | 1093035078 | |

Breakdown of Protocols for IP Address 24.221.206.66

| Protocol | Upstream Bytes | % of Total | Downstream Bytes | % of Total |
|---|---|---|---|---|
| IP | 1077630687 | 100 | 1089385948 | 100 |
| Totals | 1077630687 | | 1089385948 | |

FIG. 41

Statistics for Market ID 00000010, Market name = Phoenix (new)    Bad cmid's encountered = 0

| Market ID | Date | HR | # of Subscribers | Mb Per Hour | Avg Per Subscriber | Avg MBPS | Peak # of MBPS |
|---|---|---|---|---|---|---|---|
| 00000010 | 2000-12-12 | 00 | 000003 | 000000054.53 | 001817.00 | 000000.01 | 000000026.01 |
| 00000010 | 2000-12-12 | 01 | 000003 | 000000158.73 | 005291.00 | 000000.04 | 000000118.64 |
| 00000010 | 2000-12-12 | 02 | 000002 | 000000187.85 | 009392.00 | 000000.05 | 000000102.37 |
| 00000010 | 2000-12-12 | 08 | 000001 | 000000055.31 | 005531.00 | 000000.01 | 000000055.31 |
| 00000010 | 2000-12-12 | 10 | 000004 | 000000140.21 | 003505.00 | 000000.03 | 000000084.61 |
| 00000010 | 2000-12-12 | 11 | 000001 | 000000008.07 | 000807.00 | 000000.00 | 000000008.07 |
| 00000010 | 2000-12-12 | 12 | 000004 | 000000024.41 | 000610.00 | 000000.00 | 000000013.55 |
| 00000010 | 2000-12-12 | 13 | 000001 | 000000002.41 | 000241.00 | 000000.00 | 000000002.41 |
| 00000010 | 2000-12-12 | 15 | 000001 | 000000008.83 | 000883.00 | 000000.00 | 000000008.83 |
| 00000010 | 2000-12-12 | 17 | 000001 | 000000001.28 | 000128.00 | 000000.00 | 000000001.28 |
| 00000010 | 2000-12-12 | 19 | 000001 | 000000025.82 | 002582.00 | 000000.00 | 000000025.82 |
| 00000010 | 2000-12-12 | 20 | 000001 | 000000024.97 | 002497.00 | 000000.00 | 000000024.97 |
| 00000010 | 2000-12-12 | 21 | 000001 | 000000023.37 | 002337.00 | 000000.00 | 000000023.37 |

Statistics for udfg id 526, udfg name = south mtn 101-32/36

Total subscribers in SIF: 110

| Udfg ID | Date | HR | Active Subscribers | MegaBits Per Hour | Avg Per Subscriber Per Second | Peak # of MBPS |
|---|---|---|---|---|---|---|
| 526 | 2000-12-11 | 00 | 3 | 34.30 | 19.10 | 27.21 |
| 526 | 2000-12-11 | 01 | 5 | 541.81 | 180.181 | 388.12 |
| 526 | 2000-12-11 | 02 | 2 | 128.5 | 10.85 | 73.6 |
| 526 | 2000-12-11 | 03 | 5 | 761.39 | 253.239 | 731.53 |
| 526 | 2000-12-11 | 04 | 2 | 6.14 | 5.14 | 5.75 |
| 526 | 2000-12-11 | 05 | 5 | 442.1 | 14.221 | 403.91 |
| 526 | 2000-12-11 | 06 | 4 | 266.43 | 111.3 | 159.45 |
| 526 | 2000-12-11 | 07 | 2 | 2.99 | 2.59 | 1.94 |
| 526 | 2000-12-11 | 08 | 2 | 486.33 | 405.33 | 363.5 |
| 526 | 2000-12-11 | 09 | 4 | 312.11 | 130.11 | 221.18 |
| 526 | 2000-12-11 | 10 | 3 | 1111.96 | 617.136 | 797.57 |
| 526 | 2000-12-11 | 11 | 3 | 49.74 | 27.114 | 27.77 |
| 526 | 2000-12-11 | 12 | 4 | 50.63 | 21.23 | 41.30 |
| 526 | 2000-12-11 | 13 | 3 | 281.76 | 156.96 | 204.44 |
| 526 | 2000-12-11 | 14 | 6 | 598.4 | 16.224 | 319.80 |
| 526 | 2000-12-11 | 15 | 3 | 778.66 | 432.106 | 525.49 |
| 526 | 2000-12-11 | 16 | 3 | 12.77 | 7.17 | 11.60 |
| 526 | 2000-12-11 | 17 | 2 | 27.20 | 22.80 | 26.46 |
| 526 | 2000-12-11 | 18 | 5 | 14.80 | 4.280 | 6.12 |
| 526 | 2000-12-11 | 19 | 1 | 1.90 | 3.10 | 1.90 |
| 526 | 2000-12-11 | 20 | 5 | 44.86 | 14.286 | 35.99 |

FIG. 42

Detail for IP nnn nnn nnn nnn from to 2000-12-12 23:59:59

This is a protocol breakdown for traffic from this IP address. This includes all protocol types, including all TCP and UDP protocols. Two special protocols, TCP~ and UDP~, correspond to "unknown TCP protocol" and "unknown UDP protocol". This means that we don't really know what kind of traffic it is at this point.

| Protocol | Downstream KBytes | Upstream KBytes |
|---|---|---|

Totals:    Protocol Summary - 2000-12-12 00:00:00 to 2000-12-12 23:59:59

Up: Kbytes
Down: Kbytes

This is a list of the most popular protocols on our network for the chosen date range. Measurements are in Megabytes and the da range is inclusive. Again, TCP~ and UDP~ represent "other" TCP and UDP apps which have not yet been identified.

| Protocol Name | Megabytes Transferred |
|---|---|
| NNTP | 60997.67 |
| TCP~ | 20632.16 |
| NAPSTER | 10798.85 |
| FTP-DATA | 8756.72 |
| HTTP | 6938.55 |
| UDP~ | 3909.48 |
| HTTPS | 1215.48 |
| POP3 | 571.60 |
| AOL | 183.04 |
| FTP-CTRL | 12.31 |
| REALAUD | 10.20 |
| TELNET | 8.48 |
| SOCKET | 6.92 |
| SQLNET_N | 4.31 |
| SUNRPC_T | 0.10 |
| COMPUSRV | 0.04 |

FIG. 43

Router Traffic Analysis
Daily Graph (5 Minute Average)

FastEthernet5/0/0

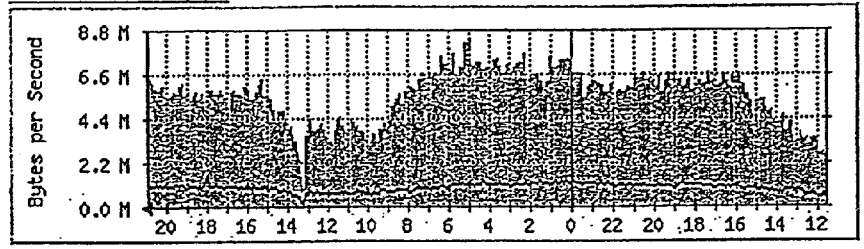

Traffic Analysis for FastEthernet5/0/0 edge01.phoenix.speedchoice.com

System: edge01.phoenix.speedchoice.com in
Maintainer:
Description: FastEthernet5/0/0
ifType: ethernetCsmacd (6)
ifName: Fa5/0/0
Max Speed: 12.5 MBytes/s
Ip: 207.240.93.202 (edge01)

The statistics were last updated Friday, 15 December 2000 at 21:00,
at which time 'edge01.phoenix.speedchoice.com' had been up for 84 days, 10:51:32.

'Daily' Graph (5 Minute Average)

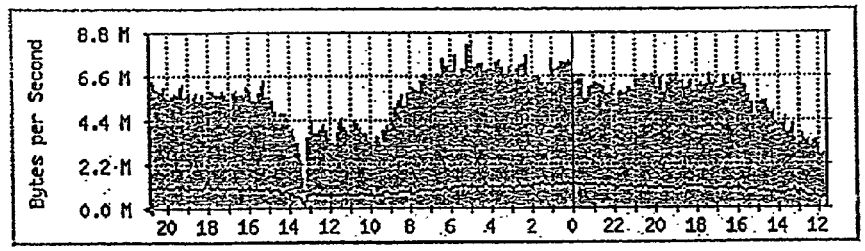

Max In:8409.8 kB/s (67.3%)  Average In:5645.1 kB/s (45.2%)  Current In:6166.0 kB/s (49.3%)
Max Out:1446.9 kB/s (11.6%) Average Out: 944.8 kB/s (7.6%)  Current Out: 1017.5 kB/s (8.1%)

FIG. 44

Peak Time: 2000-12-28 12:25:00 CST

| Peak Active Modems | Sampled Modems | Activity Ratio |
|---|---|---|
| 905 | 7115 | 12.72% |

| | Modem Counts | |
|---|---|---|
| Contention | Polling | Dedicated |
| 0 | 847 | 58 |

Off Peak Time: 2000-12-28 06:00:00 CST

| Off Peak Active Modems | Sampled Modems | Activity Ratio |
|---|---|---|
| 152 | 7115 | 2.14% |

| | Modem Counts | |
|---|---|---|
| Contention | Polling | Dedicated |
| 0 | 98 | 54 |

Individual Peak Modem Counts

| Contention | Polling | Dedicated |
|---|---|---|
| 2000-12-28 12:55:00 CST | 2000-12-28 12:25:00 CST | 2000-12-28 05:45:00 CST |
| 10 | 847 | 88 |

Avg. Time Spent Per User

| In Contention | In Polling | In Dedicated |
|---|---|---|
| 0.03 secs | 0.71 secs | 1.48 secs |

| FTP Rates At Off Peak 2000-12-28 06:00:00 CST | | FTP Rates At Peak 2000-12-28 12:25:00 CST | |
|---|---|---|---|
| Downstream | Upstream | Downstream | Upstream |
| 3.54 Mbps | 85.83 Kbps | 2.21 Mbps | 32.02 Kbps |

FIG. 47a

Peak FTP Rate Downstream
2000-12-28 07:20:00
6.03 Mbps

Peak FTP Rate Upstream
2000-12-28 07:20:00
217.87 Kbps

2000-12-28 00:00:00 CST thru 2000-12-28 23:59:59 CST

Average FTP Rate
Midnight-6pm
(off peak)

Average FTP Rate
6pm-Midnight
(peak)

| Downstream | Upstream | Downstream | Upstream |
|---|---|---|---|
| 2.69 Mbps | 51.31 Kbps | 2.01 Mbps | 38.27 Kbps |

2000-12-28 00:00:00 CST thru 2000-12-28 23:59:59 CST

Average HTTP Rate
Midnight-6pm
(off peak)
470.34 Kbps

Average HTTP Rate
6pm-Midnight
(peak)
384.46 Kbps

FEC
Corrections
32.55 : 1000

FEC
Uncorrectables
1.53 %

Available
Channels
230

| Max Functioning Channels | Min Functioning Channels | Avg Functioning Channels |
|---|---|---|
| 230 | 68 | 226.44 |

| Max Non-Functioning Channels | Min Non-Functioning Channels | Avg Non-Functioning Channels |
|---|---|---|
| 162 | 0 | 3.56 |

Signal to Noise
Ratio 24.93 : 1

Requested to Scheduled
Modem Calibration Ratio 0.65 : 1

Downstream to Upstream
Bitrate Ratio
(All MEASUREMENTS ARE PER USER)

| | 02:00:00 - 02:15:00 CST | 10:00:00 - 10:15:00 CST | 14:00:00 - 14:15:00 CST | 22:00:00 - 22:15:00 CST |
|---|---|---|---|---|
| 12-28 | 4.01 : 1 | 4.46 : 1 | 10.68 : 1 | 4.56 : 1 |

FIG. 47b

PROBE DEVICE FOR TESTING BROADBAND WIRELESS SYSTEM

RELATED APPLICATIONS

This application claims the benefit of provisional application 60/241,048, filed Oct. 17, 2000, which hereby is incorporated by reference into this application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to a system that provides wireless broadband services.

2. Description of the Prior Art

People and businesses are demanding higher bandwidths from their communication providers. Consequently, the communication providers are looking for ways to increase the bandwidth of their systems using broadband technologies. Broadband technologies are generally referred to as systems that deliver a bandwidth above 64 kbps. Broadband technologies can communicate over downstream channels and upstream channels. The customer receives data from another device or system over the downstream channels. The customer transmits data to another device or system over the upstream channels.

Broadband Wireline Systems

One example of a broadband technology is Digital Subscriber Line (DSL) service. DSL service carries both voice signals and data signals at the same time in both directions. DSL service also carries call information and customer data. DSL service is typically comprised of twisted-pair wires that connect a customer to a central office. The central office comprises a Digital Subscriber Line Access Multiplexer (DSLAM) that provides the DSL service to the customer. Unfortunately, the speed of DSL service is limited by the distance between the customer and the DSLAM. Customers located too far from the DSLAM may not be able to receive high-speed service. Also, there may not be enough customers within a particular area to make it economical to install a DSLAM. The quality of DSL service is also limited by the quality of the copper wire that connects the customer to the DSLAM. Furthermore, DSL service does not work over Digital Loop Carrier (DLC) lines.

Another broadband technology is cable modem service. The cable modem communicates with a device or system over a coaxial cable. The coaxial cable is typically the same coaxial cable used to receive cable television. The cable modem service can be one-way or two-way. In a two-way system, the coaxial cable carries both the upstream channels and the downstream channels. In a one-way system, the cable modem receives data on the downstream channels over the coaxial cable and transmits data on the upstream channels over a phone line. Unfortunately, the cable modem uses up valuable bandwidth on the phone line in the one-way system. Also, the upstream bandwidth is small over a phone line.

Broadband Wireless Systems

Another broadband technology is wireless broadband service. Customers that subscribe to wireless broadband service communicate with a head end. In a one-way wireless system, a transmitter antenna for the head end broadcasts wireless signals to the customer on the downstream channels. The transmitter antenna is a satellite antenna or a land-based antenna. The customer transmits data to the head end over another medium, such as a phone line or a cable modem, on the upstream channels. One example of a one-way wireless system is a Digital Satellite System (DSS) from DIRECTV.

A specific type of wireless broadband system communicates over Multichannel Multipoint Distribution Service (MMDS) frequencies and Multipoint Distribution Service (MDS) frequencies. The MMDS frequencies range from 2596 MHz to 2644 MHz. The MDS frequencies range from 2150 MHz to 2162 MHz. In a typical MMDS system, the bandwidth of the upstream channels is about 6 MHz. The upstream bandwidth is divided into subchannels. Each subchannel has a bandwidth of 200 kHz.

A head end manages the upstream and downstream channels with the customer. The head end also interfaces the customer with communication systems such as the Internet. The head end includes a base antenna comprised of a transmitter antenna and one or more receiver antennas. MMDS requires a line of sight between devices that are communicating. Therefore, the antennas are placed on a high building or a mountain to establish lines of sight with the customers.

The transmitter antenna is omni-directional and broadcasts data from the head end to the customers on the downstream channels. In a two-way wireless system, the receiver antennas are positioned to receive MMDS signals transmitted from customers to the head end on the upstream channels. Each receiver antenna is positioned to receive MMDS signals from customers located within a certain area. The areas formed by the antennas are referred to as sectors. The sectors have designated frequency ranges or designated channels.

The head end is comprised of an upstream manager and a downstream manager that control transmissions on the upstream channels and the downstream channels, respectively. As stated above, the upstream channels and the downstream channels are divided into subchannels. One upstream subchannel is a contention channel reserved for signaling, while the remaining subchannels are bearer channels.

In the wireless broadband system, a wireless broadband router is located at a customer premises. The wireless broadband router communicates with the upstream manager and the downstream manager to exchange data. The upstream manager generally operates the channels and/or subchannels in four states: idle, contention, polling, and dedicated. In the idle state, the channels are idle. In the contention state, the upstream manager generates and transmits control signals over one or more subchannels.

For the polling and dedicated states, the upstream manager polls numerous wireless broadband routers to allocate use of the subchannels. Polling is a round robin process to determine which wireless broadband router has access to a subchannel. The upstream manager maintains a queue of the active wireless broadband routers to determine which wireless broadband router is next to transmit over a subchannel for a period of time. The upstream manager keeps an inventory of open subchannels and waiting wireless broadband routers in the queue.

The upstream manager uses a credit to grant a wireless broadband router use of a subchannel for a limited period of time. A credit is a message that allows usage of a subchannel for a period of time or for the transfer of a maximum number of transmission units, such as bytes. One example of a credit is information, such as a subchannel or frequency range, a maximum allowed time to transfer data, and a maximum number of bytes the wireless broadband router is allowed to transfer.

There are two kinds of credits: polling and dedicated. Polling credits are credits related to polling of the wireless broadband routers. Polling credits are generally smaller than the dedicated credits. Once the wireless broadband router completes transfer of the packets, the wireless broadband router transmits a DONE message to the upstream manager via the upstream channels. The DONE messages include information such as the number of bytes sent and the number of packets left for the wireless broadband router to transfer. If the DONE message shows that the wireless broadband router has more than three packets left to transfer and there are available subchannels, then the upstream manager issues a dedicated credit to the wireless broadband router.

Fault Management Systems and Performance Management Systems

Two important areas in communication network operation are fault management and performance management. A fault management system assists in identifying faults in the communication network through the use of alarms and monitoring devices. Once the fault management system identifies the faults, network personnel can then fix, replace, or add communication devices or software. Two examples of fault management systems are eHealth from Concord Communications and NerveCenter from Veritas Software Corp.

A performance management system evaluates the performance of a communication network. The performance management system provides a clearer view of the operation of the communication network. The performance management system determines how a communication network is performing at all levels, such as nationally, regionally, and down to a specific communication device. Therefore, to improve performance, bottlenecks and high traffic points may be identified to add equipment or perform tuning on a specific communication device. By evaluating the performance, the performance management system can also shape the traffic over the communication network.

One prior performance management system provides an Internet service assurance to e-commerce businesses for their websites. This prior system manages the delivered quality of e-mail, news, web, domain name service, Radius, file transfer protocol, and lightweight directory access protocol service of e-commerce businesses. The prior system also provides management of service level agreements. Unfortunately, this prior system is focused on enterprise management and has not been effectively adapted for service management of a communication network. Also, this prior system does not provide performance management for operating a broadband wireless system.

Remote monitoring (RMON) probes monitor performance information of a communication network. The RMON probes are in the same location as service provider equipment, which does not accurately measure from the customer's perspective. RMON probes use RMON standards to capture and define traffic information passing through a given point. The RMON standards are divided into nine groups for Internet and a tenth group for token ring. RMON 1 is geared towards collecting datalink layer (OSI layer 2) information. The information is organized based on MAC addresses and captures datalink information such as collisions, bad packets, and link utilization. The nine groups of RMON are statistics, history, events, alarms, hosts, matrix, topN, packet capture, and packet filter. The information is used for bandwidth allocation and for error detection.

RMON 2 is concerned more with application layer information. Statistics classify each passing frame as being unicast, broadcast or multicast. Totals are kept of the number of frames passed and the utilization of the link. Each frame is also categorized by size, from 64 bytes to 1518 bytes. In addition, bad frames are counted and summary totals are created. History takes a trend analysis of the statistics explained above and presents them in a graphical or spreadsheet form. This is usually captured in increments of 30 seconds worth of traffic or more. Hosts create a table of each MAC address sending data across the line and tabulates the number of frames, good and bad, unicast or broadcast, that each MAC sends. Matrix is similar to hosts but adds in destination MAC addresses as well. Then, statistics are summarized on a per-conversation basis between any two MAC addresses. Finally, topN takes host table information and correlates to the top number of MAC addresses. The N number is generally from 5 to 10 above. An example would be to correlate the top 5 MAC addresses as pertains to broadcasts or CRC errors.

There are individual tests that measure performance of specific user's activities. A WGET program measures the response times of Internet web surfing. Ping tests are well known to test throughput delays. Also, file transfer protocol tests measure getting and putting files from and to a web server. Unfortunately, these tests have not been effectively adapted to measure overall performance of a communication network from the customer's perspective, especially in a broadband wireless system.

Unfortunately, the current broadband wireless systems have not been effectively adapted to collect, store, and report performance information for the broadband wireless systems. The current systems typically focus on collecting, storing, and reporting fault information instead of performance information. Thus, broadband wireless system providers do not have an effective way to monitor system performance.

SUMMARY OF THE INVENTION

The invention solves the above problems by operating a probe device for testing a broadband wireless system. The probe device receives an instruction to execute a plurality of tests. The probe device then executes the plurality of tests to measure performance of the broadband wireless communication system based on the instruction. The probe device determines performance information from the plurality of tests. The probe device stores the performance information in a memory of the probe device.

In some embodiments, the probe device is located in a customer area of the broadband wireless system. In other embodiments, the plurality of tests are a web surfing test, a bulk file transfer test, a ping test to measure delay, a raw channel capacity test, a bit-error-rate test, a forward error correction test, and/or an out of lock indicator test.

In some embodiments, the probe device transmits the performance information. In other embodiments, the probe device retrieves the performance information from the memory. In some embodiments, the performance information is delay, download speed, number of dropped packets, or number of acknowledgement packets.

BRIEF DESCRIPTION OF THE DRAWINGS

FIG. 32 is a market web page in an example of the invention.

FIG. 33 is a Cyber Manager status web page in an example of the invention.

FIG. 35 is a FEC channel web page in an example of the invention.

FIG. 38 is a Hybrid System Management Protocol query web page in an example of the invention.

FIG. 39 is a hybrid probe web page in an example of the invention.

FIG. 40 is a top talker web page in an example of the invention.

FIG. 41 is detail information of a top talker web page in an example of the invention.

FIG. 42 is a bits per second web page for a NetScout statistics page in an example of the invention.

FIG. 43 is protocol information for a NetScout statistics page in an example of the invention.

FIG. 44 is a Multi Router Traffic Grapher (MRTG) web page in an example of the invention.

FIG. 47a is a key performance indicator web page in an example of the invention.

FIG. 47b is a key performance indicator web page in an example of the invention.

DETAILED DESCRIPTION OF THE INVENTION

Broadband Wireless System—FIGS. 1-6

FIGS. 1-6 depict a specific example of a broadband wireless system in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 1-6 have been simplified or omitted for clarity.

Figure 1:
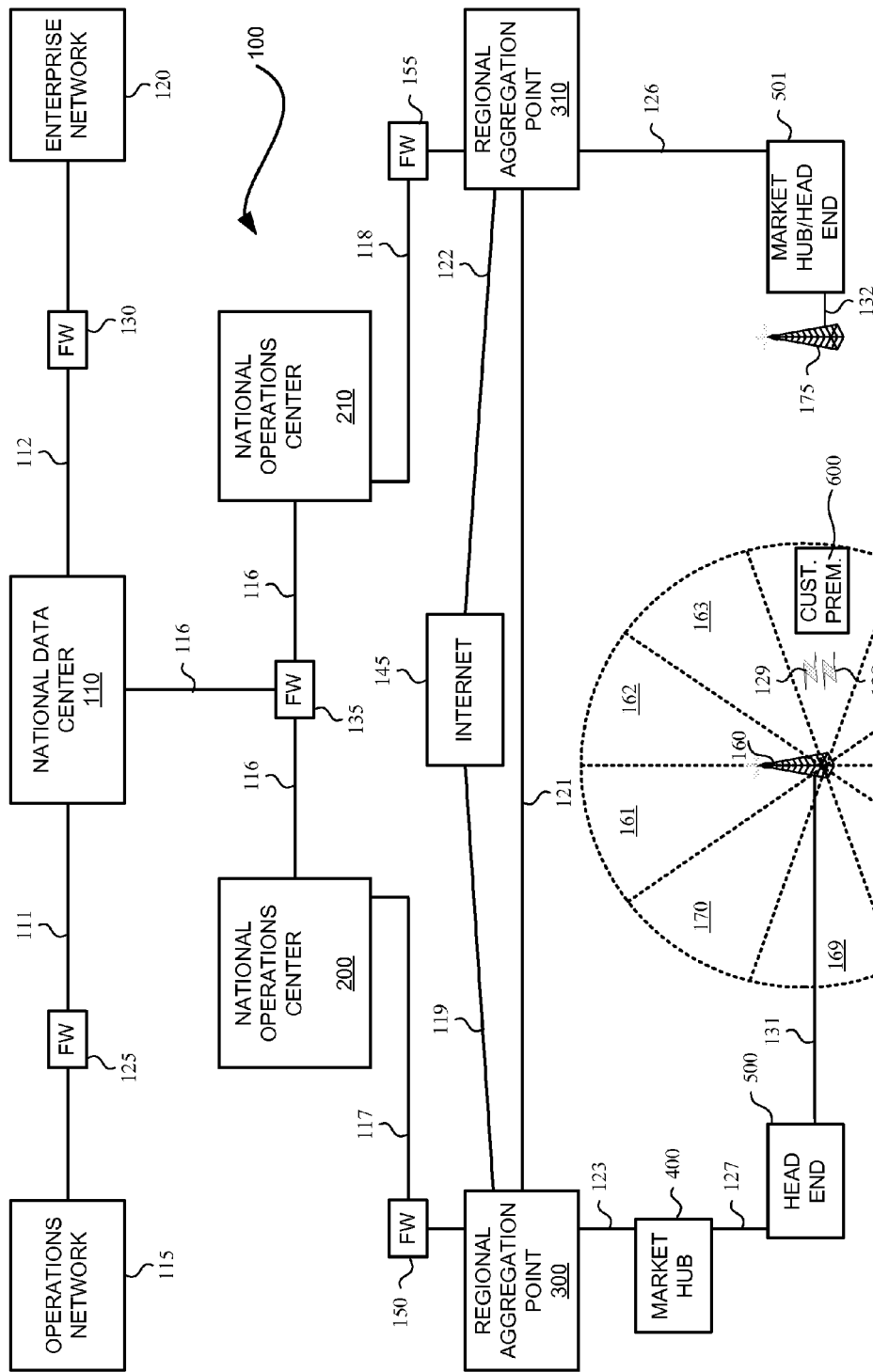
FIG. 1 is a block diagram of a broadband wireless system in an example of the invention.

FIG. 1 is a block diagram that illustrates a broadband wireless system 100 in an example of the invention. The broadband wireless system 100 is comprised of a national data center 110, an operations network 115, an enterprise network 120, a national operations center 200, a national operations center 210, an Internet 145, a regional aggregation point 300, a regional aggregation point 310, a market hub 400, a head end 500, a market hub/head end 501, and customer premises 600.

The national data center 110 is configured to compile and display network information for the broadband wireless system 100. Network information is data that can be evaluated to operate communication network, including performance information, fault information, billing information, and customer information. The operations network 115 is configured to process billing information, customer information, product ordering information, and another information generated from the broadband wireless system 100. The enterprise network 120 is an internal employee network configured to provide certain employees access to the network information for the broadband wireless system 100. The national operations center 200 is configured to route data within the broadband wireless system 100, collect network information for the broadband wireless system 100, and store the network information. The national operations center 200 is discussed in further detail in FIG. 2. The regional aggregation point 300 is configured to route data within the broadband wireless system 100, collect network information for the broadband wireless system 100, and store the network information. The regional aggregation point 300 is discussed in further detail in FIG. 3. The market hub 400 is configured to route data within the broadband wireless system 100, collect network information for the broadband wireless system 100, and store the network information. The market hub 400 is discussed in further detail in FIG. 4. The head end 500 is configured to communicate with a customer premises over a wireless link and collect network information. The head end 500 is discussed in further detail in FIG. 5. The customer premises is configured to communicate with a head end over a wireless link. The customer premises 600 is discussed in further detail in FIG. 6.

The following table describes how the components in FIG. 1 are connected. The first and second columns describe the components and the third column describes the link that connects the components.

| Component | Component | Link |
|---|---|---|
| National data center 110 | Operations network 115 | 111 |
| National data center 110 | Enterprise network 120 | 112 |
| National data center 110 | National operations center 200 | 116 |
| National data center 110 | National operations center 210 | 116 |
| National operations center 200 | National operations center 210 | 116 |
| National operations center 200 | Regional aggregation point 300 | 117 |
| National operations center 210 | Regional aggregation point 310 | 118 |
| Regional aggregation point 300 | Internet 145 | 119 |
| Regional aggregation point 300 | Regional aggregation point 310 | 121 |
| Regional aggregation point 310 | Internet 145 | 122 |
| Regional aggregation point 300 | Market hub 400 | 123 |
| Regional aggregation point 310 | Market hub/Head end 501 | 126 |
| Market hub 400 | Head end 500 | 127 |
| Head end 500 | Base antenna 160 | 131 |
| Base antenna 160 | Customer premises 600 | 128-29 |
| Market hub / Head end 501 | Base antenna 175 | 132 |

The links 111, 112 and 116-118 include firewalls (FW) 125, 130, 135, 150, and 155, respectively. A firewall is a system, hardware or software, configured to limit access to a system or network. The links 111, 112, 116-119, 121-123, and 126-127 are DS-3 connections. Those skilled in the art will appreciate that the links 111, 112, 116-119, 121-123, and 126-127 could be any type of electrical or optical connection including T-1, T-3, OC-3, OC-12, or OC-48 connections. Those skilled in the art will appreciate that the links 111, 112, 116-119, 121-123, and/or 126-127 could include redundant connections to increase reliability of the links.

The broadband wireless system 100 operates as follows. The customer premises 600 communicates with systems within the Internet 145. For instance, the customer premises 600 could download a web page from a server in the Internet 145. To download the web page, the customer premises 600 accesses the server through the head end 500, the market hub 400, and the regional aggregation point 300.

The national operations centers 200 and 210 collect network information for the broadband wireless system 100. The national operations center 200 retrieves network information from the regional aggregation point 300, the market hub 400, the head end 500, and the customer premises 600. Network information comprises performance information and fault information. The performance information is information that describes how a communication network is operating, such as throughput rates, number of transmission units, and signal-to-noise ratio. The fault information is information that identifies failures in a communication network, such as alarms and indicators of failed communication devices. The national operations center 200 processes and stores the network information. The national operations center 210 is a mirror system to the national operations center 200. The national operations center 210 retrieves and stores the same network information as the national operations center 200. Thus, if the national operations center 200 fails, then the national operations center 210 takes over without affecting the broadband wireless system 100.

The regional aggregation point 300 routes data through the broadband wireless system 100 and collects network information for the broadband wireless system 100. The region aggregation point 300 retrieves network information from the market hub 400, the head end 500, and the customer premises 600. The regional aggregation point 300 stores the network information and exchanges the network information with the national operations center 200. The regional aggregation point 310 operates similar to the regional aggregation point 300.

The market hub 400 routes data from the head end 500 to the regional aggregation point 300 and vice-versa, and collects network information for the broadband wireless system 100. The market hub 400 retrieves network information from the head end 500 and the customer premises 600. The market hub 400 stores the network information and exchanges the network information with the national operations center 200 and the regional aggregation point 300.

The head end 500 interfaces the customer premises 600 with other components in the broadband wireless system 100 and routes data from the customer premises 600 to the market hub 400 and vice-versa. The head end 500 collects network information for the broadband wireless system 100. The head end 500 transfers the network information to the market hub 400, the regional aggregation point 300, and/or the national operations center 200. The market hub/head end 501 operates similarly to the market hub 400 and the head end 500.

The customer premises 600 exchanges data with the head end 500 over wireless links 128 and 129. The customer premises 600 has two-way wireless communication with the head end 500 because both the downstream and upstream channels are over the wireless links 128 and 129. Those skilled in the art will appreciate that the upstream link 128 could be over a non-wireless link, such as a phone line or a cable modem, which is within the scope of the invention. As shown in FIG. 1, the customer premises 600 resides within a sector 164 of a plurality of sectors 161-170, which are physical areas serviced by a base antenna 160 coupled with the head end 500 by way of a link 131.

Figure 2:
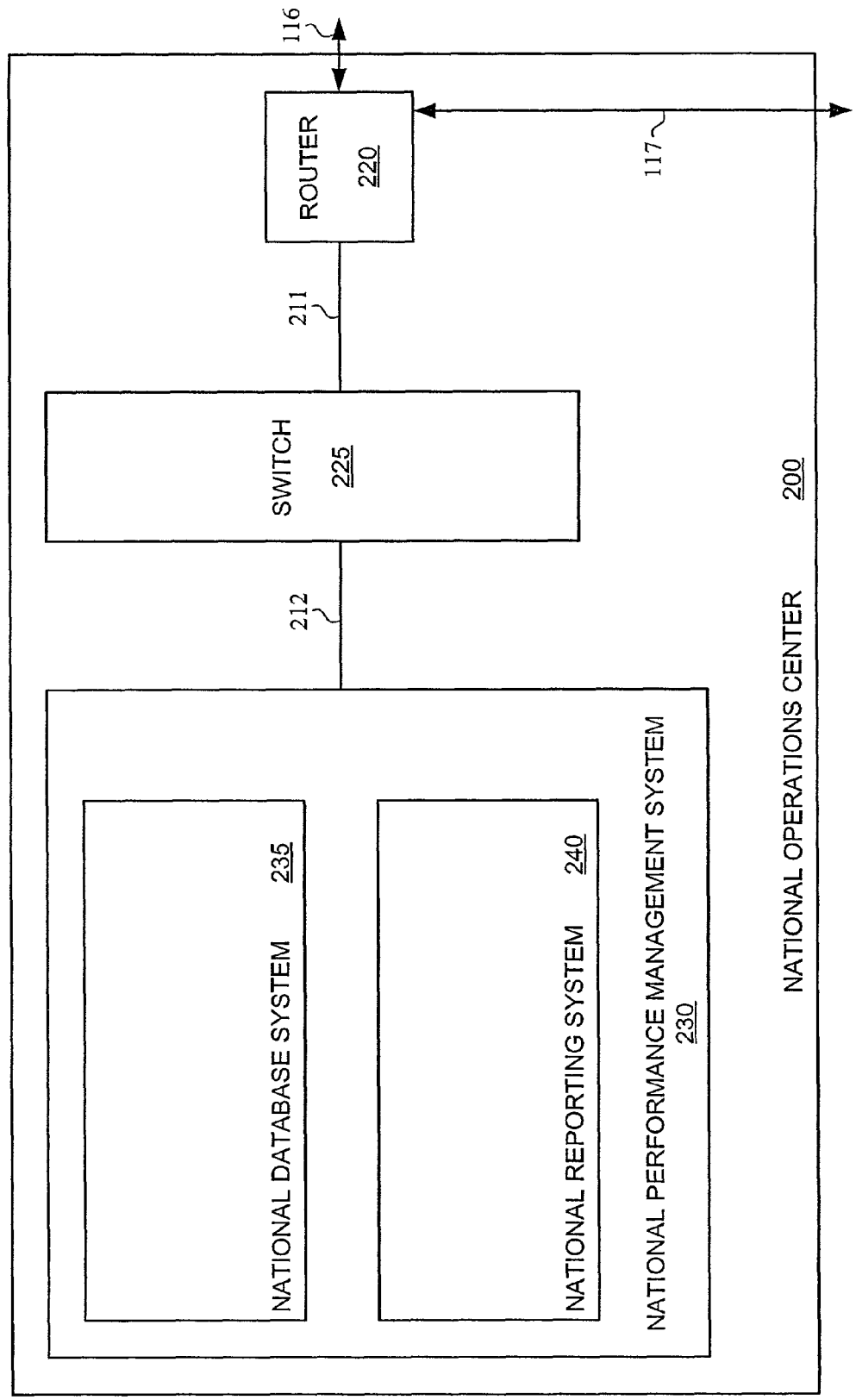
FIG. 2 is a block diagram of a national operations center in an example of the invention.

FIG. 2 is a block diagram that illustrates the national operations center 200 in an example of the invention. The national operations center 200 is comprised of a router 220, a switch 225, and a national performance management system 230. The national performance management system 230 is comprised of a national database system 235 and a national reporting system 240.

The national performance management system 230 is configured to collect, store, and report performance information for the broadband wireless system 100. The national database system 235 is configured to store performance information for the broadband wireless system 100. The national database system 235 is an Oracle database. The national reporting system 240 is configured to report the performance information for the broadband wireless system 100. The national reporting system 240 is an Apache web server.

The router 220 connects with the national data center 110, the national operations center 210, and the regional aggregation point 300 over the links 116 and 117. The router 220 connects with the switch 225 over a link 211. The link 211 is a Gigabit Ethernet connection. The switch 225 connects with the national performance management system 230 over a link 212.

In operation, the national performance management system 230 collects performance information from other components in the broadband wireless system 100. The national performance management system 230 communicates with the other components in the broadband wireless system 100 through the switch 225 and the router 220 to collect the performance information. The operation of the router 220 and the switch 225 is well known to those skilled in the art and is omitted for the sake of brevity. The national database system 235 stores the collected performance information. The national reporting system 240 retrieves the performance information from the national database system 235 and provides user-friendly formats of the performance information. Examples of the user-friendly formats are data files, HTML files, or other types of files. The national reporting system 240 provides other systems access to the performance information. For instance, a user system within the Internet 145 could access the national reporting system 240 and view the performance information using a Web browser. Also, the national data center 110 could retrieve the performance information from the national reporting system 240 through a File Transfer Protocol (FTP) command and store the performance information.

Figure 3:
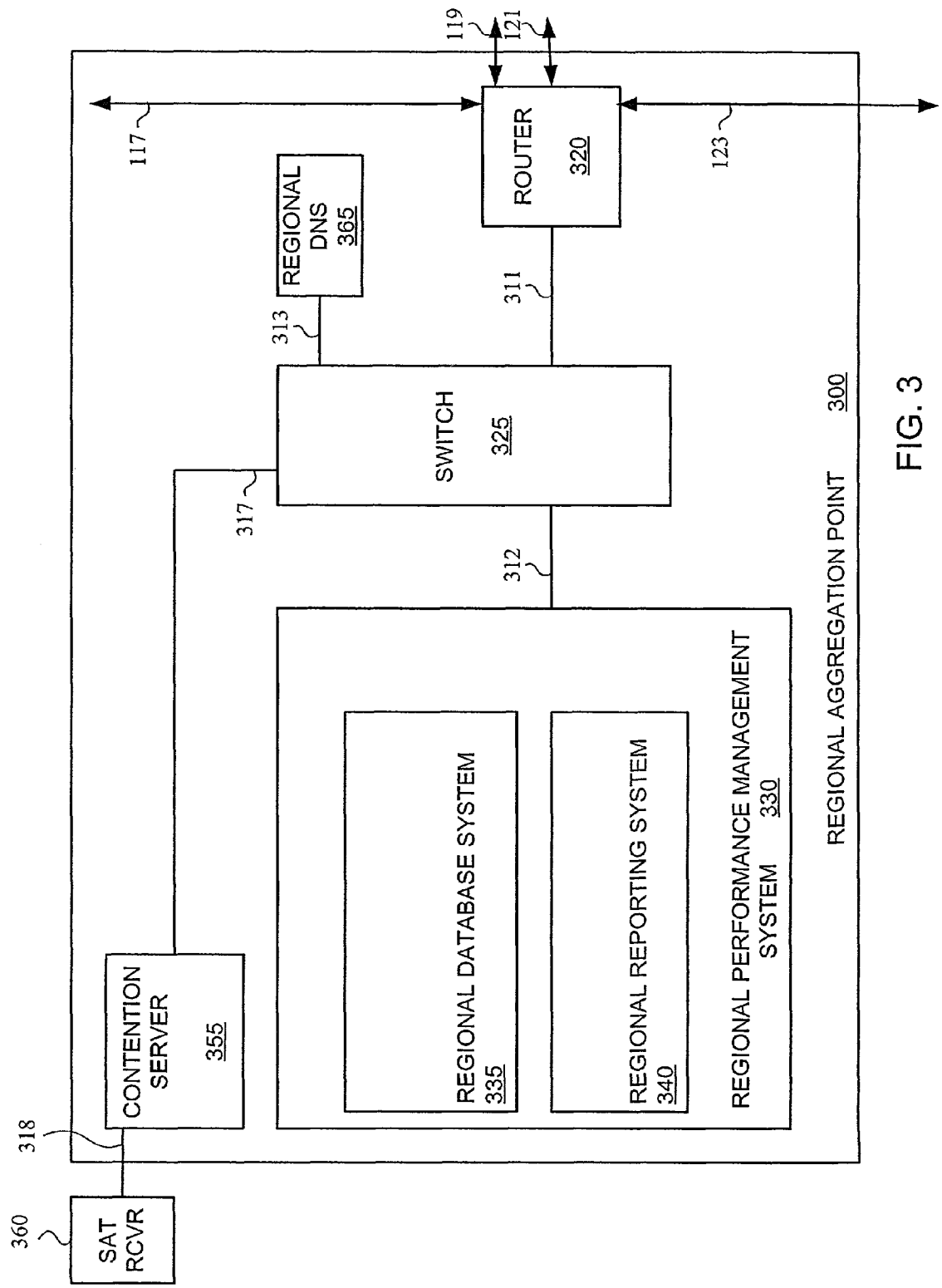
FIG. 3 is a block diagram of a regional aggregation point in an example of the invention.

FIG. 3 is a block diagram that illustrates the regional aggregation point 300 in an example of the invention. The regional aggregation point 300 is comprised of a router 320, a switch 325, a regional performance management system 330, a contention server 355, and a satellite receiver 360. The regional performance management system 330 is comprised of a regional database system 335 and a regional reporting system 340.

The router 320 is a GSR 12016 router from Cisco Systems. The switch 325 is a 6506 switch from Cisco Systems. The regional performance management system 330 is configured to collect, store, and report performance information for the broadband wireless system 100. The regional database system 335 is configured to store performance information for broadband wireless system 100. The regional database system 335 is an Oracle database. The regional reporting system 340 is configured to report performance information for the broadband wireless system 100. The regional reporting system 340 is an Apache web server. The contention server 355 and the satellite receiver 360 are from Cidera Co. The satellite receiver 360 is a Global Positioning System (GPS) receiver.

The router 320 connects with the national operations center 200, the Internet 145, the regional aggregation point 310, and the market hub 400 over the links 117, 119, 121 and 123, respectively. The router 320 connects with the switch 325 over a link 311. The link 311 is a Gigabit Ethernet connection. The switch 325 connects with the regional performance management system 330 over a link 312. The switch 325 connects with the contention server 355 over a link 317. The contention server 355 connects with the satellite receiver 360 over a link 318. The link 318 is a coaxial cable.

In operation, the regional performance management system 330 collects performance information for the broadband wireless system 100. The regional performance management system 330 communicates with other components in the broadband wireless system 100 through the switch 325 and the router 320 to collect the performance information. The operation of the router 320 and the switch 325 is well known to those skilled in the art and is not discussed for the sake of brevity. The regional database system 335 stores the collected performance information. The regional reporting system 340 retrieves the performance information from the regional database system 335 and provides user-friendly formats of the performance information. Examples of the user-friendly formats are data files, HTML files, or other types of files. The regional reporting system 340 provides other systems access to the performance information. For instance, a user system within the Internet 145 could access the regional reporting system 340 and view the performance information using a Web browser. Also, the national performance management system 230 could retrieve the performance information from the regional reporting system 340 for storage in the national database system 235.

The contention server 355 receives configuration information from a content delivery network through the satellite receiver 360. The configuration information is used to pre-configure the regional performance management system 330. The configuration information is also used to update or re-configure the regional performance management system 330.

In one embodiment, the regional aggregation point 300 also includes a regional domain name server (DNS) 365 coupled to the switch 325 via a link 313.

Figure 4:
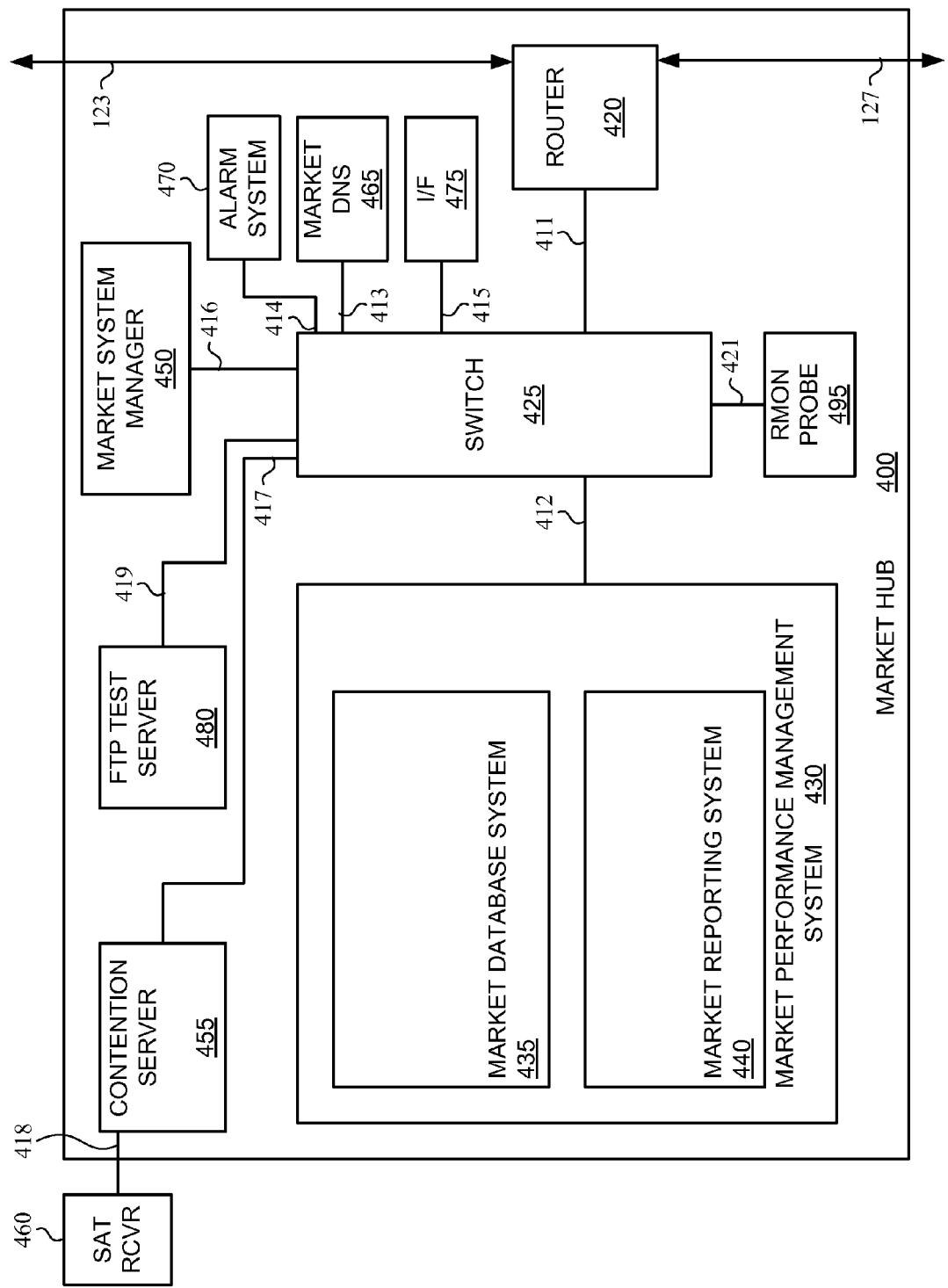
FIG. 4 is a block diagram of a market hub in an example of the invention.

FIG. 4 is a block diagram that illustrates the market hub 400 in an example of the invention. The market hub 400 is comprised of a router 420, a switch 425, a market performance management system 430, a market system manager 450, a contention server 455, and a satellite receiver 460. The market performance management system 430 comprises a market database system 435 and a market reporting system 440.

The router 420 is a series 7500 router from Cisco Systems. The market performance management system 430 is configured to collect, store, and report performance information for the broadband wireless system 100. The market database system 435 is configured to store performance information for the broadband wireless system 100. The market database system 435 is an Oracle database. The market reporting system 440 is configured to report performance information for the broadband wireless system 100. The market reporting system 440 is an Apache web server. The market system manager 450 is a CyberManager 2000 (CMG-2000) from Hybrid Networks, Inc. The contention server 455 and the satellite receiver 460 are from Cidera Co. The satellite receiver 460 is a Global Positioning System (GPS) receiver.

The router 420 connects with the regional aggregation point 300 and the head end 500 over the links 123 and 127, respectively. The router 420 connects with the switch 425 over a link 411. The link 411 is a Gigabit Ethernet connection. The switch 425 connects with the market performance management system 430 over a link 412. The switch 425 connects with the market system manager 450 over a link 416. The switch 425 connects with the contention server 455 over a link 417. The contention server 455 connects with the satellite receiver 460 over a link 418. The link 418 is a coaxial cable.

In operation, the market performance management system 430 collects performance information for the broadband wireless system 100. The market performance management system 430 communicates with other components in the broadband wireless system 100 through the switch 425 and the router 420 to collect the performance information. The operation of the router 420 and the switch 425 is well known to those skilled in the art and is not discussed for the sake of brevity. The market database system 435 stores the collected performance information. The market reporting system 440 retrieves the performance information from the market database system 435 and provides user-friendly formats of the performance information. Examples of the user-friendly formats are data files, HTML files, or other types of files. The market reporting system 440 provides other systems access to the performance information. For instance, a user system within Internet 145 could access the market reporting system 440 and view the performance information using a Web browser. Also, the national performance management system 230 and/or the regional performance management system 330 could retrieve the performance information from the market reporting system 440 for storage in the national database system 235 and the regional database system 335, respectively.

The market system manager 450 monitors and stores routing information for upstream and downstream routing within the broadband wireless system 100. The market system manager 450 provides other systems access to the routing information.

The contention server 455 receives configuration information from a content delivery network through the satellite receiver 460. The configuration information is used to pre-configure the market performance management system 430 or the market system manager 450. The configuration information is also used to update or re-configure the market performance management system 430 or the market system manager 450.

In one embodiment, the market hub 400 also includes a market domain name server (DNS) 465, an alarm system 470, an interface 475, a file transfer protocol (FTP) test server 480, and an RMON probe 495, each of which is coupled to the switch 425 via links 413, 414, 415, 419 and 421, respectively.

Figure 5:
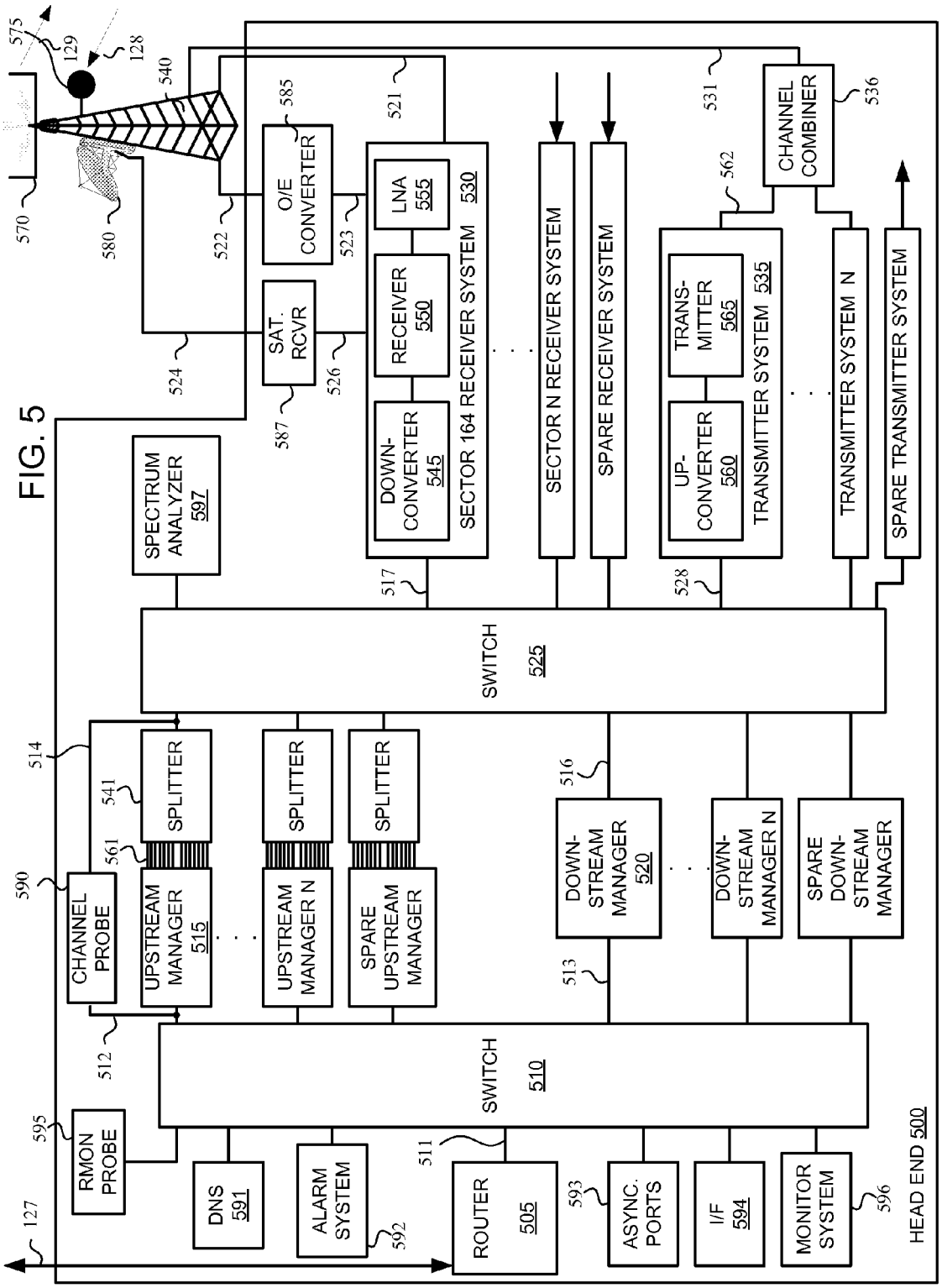
FIG. 5 is a block diagram of a head end in an example of the invention.

FIG. 5 is a block diagram that illustrates the head end 500 in an example of the invention. The head end 500 is comprised of a router 505, a switch 510, an upstream manager 515, a downstream manager 520, a patch panel 525, a receiver system 530, a transmitter system 535, an Optical-to-Electrical (O/E) converter 585, a satellite receiver 587, and a base antenna 540. The receiver system 530 is comprised of a down-converter 545, a receiver 550, and a Low Noise Amplifier (LNA) 555. The transmitter system 535 is comprised of an up-converter 560 and a transmitter 565. The base antenna 540 is comprised of a transmitter antenna 570, a receiver antenna 575, and a satellite antenna 580. The head end 500 also includes a channel probe 590 and a Remote MONitoring (RMON) probe 595.

Those skilled in the art will appreciate that the base antenna 540 could be positioned at a high altitude to improve communications. For instance, the base antenna 540 could be positioned on a mountain or a tall building. Consequently, the base antenna 540 could be placed at a remote location in relation to the head end 500. The base antenna 540 has a range of approximately 35 miles.

The router 505 is a 7500 series router from Cisco Systems. The switch 510 is a 6500 series switch from Cisco Systems. The upstream manager 515 is configured to manage data on upstream channels. The upstream manager 515 is a CyberMaster Upstream Router (CMU-2000-14C) from Hybrid Networks, Inc. The downstream manager 520 is configured to manage data on downstream channels. The downstream manager 520 is a CyberMaster Downstream Router (CMD-2000) from Hybrid Networks, Inc. The patch panel 525 is from PESA Switching Systems, Inc. The receiver system 530 is configured to receive a Radio Frequency (RF) signal and convert the RF signal into an Intermediate Frequency (IF) signal. The receiver system 530 is a receiver from ADC Telecommunications Co. The transmitter system 535 is configured to receive an IF signal and convert the IF signal into an RF signal. The base antenna 540 is an antenna from Andrew Corp. The RMON probe 595 is a NetScout probe from NetScout Systems, Inc.

The router 505 connects with the market hub 400 over the link 127. The router 505 connects with the switch 510 over a link 511. The link 511 is a Gigabit Ethernet connection. The switch 510 connects with the upstream manager 515 over a link 512 and the downstream manager 520 over a link 513. The upstream manager 515 connects with the patch panel 525 over a link 514. The downstream manager 520 connects with the patch panel 525 over a link 516. The links 512-514 and 516 are configured to transport Transmission Control Protocol/Internet Protocol (TCP/IP) packets.

The patch panel 525 connects with the receiver system 530 over a link 517. The link 517 is configured to transport an IF signal. The receiver system 530 connects with the receiver antenna 575 of the base antenna 540 over a link 521. The link 521 is a wire cable configured to transport an RF signal.

The receiver system 530 connects with the satellite receiver 587 over a link 526. The satellite receiver 587 connects with the satellite antenna 580 on the base antenna 540 over a link 524. The links 526 and 524 are coaxial cables.

The receiver system 530 connects to the O/E converter 585 over a link 523. The O/E converter 585 connects with the receiver antenna 575 on the base antenna 540 over a link 522. The link 522 is a fiber optic cable.

The patch panel 525 connects with the transmitter system 535 over a link 528. The link 528 is configured to transport an IF signal. The transmitter system 535 connects with the transmitter antenna 570 on the base antenna 540 over a link 531. The link 531 is a wire cable configured to transport an RF signal.

The channel probe 590 connects to the links 512 and 514. The configuration and operation of the channel probe 590 is discussed in further detail in FIGS. 14-16. The RMON probe 595 connects to the link 511. The configuration and operation of the RMON probe 595 is discussed in further detail in FIGS. 22-24.

The head end 500 operates as follows. The head end 500 communicates with the market hub 400 and the customer premises 600. The downstream manager 520 routes data to the customer premises 600. The data could be from other components in the broadband wireless system 100. The downstream manager 520 communicates with the other components through the switch 510 and the router 505. The operation of the router 505 and the switch 510 is well known to those skilled in the art and is not discussed for the sake of brevity.

The downstream manager 520 receives packets that contain the data from the switch 510 over the link 513. The downstream manager 520 processes the packets to extract the data. The downstream manager 520 converts the data into an IF signal. The downstream manager 520 transmits the IF signal to the transmitter system 535 through the patch panel 525 over the links 516 and 528. The up-converter 560 and the transmitter 565 function together to process the IF signal and convert the IF signal into an RF signal. The transmitter system 535 then transmits the RF signal to the transmitter antenna 570 over the link 531.

The transmitter antenna 570 is an omni-directional antenna. The transmitter antenna 570 transmits the RF signal to the customer premises 600 on downstream channels over the link 129. The RF signal is a Multichannel Multipoint Distribution Service (MMDS) signal. The MMDS frequencies range from 2596 MHz to 2644 MHz. The MMDS signals in this example also include the Multipoint Distribution Service (MDS) frequencies. The MDS frequencies comprise MDS1 (2150-2156 MHz) and MDS2 (2156-2162 MHz). The bandwidth of the downstream channels is approximately 8 Mbps.

Concurrently, the upstream manager 515 routes data received from the customer premises 600 to the broadband wireless system 100. The upstream manager 515 communicates with other components in the broadband wireless system 100 through the switch 510 and the router 505.

The upstream manager 515 receives the data from the customer premises 600 through the receiver system 530 and the receiver antenna 575. The receiver antenna 575 is a directional antenna. The receiver antenna 575 forms a "sector" in the direction in which it points. Any communication device that communicates with the receiver antenna 575 is considered within the sector. Those skilled in the art will appreciate that the base antenna 540 could include a plurality of receiver antennas forming a plurality of sectors. Those skilled in the art will also appreciate that the head end 500 could include a plurality of upstream managers and receiver systems depending on the number of sectors controlled by the head end 500.

The receiver antenna 575 receives an RF signal from the customer premises 600 on the upstream channel over the link 128. The RF signal is also an MMDS signal. The bandwidth of the upstream channel is approximately 200 kbps.

The receiver antenna 575 transfers the RF signal over the link 521 to the receiver system 530. The LNA 555 amplifies the RF signal. The receiver 550 and the down-converter 545 function together to process the amplified RF signal and convert the amplified RF signal into an IF signal. The receiver system 530 transfers the IF signal to the upstream manager 515 through the patch panel 525 over the links 517 and 514. The patch panel 525 connects many devices together. For instance, if the head end 500 controlled ten sectors, then the patch panel 525 would connect ten upstream managers to ten receiver systems.

The upstream manager 515 receives the IF signal through the patch panel 525. The upstream manager 515 processes the IF signal to route the data carried by the IF signal. The upstream manager 515 generates packets and inserts the data, carried by the IF signal, into the packets. The upstream manager 515 transmits the packets to the switch 510 for transmission to other components in the broadband wireless system 100.

The upstream manager 515 also generates control messages for the customer premises 600. The upstream manager 515 transmits these control messages to the downstream manager 520 through the switch 510. The downstream manager 520 transmits the control messages to a wireless broadband router that is located at the customer premises 600. The wireless broadband router communicates with the upstream manager and the downstream manager to exchange data.

The upstream manager 515 separates the upstream channels into subchannels. The upstream manager 515 polls numerous wireless broadband routers to allocate use of subchannels. Polling is a round robin process to determine which wireless broadband router has access to a subchannel. The upstream manager 515 maintains a queue of the active wireless broadband routers to determine which wireless broadband router is next to transmit over a subchannel for a period of time.

The upstream manager uses the control messages to grant a wireless broadband router use of a subchannel for a limited period of time. The control messages are credits. A credit is a message that allows usage of a subchannel for a period of time or for the transfer of a maximum number of transmission units such as bytes. One example of a credit includes information such as a subchannel or frequency range, a maximum allowed time to transfer data, and a maximum number of bytes the wireless broadband router is allowed to transfer.

There are two kinds of credits: polling and dedicated. Polling credits are credits related to polling of the wireless broadband routers. Polling credits are generally smaller than the dedicated credits. Once the wireless broadband router completes transfer of the packets, the wireless broadband router transmits a DONE message to the upstream manager 515 via the upstream channels. The DONE messages include information such as the number of bytes sent and the number of packets left for the wireless broadband router to transfer. If the DONE message shows that the wireless broadband router has more than three packets left to transfer and there are available subchannels, then the upstream manager 515 issues a dedicated credit to the wireless broadband router.

The receiver system 530 also receives a 10 MHz signal from the satellite receiver 587. The satellite antenna 580 receives satellite signals and transmits the satellite signals to the satellite receiver 587 over the link 524. The satellite receiver 587 processes the satellite signals to generate the 10 MHz signal. The satellite receiver 587 transmits the 10 MHz signal to the receiver system 530 over the link 526. The receiver system 530 uses the 10 MHz signal as a reference signal.

In some examples, the receiver system 530 communicates with the receiver antenna 575 over the links 522-523 and the O/E converter 585. In this example, the link 522 is a fiber optic cable. Depending on the number of receiver antennas on the base antenna 540, the number of wire cables, such as the link 521, running from the base antenna 540 could become large. A large number of wire cables can be heavy and can add stress to the structure of the base antenna 540. Conversely, fiber optic cable can be lighter than wire cable. Therefore, it may be advantageous to run fiber optic cable between the base antenna 540 and the receiver system 530. In such a case, the O/E converter 585 is used to convert the optical signal to an electrical signal.

In one embodiment, the head end 500 also includes a DNS 591, an alarm system 592, a collection of asynchronous ports 593, an interface 594 and a monitor system 596, each of which is coupled with switch 510. Also, the head end 500, as depicted in FIG. 5, also includes a channel combiner 536 for coupling a plurality of transmitter systems 535 to the link 531. The channel combiner 536 and the transmitter system 535 are coupled via a link 562.

Figure 6:
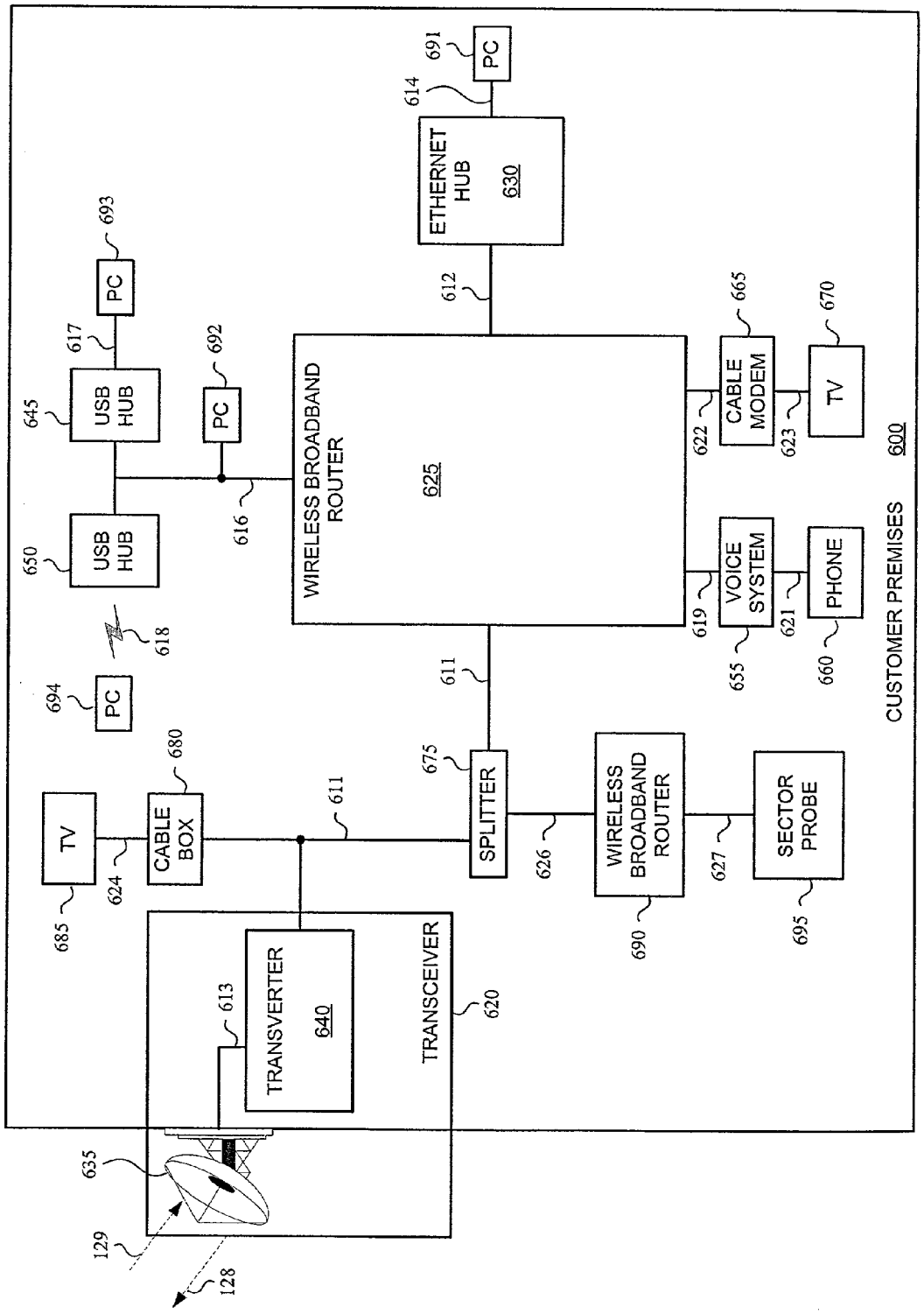
FIG. 6 is a block diagram of a customer premises in an example of the invention.

FIG. 6 is a block diagram that illustrates the customer premises 600 in an example of the invention. The customer premises 600 is comprised of a transceiver 620, a wireless broadband router 625, an Ethernet hub 630, and a computer (PC) 691. The transceiver 620 is comprised of a directional antenna 635 and a transverter 640. The customer premises 600 also includes a Universal Serial Bus (USB) hub 645, a USB hub 650, a voice system 655, a phone 660, a cable modem 665, a TV 670, a cable box 680, a TV 685, a splitter 675, a wireless broadband router 690, and a sector probe 695.

Examples of the customer premises 600 are residences or businesses. The transceiver 620 is configured to transmit and receive a wireless signal. The transceiver 620 is a transceiver from California Amplifier, Inc. The wireless broadband router 625 is configured to process packets to generate an IF signal, and vice-versa. The wireless broadband router 625 is a Series 2000 Wireless Broadband Router from Hybrid Networks, Inc. The Ethernet hub 630 is configured to interface multiple Ethernet connections. The Ethernet hub 630 is an Ethernet Hub from Netgear.

The USB hub 645 is a USB hub from Lucent Technologies. The USB hub 650 is an 802.11 wireless Ethernet standard hub from Lucent Technologies. The voice system 655 is configured to process voice data that is transmitted over packets. The splitter 675 is a 3 dB splitter. The wireless broadband router 690 is a Series 2000 Wireless Broadband Router from Hybrid Networks, Inc. The sector probe 695 is configured to collect network information from the customer premises side.

The directional antenna 635 connects with the transverter 640 over a link 613. The link 613 is a coaxial cable. The transverter 640 connects with the wireless broadband router 625 over a link 611. The link 611 is an RG-59 coaxial cable. The wireless broadband router 625 connects with the Ethernet hub 630 over a link 612. The Ethernet hub 630 connects with the PC 691 over a link 614. The links 612 and 614 are Ethernet connections. Those skilled in the art will appreciate that the Ethernet hub 630 could also communicate with a Local Area Network (not shown).

The wireless broadband router 625 connects with a USB 616. The USB 616 connects with the PC 692, the USB hub 645, and the USB hub 650. The USB hub 645 connects with the PC 693 over a link 617. The link 617 is an Ethernet connection. The USB hub 650 connects with the PC 694 over a link 618. The link 618 is a wireless Ethernet connection. The wireless broadband router 625 connects with the voice system 655 over a link 619. The voice system 655 connects with a phone 660 over a link 621. The wireless broadband router 625 connects with the cable modem 665 over a link 622. The cable modem 665 connects with the TV 670 over a link 623. The link 623 is a coaxial cable. The cable box 680 connects with the link 611 and is configured to receive a cable television feed. The cable box 680 connects with the TV 685 over a link 624. The link 624 is a coaxial cable.

The link 611 includes the splitter 675. The wireless broadband router 690 connects with the splitter 675 over a link 626. The link 626 is a coaxial cable. The wireless broadband router 690 connects with the sector probe 695 over a link 627. The configuration and operation of the sector probe 695 will be discussed in further detail in FIGS. 8-13.

Those skilled in the art will appreciate that the transceiver 620, the cable box 680, the voice system 655, the cable modem 665, the USB hub 645, the USB hub 650, and the Ethernet hub 630 could be incorporated within the wireless broadband router 625.

The customer premises 600 operates as follows. The customer premises 600 communicates with the head end 500. To receive data from the head end 500, the directional antenna 635 receives an RF signal on the downstream channel over the link 129. The directional antenna 635 transfers the RF signal to the transverter 640. The transverter 640 processes the RF signal and converts the RF signal to an IF signal. The transverter 640 transmits the IF signal to the wireless broadband router 625 over the link 611. The wireless broadband router 625 processes the IF signal and converts the IF signal into packets containing the data. The wireless broadband router 625 transmits the packets to the Ethernet hub 630 over the link 612. Those skilled in the art will appreciate that the wireless broadband router 625 could transmit packets to the USB hub 645, the USB hub 650, the PC 692, the voice system 655, and the cable modem 665. The Ethernet hub 630 transmits the packets to the PC 691 over the link 614.

To transmit data to the head end 500, the PC 691 transmits packets, containing data, to the Ethernet hub 630 over the link 614. The Ethernet hub 630 transfers the packets to the wireless broadband router 625 over the link 612. The wireless broadband router 625 processes the packets and converts the data contained in the packets into an IF signal. Those skilled in the art will appreciate that the wireless broadband router 625 could also receive packets from the USB hub 645, the USB hub 650, the PC 692, the voice system 655, and the cable modem 665. The wireless broadband router 625 transfers the IF signal to the transverter 640 over the link 611. The transverter 640 processes the IF signal and converts the IF signal into an RF signal. The transverter 640 also amplifies the RF signal. The transverter 640 transmits the RF signal to the directional antenna 635. The directional antenna 635 transmits the RF signal to the head end 500 on the upstream channel over the link 128.

Performance Management System Overview

Figure 7:
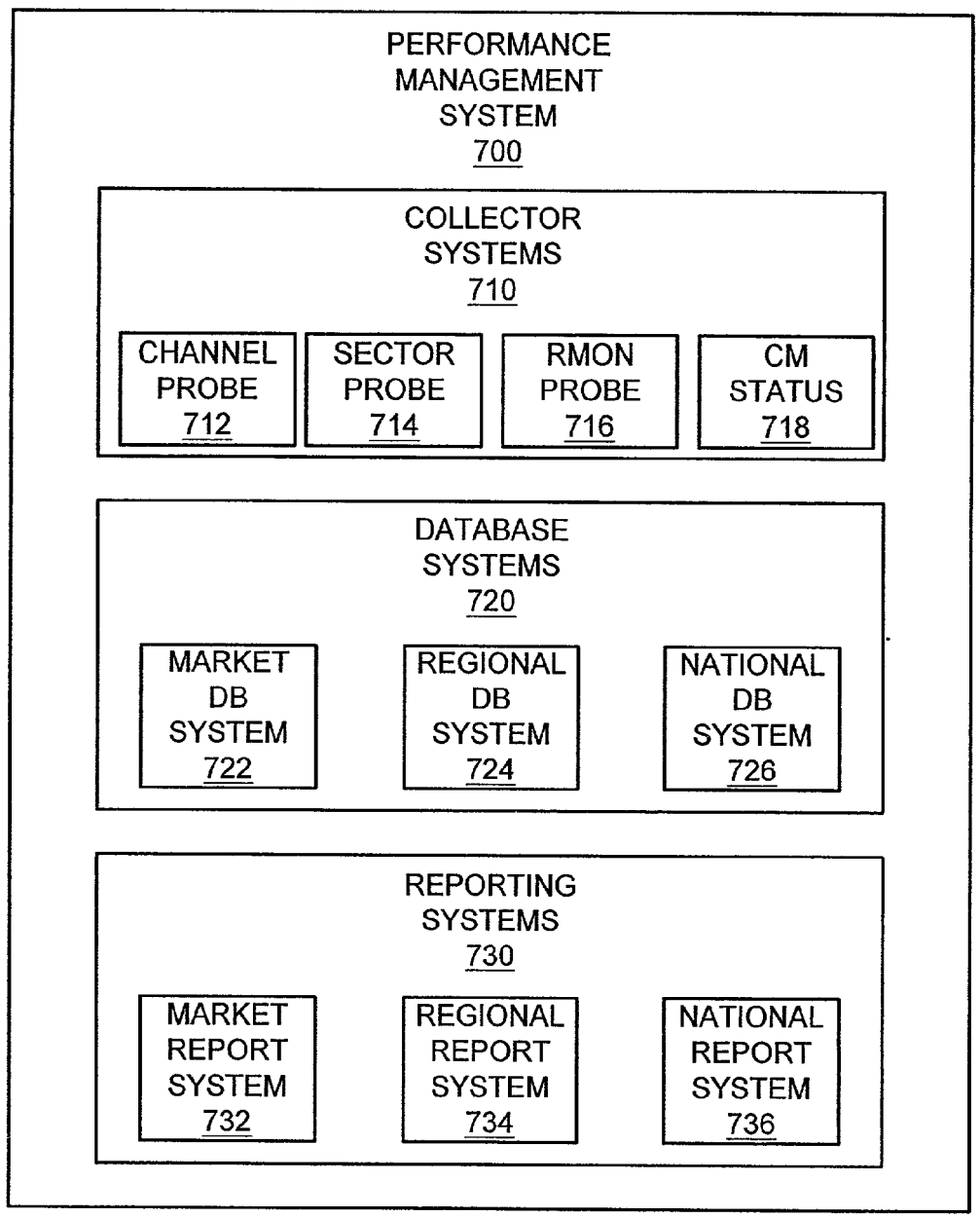
FIG. 7 is a block diagram of a performance management system in an example of the invention.

FIG. 7 is a block diagram that illustrates a performance management system 700 in an example of the invention. The performance management system 700 includes collector system 710, database systems 720, and reporting systems 730. The collector systems 710 includes a channel probe 712, a sector probe 714, a Remote Monitoring (RMON) probe 716, and a Cyber Manager (CM) status 718. The database systems 720 include a market database system 722, a regional database system 724, and a national database system 726. The reporting systems 730 include a market reporting system 732, a regional reporting system 734, and a national reporting system 736.

In this example, the performance management system 700 is an illustration of components related to the performance management within the broadband wireless system 100. The connections between the components within the performance management system 700 are better depicted in FIGS. 1-6. Multiple components such as numerous probes, databases and reporting systems are not shown for the sake of simplicity.

The groupings of the probes 712, 714, 716, and 718 in the collector systems 710 are not necessarily elements of the performance management system 700 but are functional groupings used to better explain the operation of the performance management system 700. The groupings of the database systems 722, 724, and 726 in the database systems 720 are not necessarily elements of the performance management system 700 but are functional groupings used to better explain the operation of the performance management system 700. The groupings of the reporting systems 732, 734, and 736 in the reporting systems 730 are not necessarily elements of the performance management system 700 but are functional groupings used to better explain the operation of the performance management system 700.

The collector systems 710 include numerous probes situated throughout the communication network that collect performance information of the communication network. The performance information is information that describes how a communication network is operating. Some examples of performance information are throughput, utilization, delay, modem counts, Signal-to-Noise ratio (SNR), Forward Error Correction (FEC) blocks, FEC correctable percentage, polling ratio, total number of upstream/downstream bytes, average number of upstream/downstream bytes per user, transfer rate, and protocol breakdowns. The database systems 720 store the performance information. The reporting systems 730 retrieve the performance information and provide user-friendly formats of the performance information. Thus, the performance management system 700 provides performance information of the broadband wireless system 100 to characterize traffic, identify bottlenecks, and locate abusive users.

Sector Probe—FIGS. 8-13

The sector probe 695 measures performance of the broadband wireless system 100. In one embodiment, the sector probe 695 measures performance of the broadband wireless system 100 from the customer's perspective. Thus, the sector probe 695 is located in a customer area, such as the customer premises 600, to accurately simulate the customer's perspective. The customer area is any geographic area that contains customers of a communication network. In this embodiment, the sector probe 695 actively generates traffic by executing tests to determine performance of the broadband wireless system 100, as opposed to passively listening to network traffic.

Figure 8:
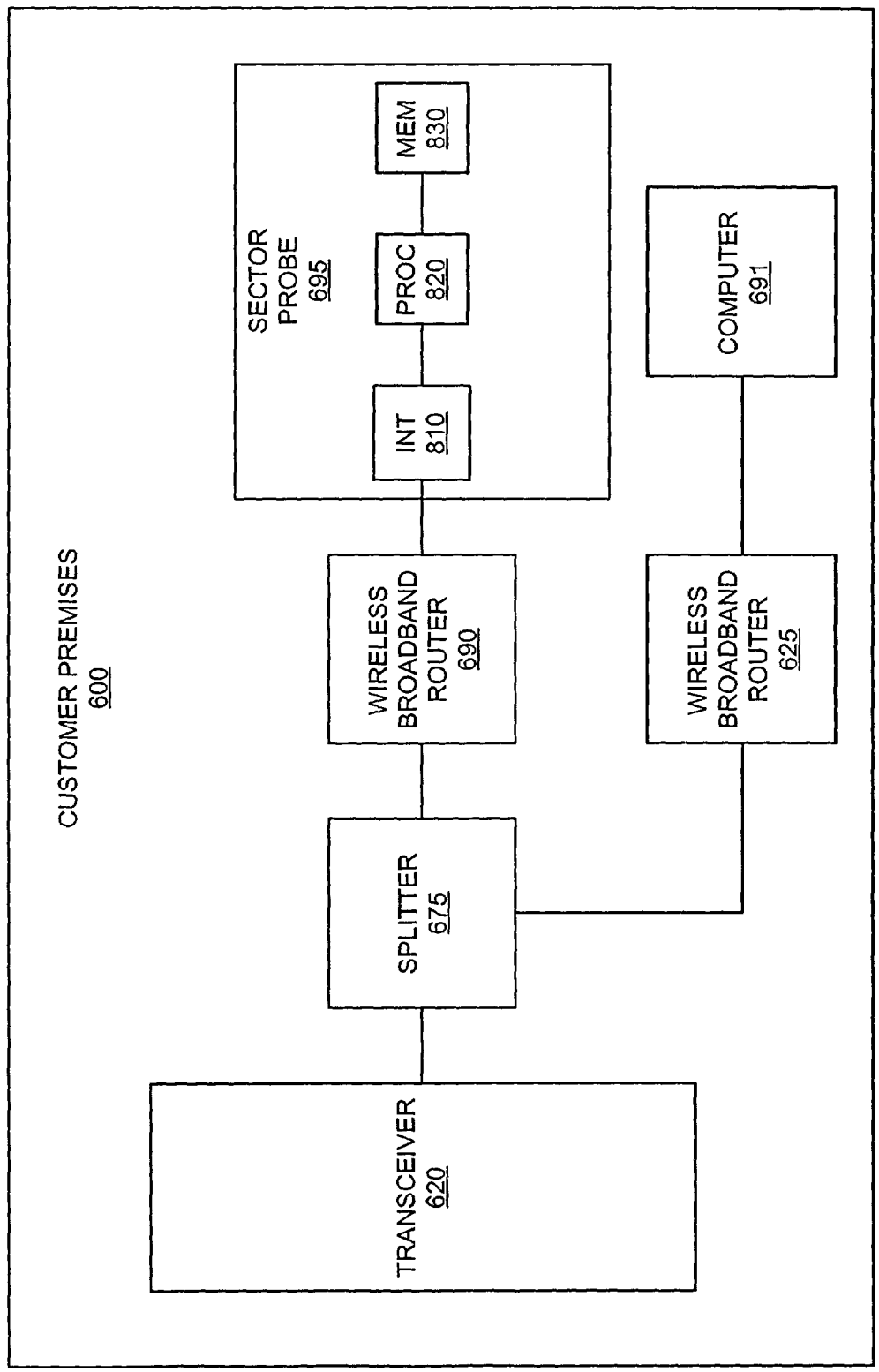
FIG. 8 is a block diagram of a customer premises with a sector probe in an example of the invention.

FIG. 8 is a block diagram that illustrates the customer premises 600 including the sector probe 695 in an example of the invention. The additional components in the customer premises 600 as shown in FIG. 6 are not shown in FIG. 8 for the sake of clarity in order to focus on the components related to the operation of the sector probe 695. The customer premises 600 includes the transceiver 620, the splitter 675, the wireless broadband router 690, the sector probe 695, the wireless broadband router 625, and the computer 691. The sector probe 695 comprises an interface 810, a processor 820, and a memory 830. The transceiver 620 is connected to the splitter 675. The splitter 675 is connected to the wireless broadband router 690 and the wireless broadband router 625. The wireless broadband router 625 is connected to the computer 691. The wireless broadband router 690 is connected to the interface 810. The interface 810 is connected to the processor 820. The processor 820 is connected to the memory 830.

The operation of the sector probe 695 is discussed below in greater detail in FIGS. 9-13. The sector probe 695 is any communication device in a customer area configured to (1) receive an instruction to execute a plurality of tests, (2) execute the plurality of the tests to measure the performance of a communication network, (3) determine performance information from results of the plurality of the tests, and (4) store the performance information in memory 830. In one embodiment, the sector probe 695 is a computer with a 100 MHz motherboard, wherein the motherboard comprises an Intel Celeron 433 MHz processor, a 128 MB RAM, a 7.5 GB hard drive, a 3Com 10/100 network interface card, a CD-ROM, a 3.5" floppy drive, and a standard PCI video card. The sector probe 695 runs a Red Hat Linux version 6.2 as the operating system.

The instruction could be any message or signal received by the sector probe 695 indicating to execute the tests to measure performance of a communication network. The instruction could be received from the head end 500, the regional aggregation point 400, or from anywhere in the broadband wireless system 100. In one embodiment, the instruction is the execute command to run a program that executes the tests. The test cold be any test or script configured to measure performance of a communication network. Some examples of tests are a web surfing test, a bulk file transfer script, a ping test to measure delay, and a raw channel capacity test.

The wireless broadband router 690 exchanges data between the sector probe 695 and the splitter 675. The transceiver 620 converts the data into wireless signals and exchanges the wireless signals in the MMDS frequency range with the head end 500. The wireless broadband router 625 and the computer 692 are shown to show that the sector probe 695 can be placed with an existing user in the customer premises 600 with no negative effects on the user.

Figure 9:
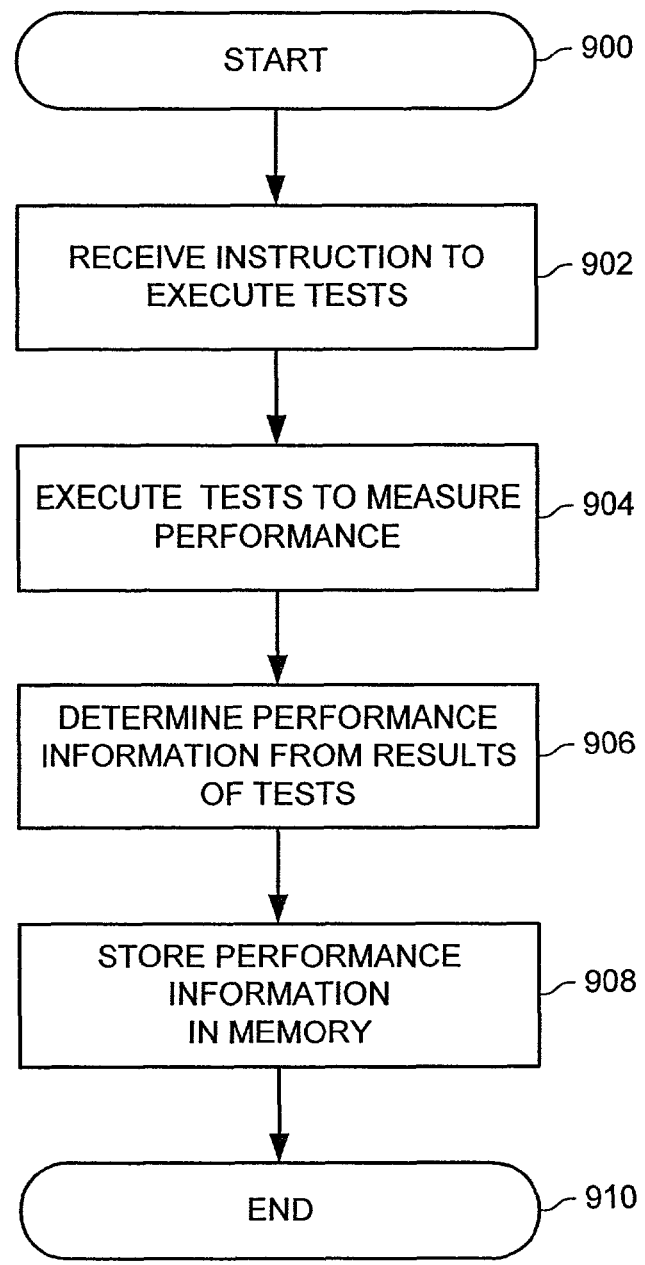
FIG. 9 is a flow chart for a sector probe in an example of the invention.

FIG. 9 is a flow chart for the sector probe 695 in an example of the invention. FIG. 9 begins in step 900. In step 902, the sector probe 695 receives an instruction to execute a plurality of tests. In step 904, the sector probe 695 then executes the plurality of the tests to measure the performance of the broadband wireless system 100. The sector probe 695 determines performance information from the results of the plurality of the tests in step 906. In step 908, the sector probe 695 stores the performance information in the memory 830. Any reporting system in the performance management system 700 can then retrieve the performance information. FIG. 9 ends in step 910.

FIGS. 10-13 disclose one embodiment of the invention, but the invention is not restricted to the configuration provided below. Those skilled in the art will appreciate numerous variations in a sector probe configuration and operation that are within the scope of the invention. Those skilled in the art will also appreciate how the principles illustrated in this example can be used in other examples of the invention. In this embodiment, the sector probe 695 measures the performance of the broadband wireless system 100 by simulating web surfing of the top ten websites, transferring files using File Transfer Protocol (FTP), and using a ping test to measure delay. Typically, there is one sector probe per sector, and a head end typically controls eight to ten sectors. With two head ends per market, there are between sixteen to twenty sector probes per market.

Figure 10:
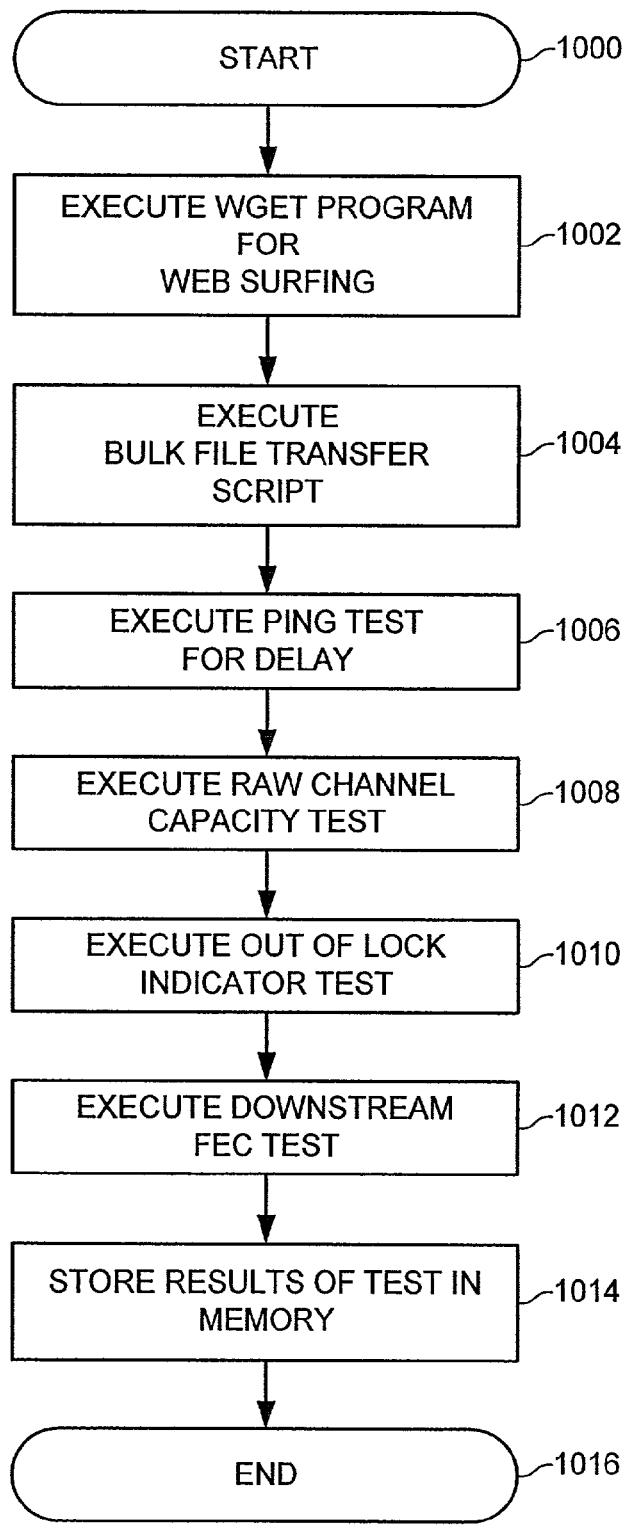
FIG. 10 is a flow chart for a sector probe with web surfing, file transfer protocol, and delay tests in an example of the invention.

FIG. 10 is a flow chart for the sector probe 695 with web surfing, FTP, and delay tests in an example of the invention. FIG. 10 begins in step 1000. The sector probe 695 receives and processes an instruction to execute a plurality of tests. In step 1002, the sector probe 695 executes a WGET program for web surfing. Step 1002 and the WGET program are discussed below in greater detail in FIG. 11. In step 1004, the sector probe 695 executes a bulk file transfer script. Step 1004 and the bulk file transfer script are discussed below in greater detail in FIG. 12. In step 1006, the sector probe 695 executes a ping test to measure delay. Step 1006 and the ping test are discussed below in greater detail in FIG. 13.

In step 1008, the sector probe 695 executes a raw channel capacity test. In this embodiment, the raw channel capacity test is a New Test TCP (NTTCP) program to simulate bit-error-rate testing over the wireless links 128 and 129. The NTTCP program is an open source software package that transmits a flood of unacknowledged packets over a link and measures the number of received packets versus the number of dropped or corrupted packets. The NTTCP program assists in determining the general condition of the wireless links 128 and 129.

In step 1010, the sector probe 695 executes an out of lock indicator test. The out of lock indicator test indicates the presence of a clean Quadrature Amplitude Modulation (QAM) signal. If the modem, within the wireless broadband router 690, goes out of lock, then there is an RF interference in the air or a bad component in a piece of the equipment. In step 1012, the sector probe 695 executes a downstream FEC test. The FEC test detects FEC errors that indicate dropped packets. In step 1014, the sector probe 695 stores the results of the tests of steps 1002-1012 in the memory 830. FIG. 10 ends in step 1016.

Figure 11:
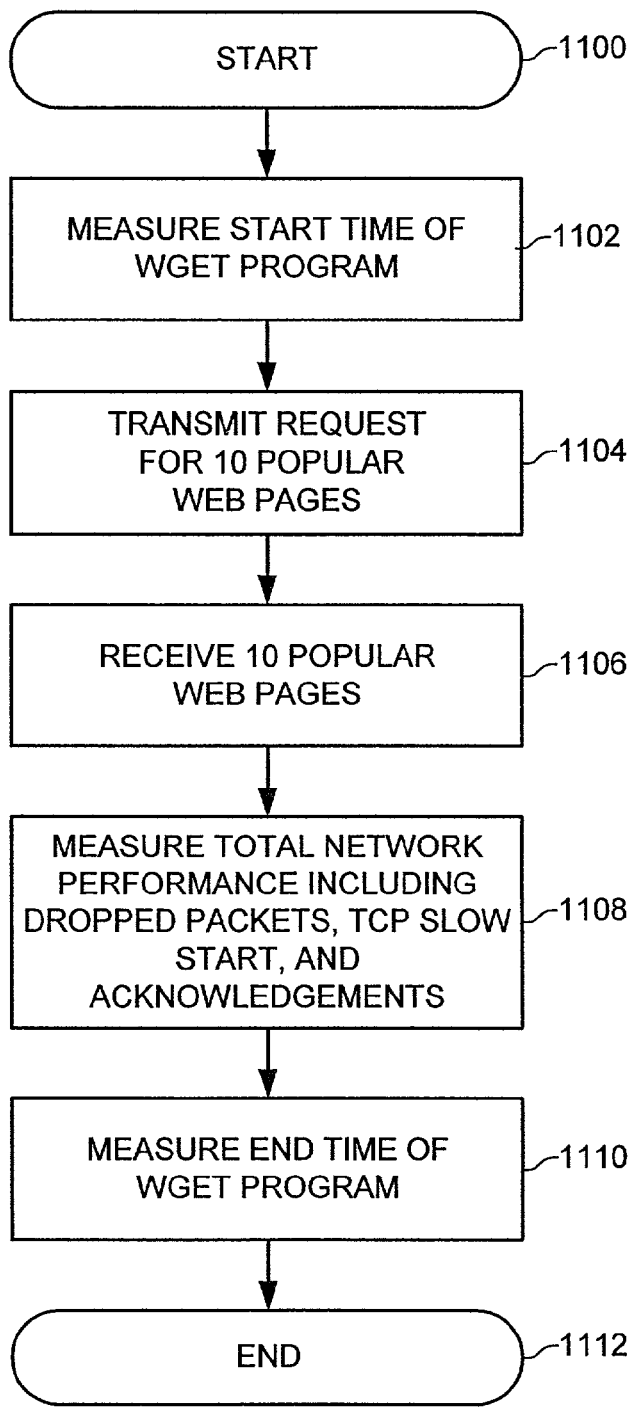
FIG. 11 is a flow chart for a sector probe for a web surfing test in an example of the invention.
Figure 45:
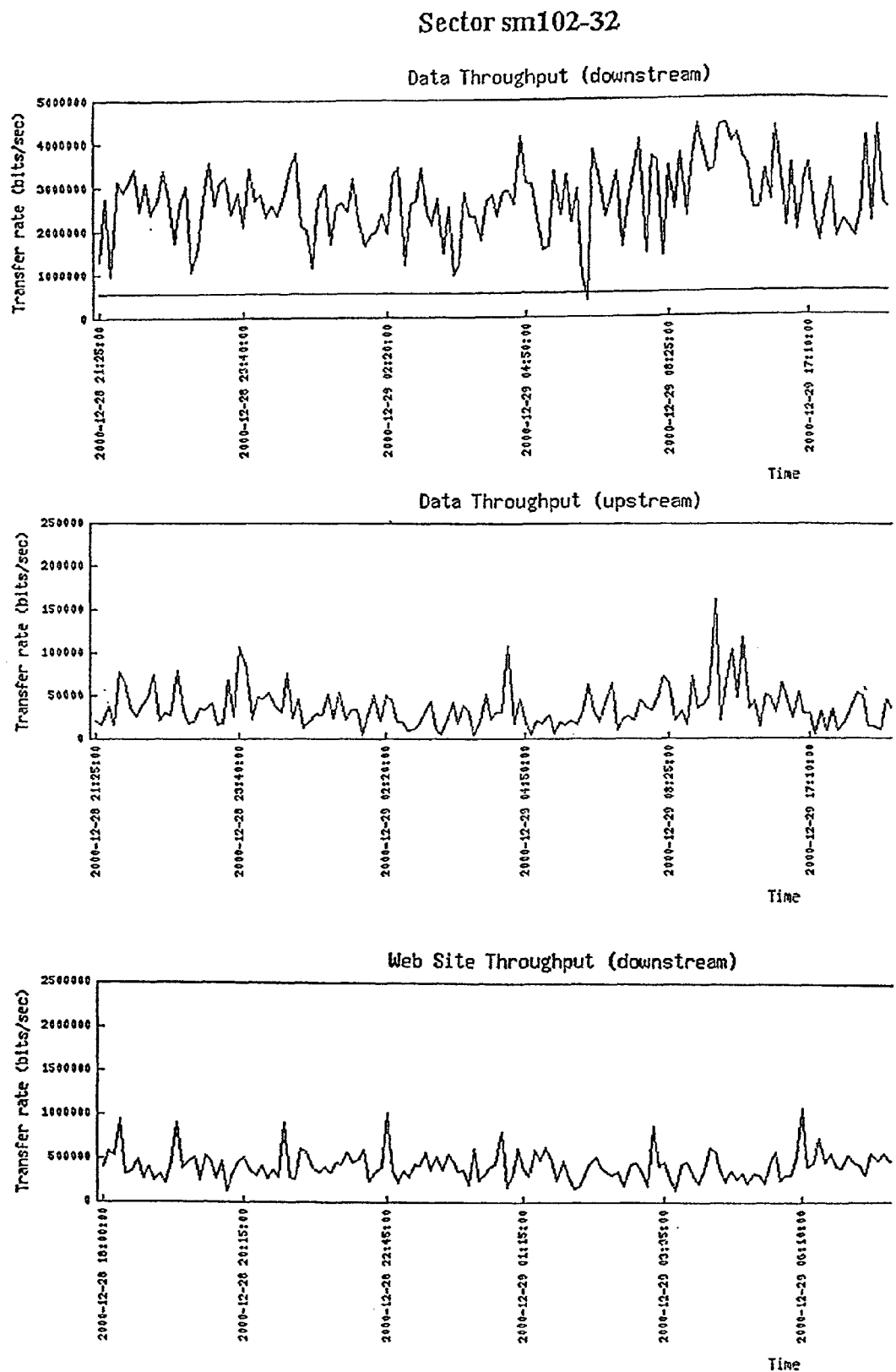
FIG. 45 is a sector probe web page in an example of the invention.

FIG. 11 is a flow chart for the sector probe 695 for a web surfing test in an example of the invention. FIG. 11 begins in step 1100. In step 1102, the sector probe 695 measures the start time of the WGET program. The WGET program is an open-source program used to transfer a single file over a HyperText Transfer Protocol (HTTP) connection from a server. In this embodiment, the sector probe 695 executes the WGET program for ten popular websites such as Yahoo, ESPN, and MSN. In step 1104, the sector probe 695 transmits a request for the ten popular web pages. In step 1106, the sector probe 695 receives the ten popular web pages. In step 1108, the sector probe 695 measures total network performance including delay, download speed, dropped packets, TCP slow start, and acknowledgements. One example of web throughput is shown in FIG. 45, which is discussed below. The sector probe 695 then measures the end time of the WGET program in step 1110. FIG. 11 ends in step 1112.

Figure 12:
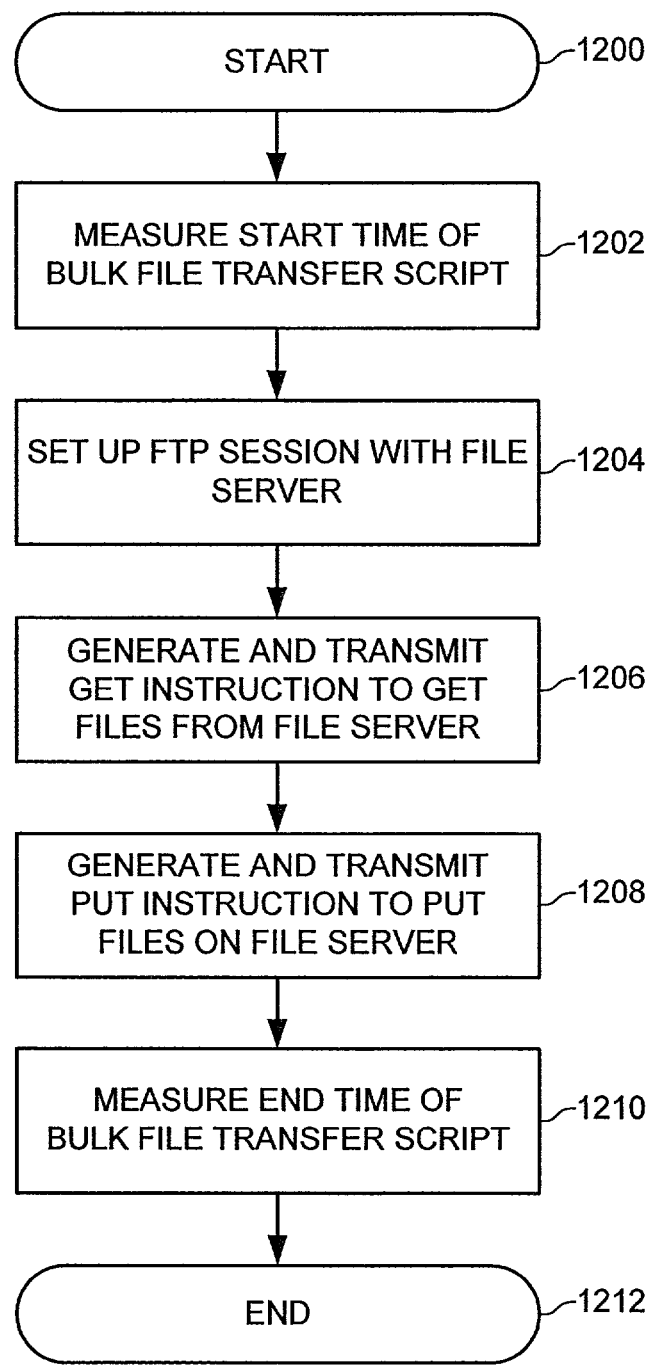
FIG. 12 is a flow chart for a sector probe for a bulk file transfer script in an example of the invention.

FIG. 12 is a flow chart for the sector probe 695 for a bulk file transfer script in an example of the invention. FIG. 12 begins in step 1200. In step 1202, the sector probe 695 measures the start time of the bulk file transfer script. The bulk file transfer script measures performance during transfer of bulk files. In step 1204, the sector probe 695 sets up an FTP session with a file server. In this embodiment, the sector probe 695 sets up the FTP session with the market performance management system 430. In step 1206, the sector probe 695 generates and transmits an instruction to get files from the file server. In this embodiment, a large file of 4 MB is retrieved. One example of downstream data throughput is shown in FIG. 45, which is discussed below. In step 1208, the sector probe 695 generates and transmits an instruction to put files on the file server. One example of upstream data throughput is shown in FIG. 45, which is discussed below. In step 1210, the sector probe 695 then measures the end time of the bulk file transfer script. FIG. 12 ends in step 1212.

Figure 13:
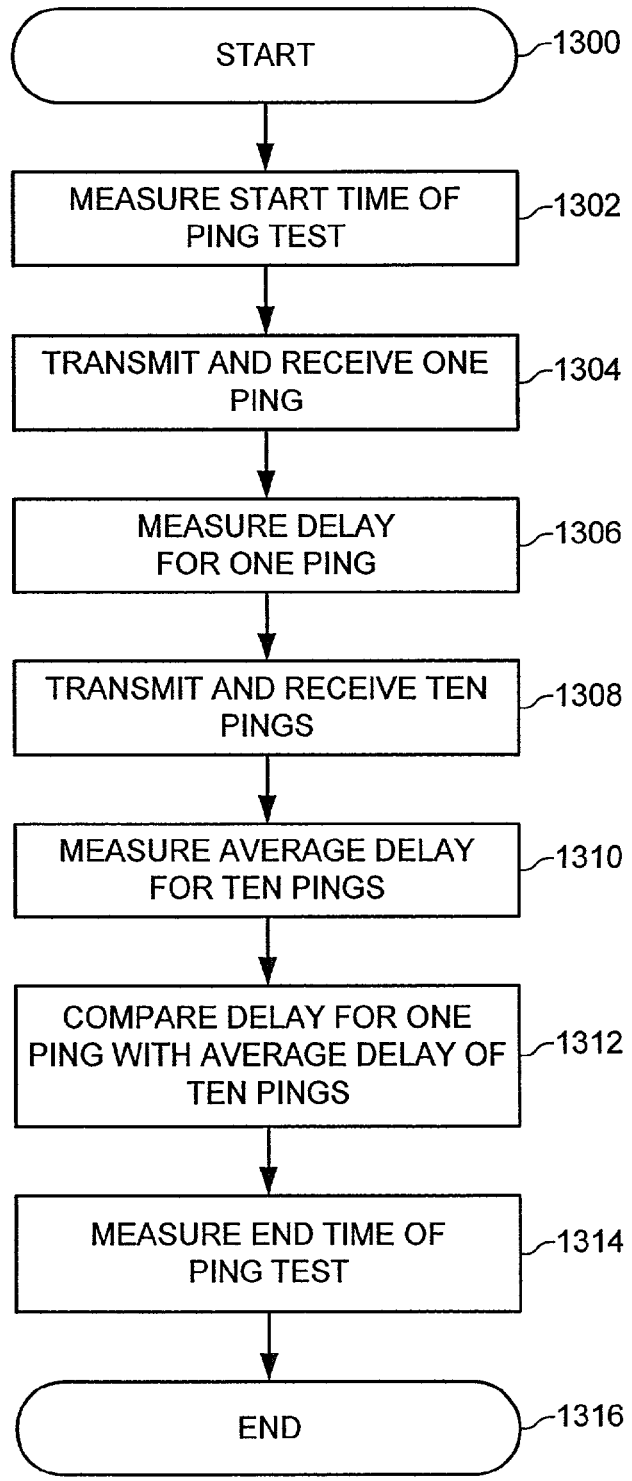
FIG. 13 is a flow chart for a sector probe for a ping test in an example of the invention.
Figure 46:
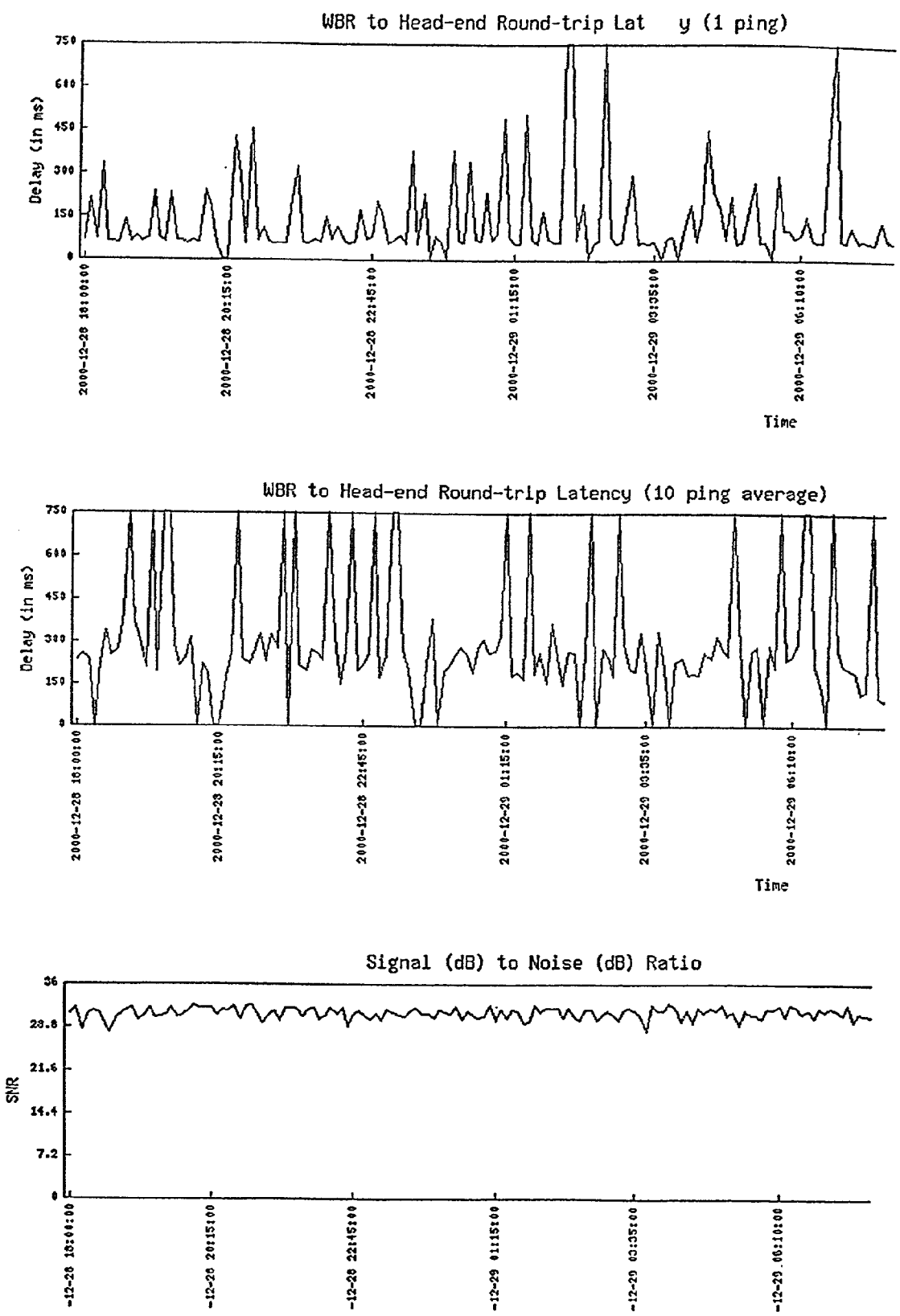
FIG. 46 is a sector probe web page in an example of the invention.

FIG. 13 depicts a flow chart for the sector probe 695 for a ping test in an example of the invention. FIG. 13 begins in step 1300. The ping test is a standard TCP/IP utility to measure the round trip time between two hosts. The ping test also can measure the time between two endpoints on a link and the average delay of packets on that link. This ping test transmits eleven pings at one-second intervals. In step 1302, the sector probe 695 measures the start time of the ping test. In step 1304, the sector probe 695 transmits and receives one ping. In step 1306, the sector probe 695 measures the delay of the one ping to measure the time to acquire a spot in a polling channel. This delay indicates the speed at which a transmission begins. A first ping is measured separately because the time to acquire a spot in the polling channel will be longer than future credit reception cycles. One example of delay for one ping is shown in FIG. 46, which is discussed below.

In step 1308, the sector probe 695 transmits and receives ten pings. In step 1310, the sector probe 695 measures the delays of the ten pings. The sector probe 695 determines the average delay of the ten pings to determine the average roundtrip time once the wireless broadband router 690 has been admitted to a polling group. This delay indicates the customer's experienced speed on most downstream transfers excluding the shortest downstream transfers. One example of the average delay for ten pings is shown in FIG. 46, which is discussed below. In step 1312, the sector probe 695 then compares the delay for the first ping with the average delay of the last ten pings. In step 1314, the sector probe 695 measures the end time of the ping test. FIG. 13 ends in step 1316.

Figure 14:
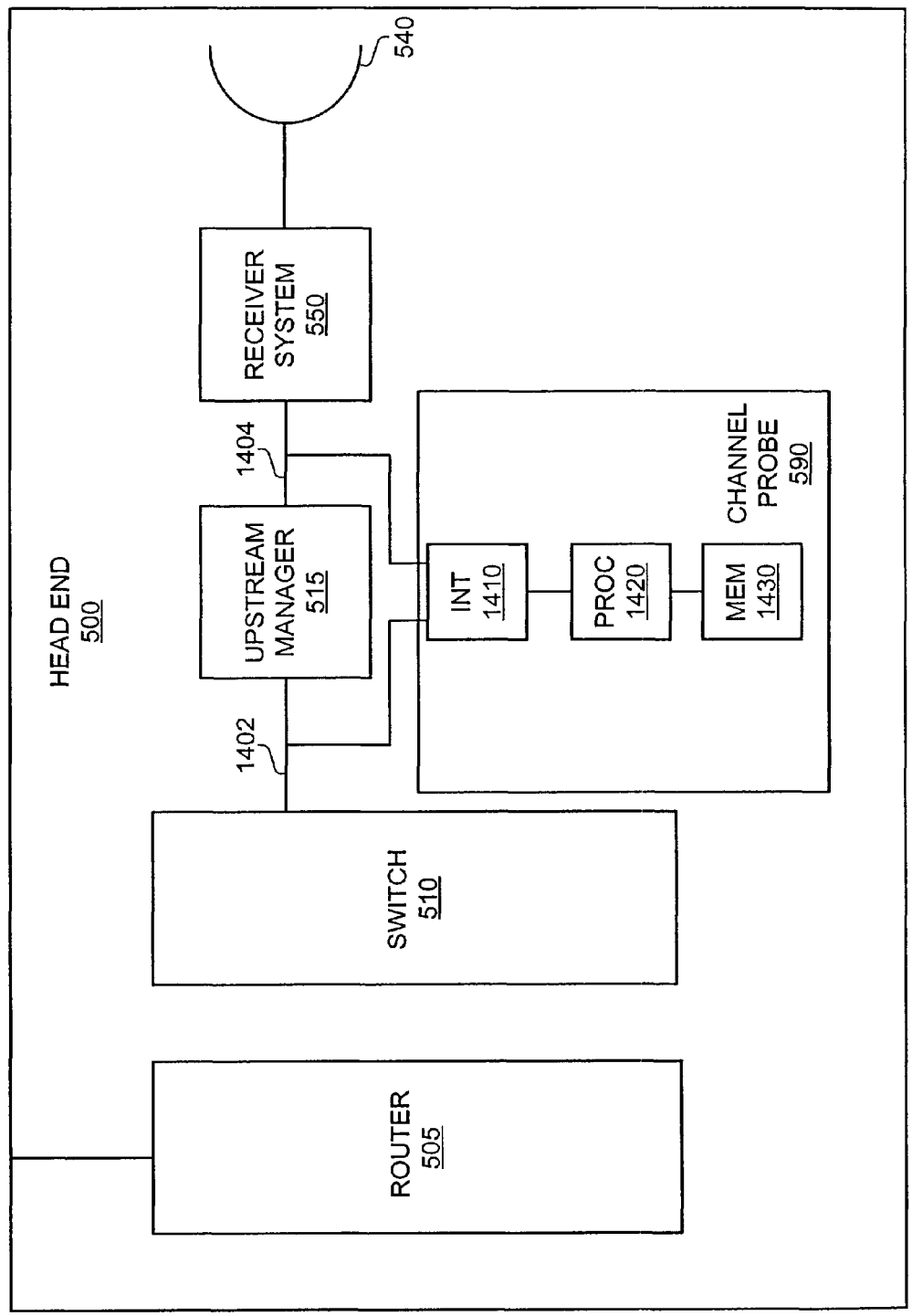
FIG. 14 is a block diagram of a head end with a channel probe in an example of the invention.
Figure 15:
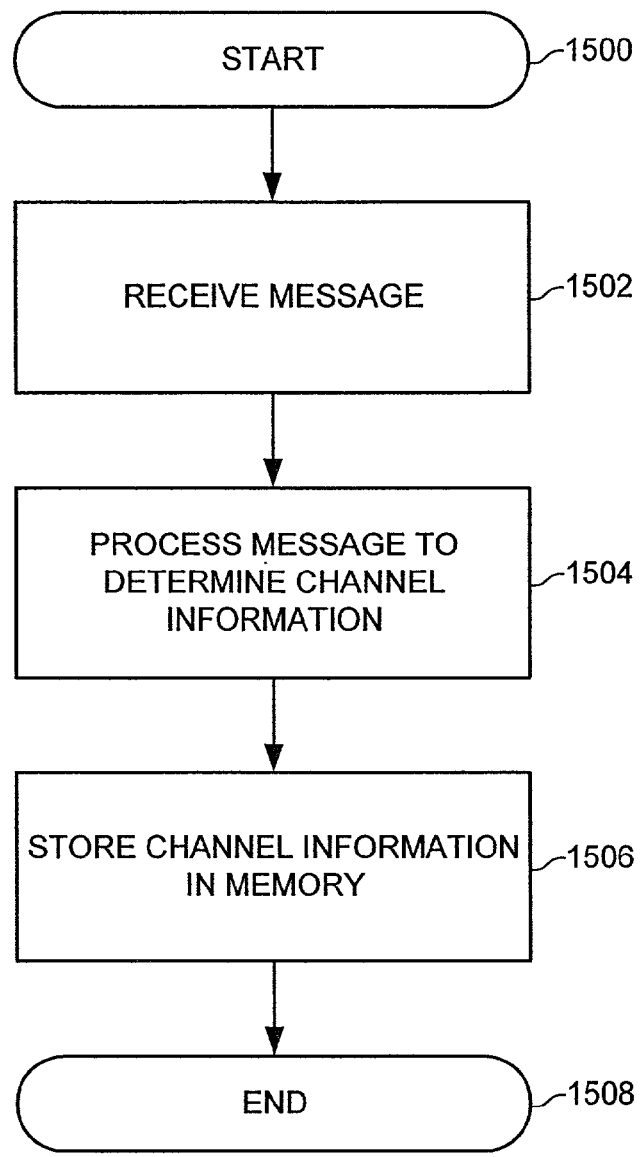
FIG. 15 is a flow chart of a channel probe in an example of the invention.
Figure 16:
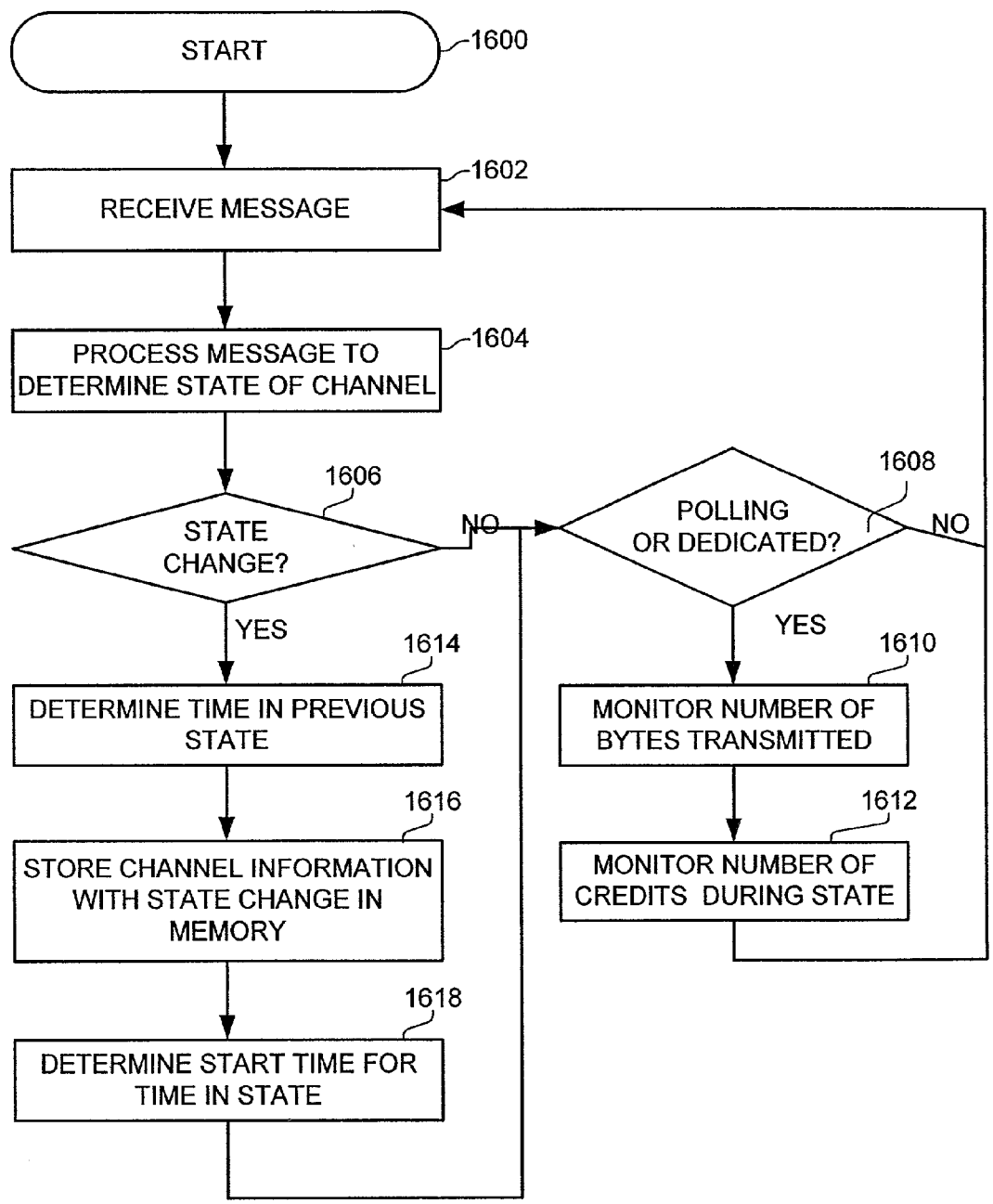
FIG. 16 is a flow chart of a channel probe with state changes in an example of the invention.

Channel Probe—FIGS. 14-16

Upstream managers and downstream managers in a broadband wireless system manage upstream and downstream channels, respectively. Unfortunately, the upstream managers and downstream managers do not historically track the channels and the information related to the channels. In the broadband wireless system 100, the upstream manager 515 manages the upstream channels by issuing credits and receiving DONE messages. In this embodiment, the state of the channels are idle, polling, dedicated, and contention. Unfortunately, the upstream manager 515 also does not historically track the states of the channels.

The channel probe 590 measures performance of the broadband wireless system 100. The channel probe 590 determines channel information of the broadband wireless system 100. Those skilled in the art will appreciate that performance information includes channel information. The channel information is any information related to the upstream or downstream channels in a communication network. Some examples of channel information are a per-user breakdown of the time in each channel, bytes transmitted in each channel, and protocol types used in each channel.

FIG. 14 is a block diagram that illustrates the head end 500 with the channel probe 590 in an example of the invention. The additional components in the head end 500 as shown in FIG. 5 are not shown in FIG. 14 for the sake of clarity in order to focus on the components related to the operation of the channel probe 590. The head end 500 includes the router 505, the switch 510, the upstream manager 515, the channel probe 590, the receiver system 550, and the base antenna 540. The channel probe 590 includes an interface 1410, a processor 1420, and a memory 1430. The router 505 is connected to the switch 510. The switch 510 is connected to the upstream manager 515 and the interface 1410 via link 1402. The upstream manager 515 is connected to the interface 1410 and the receiver system 550 via link 1404. The receiver system 550 is connected to the base antenna 540. The interface 1410 is connected to the processor 1420. The processor 1420 is connected to the memory 1430.

The operation of the channel probe 590 is discussed below in greater detail in FIGS. 15-16. The channel probe 590 is any communication device configured to (1) receive a message in the broadband wireless system 100, (2) process the message to determine channel information in the broadband wireless system 100, and (3) store the channel information in memory 1430. The message could be any instruction, data, message, or signaling that the channel probe 590 can determine channel information from. Some examples of messages are credits and DONE messages.

In one embodiment, the channel probe 590 is a computer with a 133 MHz motherboard, wherein the motherboard comprises an Intel Pentium III 933 MHz processor, a Seagate Barracuda 30 GB hard drive, a 50-X CD-ROM, a 3.5" floppy drive, an ATI OMB video graphics accelerator, and two 3COM PCI 10/100 network interfaces cards. The motherboard has 6 PCI expansion slots, an AGP slot, 4 USBs, 2 serial ports, and 1 parallel port. An EIDE controller is used for the peripheral drives. The motherboard also has 3 memory slots that supports PC100/PC133 SDRAM. In this embodiment, two 256 MB SIMMS total 512 MB RAM with one remaining slot for expansion to 768 MB. The channel probe 590 runs a Red Hat Linux version 6.2 as the operating system.

In this embodiment, the channel probe 590 is connected to the upstream manager 515 via the link 1402 and the link 1404. The channel probe 590 is connected to the switch 510 and the upstream manager 515 in order to receive a copy of messages, such as DONE messages, from the wireless broadband router 690 and the wireless broadband router 625. The channel probe 590 is connected to the upstream manager 515 and the receiver system 550 in order for the channel probe 590 to receive a copy of messages, such as credits, issued from the upstream manager 515. By receiving a copy of messages such as DONE messages and credits, the channel probe 590 can recreate the states of channels from idle, contention, polling, and dedicated states.

FIG. 15 is a flow chart for the channel probe 590 in an example of the invention. FIG. 15 begins in step 1500. In step 1502, the channel probe 590 receives a message. In one example, the message is a DONE message from the wireless broadband router 625 via the downstream manager 520 and the switch 510. In another example, the message is a credit from the upstream manager 515 that is being issued to one of the wireless broadband routers 625 or 690. The message received by the channel probe 590 could be the actual message or a copy of the actual message. In different embodiments, the message could be copied by the switch 510, the upstream manager 515, the channel probe 590, or any device that has access to the message. Also, in different embodiments, the channel probe 590 is situated in the broadband wireless system 100 where the channel probe 590 can have access to messages that can determine the channel information.

In step 1504, the channel probe 590 processes the message to determine channel information. The channel probe 590 then stores the channel information in the memory 1430 in step 1506. FIG. 15 ends in step 1508.

FIG. 16 discloses one embodiment of the invention, but the invention is not restricted to the configuration provided below. Those skilled in the art will appreciated numerous variations in a channel probe configuration and operation that are within the scope of the invention. Those skilled in the art will also appreciate how the principles illustrated in this example can be used in other examples of the invention. In this embodiment, the channel probe 590 measures the performance of the broadband wireless system 100 by tracking the state changes of the channel.

FIG. 16 is a flow chart for the channel probe 590 with state changes in an example of the invention. FIG. 16 begins in step 1600. In step 1602, the channel probe 590 receives a message. In step 1604, the channel probe 590 then processes the message to determine the state that the channel is in. The channel probe 590 determines the channel and the state from the message. The channel probe 590 then determines whether a state change has occurred in step 1606. If a state has not occurred, the channel probe proceeds to step 1608.

In step 1608, the channel probe 590 determines whether the state is polling or dedicated. If the state is not polling or dedicated, the channel probe 590 returns to step 1602. If the state is polling or dedicated, the channel probe 590 monitors the number of bytes transmitted during the state in step 1610. In step 1612, the channel probe 590 monitors the number of credits issued during the state before returning to step 1602.

If a state change has occurred, the channel probe 590 determines the time in the previous state in step 1614. The channel probe 590 then stores the channel information such as the state change, number of bytes transmitted during the state, number of credits during the state, and time in state in the memory 1430 in step 1616. The channel probe 590 then determines the start time of the new state in step 1618. The channel probe 590 then returns to step 1608.

Figure 17:
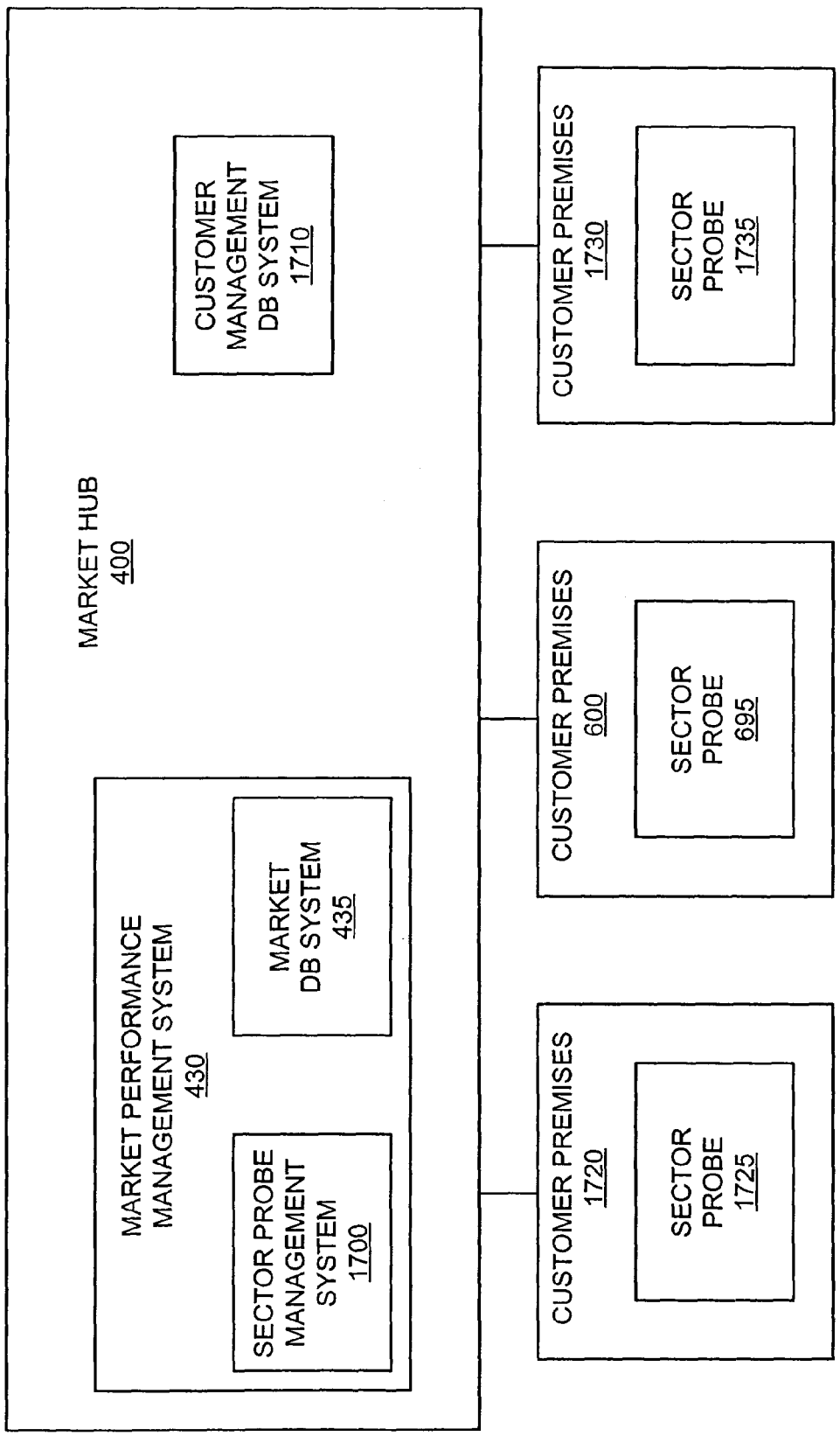
FIG. 17 is a block diagram of a market hub with customer premises for sector probe management in an example of the invention.
Figure 18:
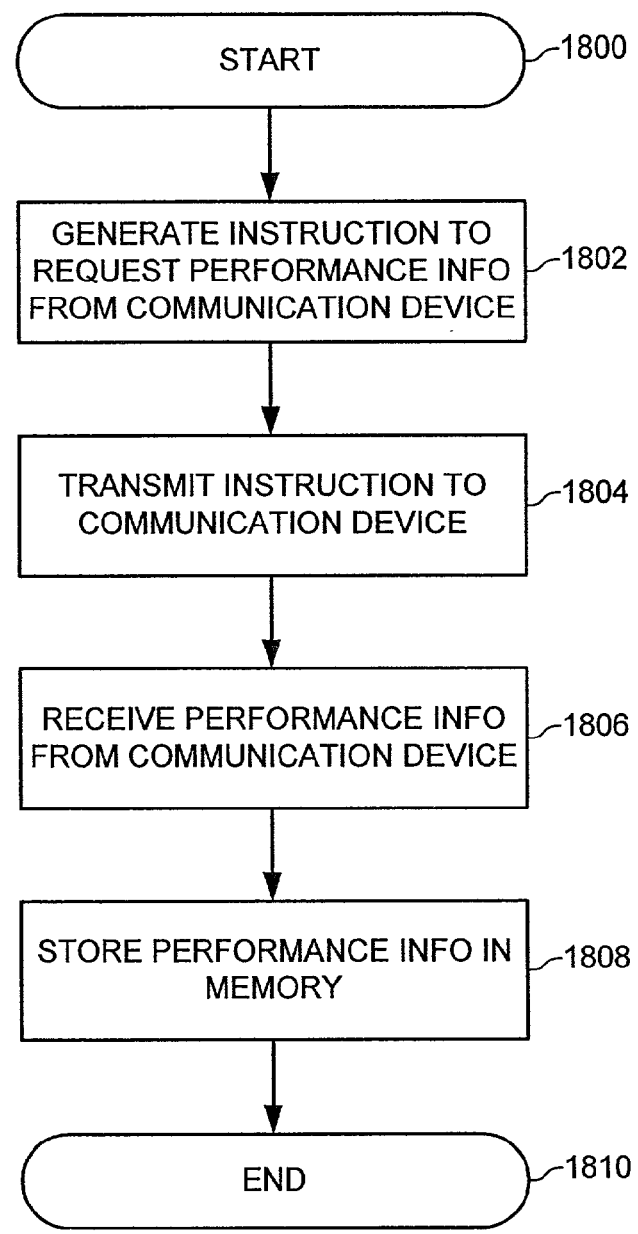
FIG. 18 is a flow chart of a sector probe management system in an example of the invention.
Figure 19:
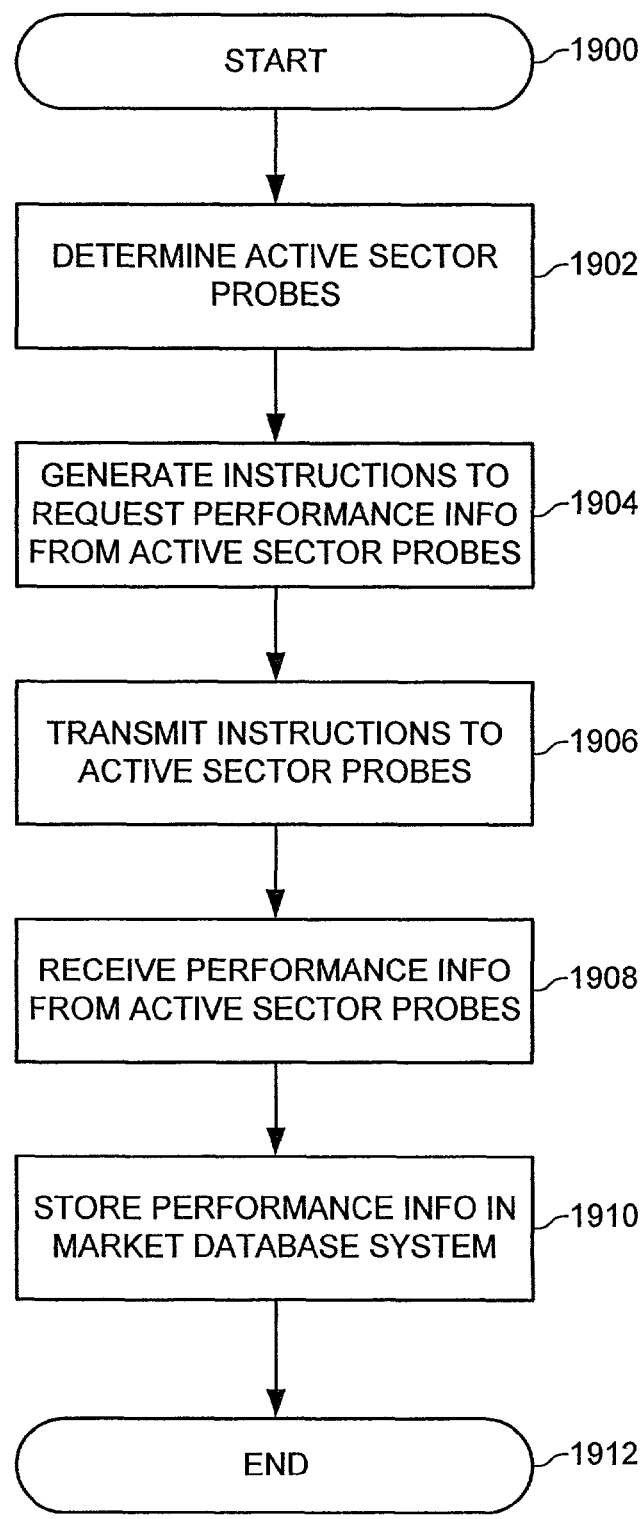
FIG. 19 is a flow chart of a sector probe management system for active sector probes in an example of the invention.

Sector Probe Management—FIGS. 17-19

FIGS. 17-19 disclose a sector probe management system that polls the sector probes in the customer areas for performance information. The sector probe management system then stores the performance information in a memory in the sector probe management system so other systems, such as performance management systems or fault management systems, can access the performance information.

FIG. 17 is a block diagram that illustrates a market hub 400 connected to customer premises' for sector probe management in an example of the invention. The additional components of the market hub 400 and the customer premises 600 as shown in FIGS. 4 and 6 are not shown in FIG. 17 for the sake of clarity in order to focus on the components related to the operation of the sector probe management. Also, there are numerous customer premises' and sector probes in the broadband wireless system 100 that are not shown in FIG. 17 for the sake of clarity. The market hub 400 includes the market performance management system 430 and a customer management database system 1710. The market performance management system 430 includes a sector probe management system 1700 and the market database system 435. Customer premises 1720 includes a sector probe 1725. The customer premises 600 includes the sector probe 695. Customer premises 1730 includes a sector probe 1735. The market hub 400 is connected to the customer premises 1720, the customer premises 600, and the customer premises 1730.

The sector probe management system 1700 is any system configured to (1) generate an instruction to request performance information of the broadband wireless system 100 from a communication device in a customer area, (2) transmit the instruction to the communication device, (3) receive the performance information from the communication device, and (4) store the performance information in memory. The performance information is information that describes how a communication network is operating. Some examples of the performance information are FEC blocks, FEC correctable percentage, SNR, number of bytes transmitted, activity ratios, and bits per second. In one embodiment, the communication device is the sector probe 695 and the memory is the market database system 435.

FIG. 18 is a flow chart for the sector probe management system 1700 in an example of the invention. FIG. 18 begins in step 1800. In step 1802, the sector probe management system 1700 generates an instruction to request performance information of the broadband wireless system 100 from a communication device in a customer area. In step 1804, the sector probe management system 1700 transmits the instruction to the communication device. In step 1806, the sector probe management system 1700 receives the performance information from the communication device. In step 1808, the sector probe management system 1700 stores the performance information in memory. FIG. 18 ends in step 1810.

FIG. 19 discloses one embodiment of the invention, but the invention is not restricted to the configuration provided below. Those skilled in the art will appreciate numerous variations in a sector probe management system configuration and operation that are within the scope of the invention. Those skilled in the art will also appreciate how the principles illustrated in this example can be used in other examples of the invention.

FIG. 19 is a flow chart for the sector probe management system 1700 to control active sector probes in an example of the invention. FIG. 19 begins in step 1900. In step 1902, the sector probe management system 1700 determines which sector probes are active for polling in the broadband wireless system 100. In this embodiment, the sector probe management system 1700 polls the active sector probes for performance information. In another embodiment, the sector probe management system 1700 retrieves the performance information from the sector probes on a request basis. For example, a user requests the performance information from the sector probe management system 1700 for real-time or near-real-time information.

In step 1904, the sector probe management system 1700 generates instructions to request performance information of the broadband wireless system 100 from the active sector probes. The sector probe management system 1700 transmits the instructions to the active sector probes in step 1906. In step 1908, the sector probe management system 1700 receives the performance information from the active sector probes. The sector probe management system 1700 stores the performance information in the market database system 435 in step 1910. FIG. 19 ends in step 1912.

Figure 20:
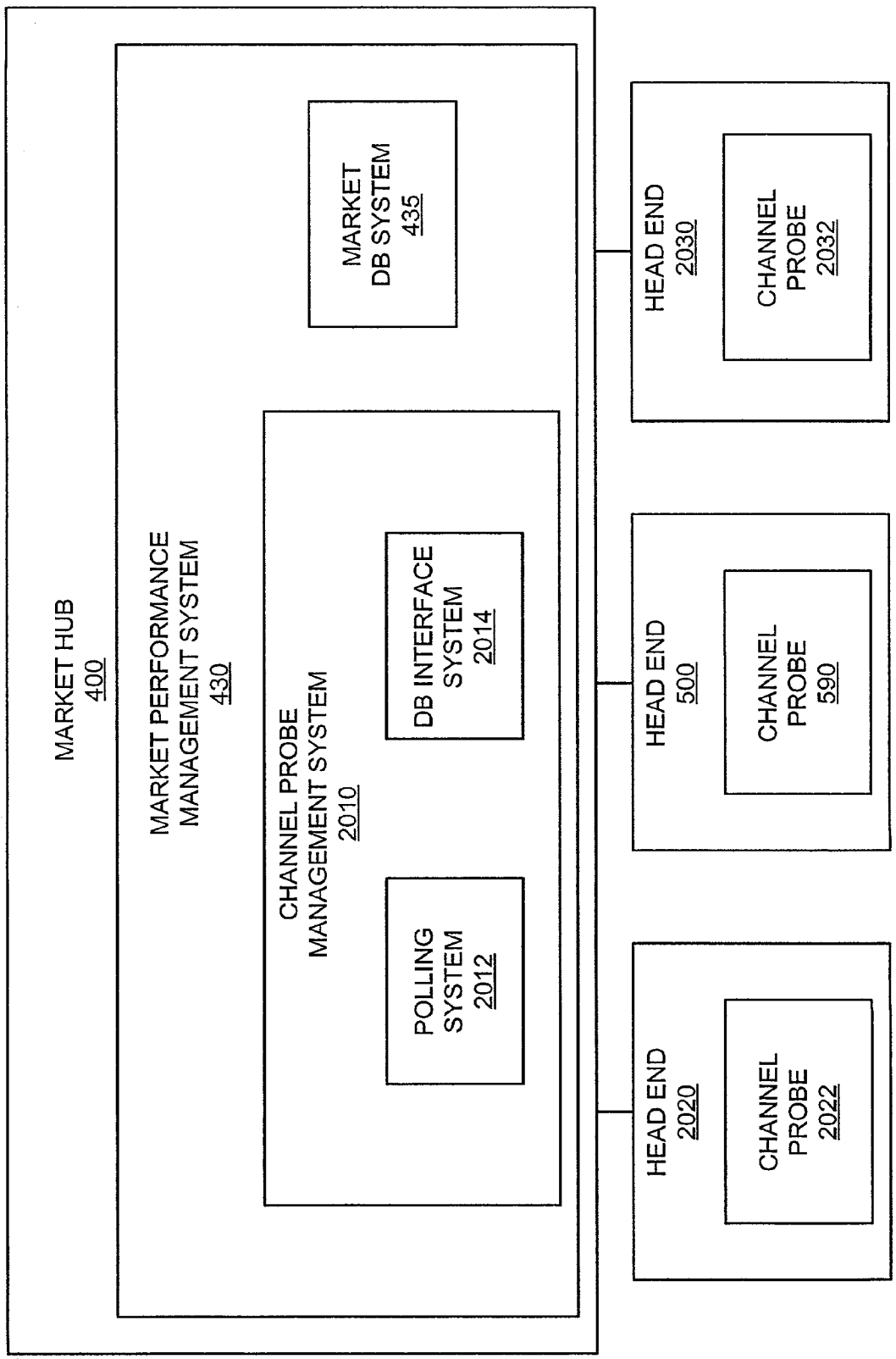
FIG. 20 is a block diagram of a market hub with head ends for channel probe management in an example of the invention.
Figure 21:
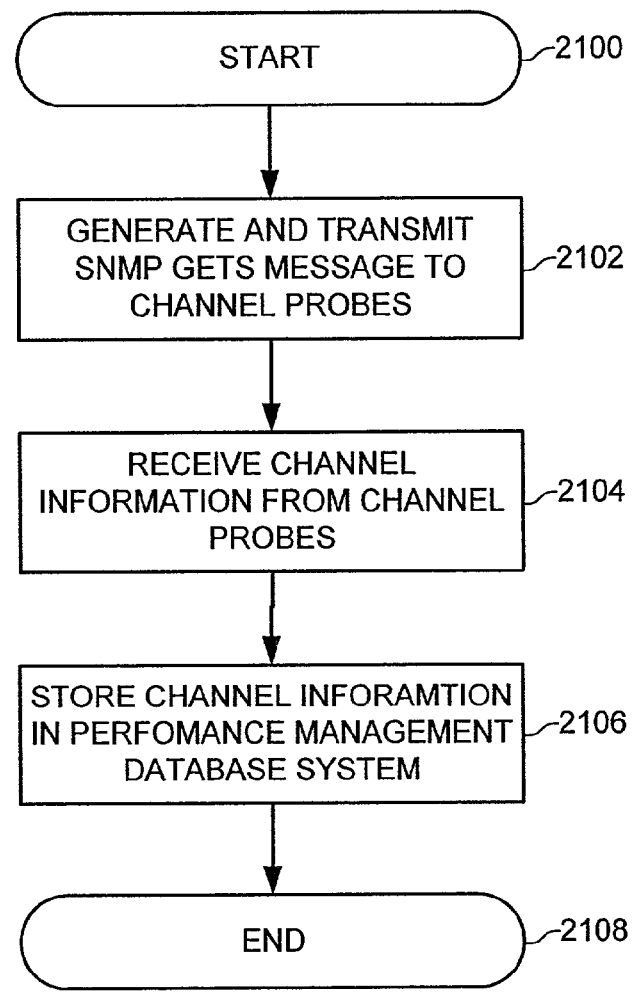
FIG. 21 is a flow chart of a channel probe management system in an example of the invention.

Channel Probe Management—FIGS. 20-21

FIGS. 20-21 disclose a channel probe management system that polls the channel probes for channel information. The channel probe management system then stores the channel information in the memory in the channel probe management system so other systems, such as performance management systems or fault management systems, can access the channel information.

FIG. 20 is a block diagram illustrating the market hub 400 connected to multiple head ends for channel probe management in an example of the invention. The additional components of the market hub 400 and the head end 500 as shown in FIGS. 4 and 5 are not shown in FIG. 20 for the sake of clarity in order to focus on the components related to the operation of the channel probe management. Also, there are numerous head ends and channel probes in the broadband wireless system 100 but are not shown in FIG. 20 for the sake of clarity. The market hub 400 includes the market performance management system 430. The market performance management system 430 includes a channel probe management system 2010 and the market database system 435. The channel probe management system 2010 includes a polling system 2012 and a database interface system 2014. A head end 2020 includes a channel probe 2022. The head end 500 includes the channel probe 590. The head end 2030 includes the channel probe 2032. The market hub 400 is connected to the head end 2020, the head end 500, and the head end 2030.

The channel probe management system 2010 is any system configured to (1) generate an instruction to request channel information from a communication device in the broadband wireless system 100, (2) transmit the instruction to the communication device, (3) receive the channel information from the communication device, and (4) store the channel information in memory.

FIG. 21 is a flow chart for the channel probe management system 2010 in an example of the invention. FIG. 21 begins in step 2100. In step 2102, the channel probe management system 2010 generates and transmits an instruction to request channel information to a communication device in the broadband wireless system 100. In this embodiment, the communication device is the channel probe 590 and the instruction is an SNMP gets message. In step 2104, the channel probe management system 2010 receives the channel information from the channel probe 590. In step 2106, the channel probe management system 2010 stores the channel information in the market database system 435. FIG. 21 ends in step 2108.

Figure 22:
FIG. 22 is a block diagram of a remote monitoring (RMON) system in the prior art.
Figure 23:
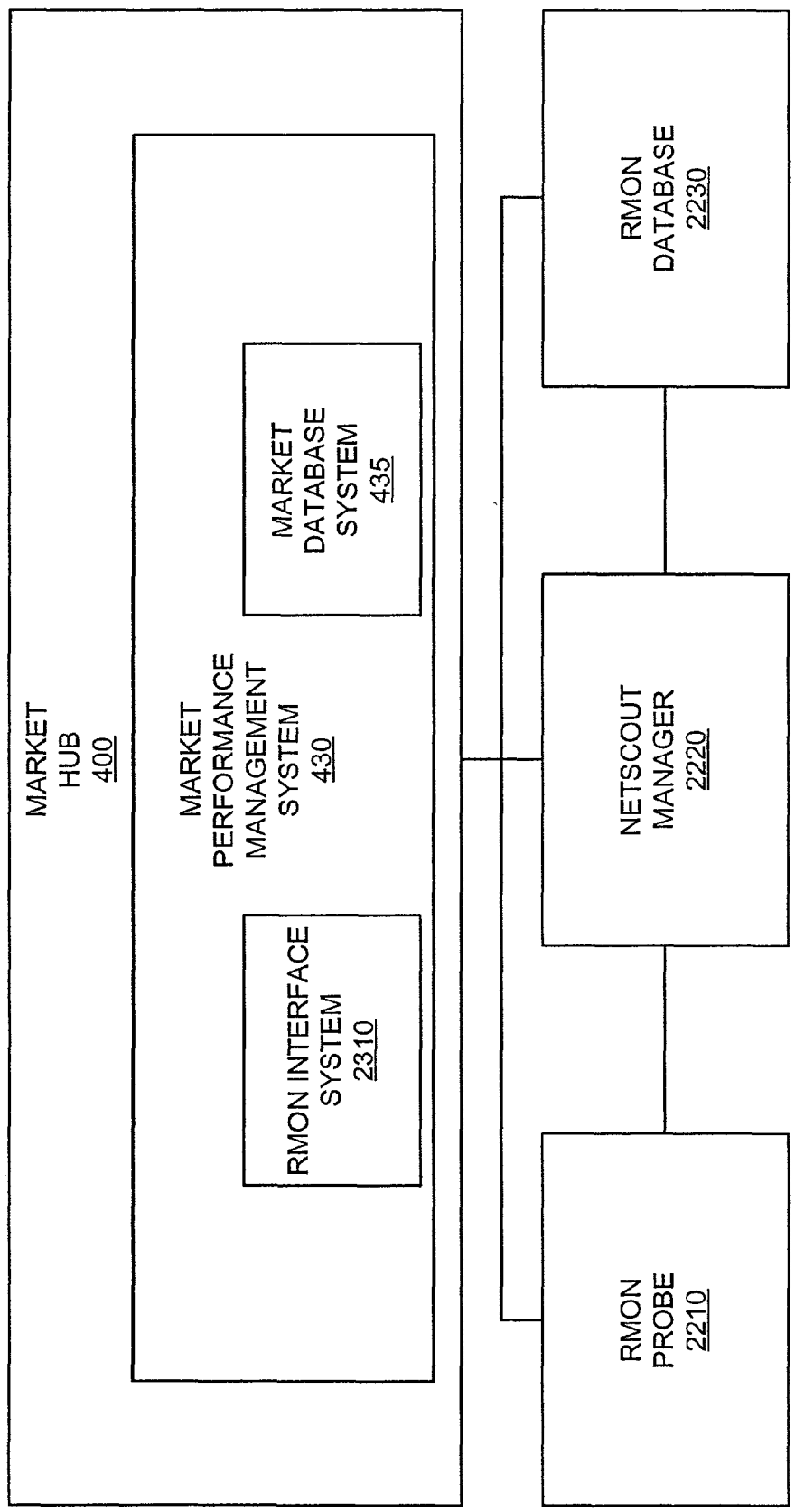
FIG. 23 is a block diagram of a market hub with an RMON system in an example of the invention.
Figure 24:
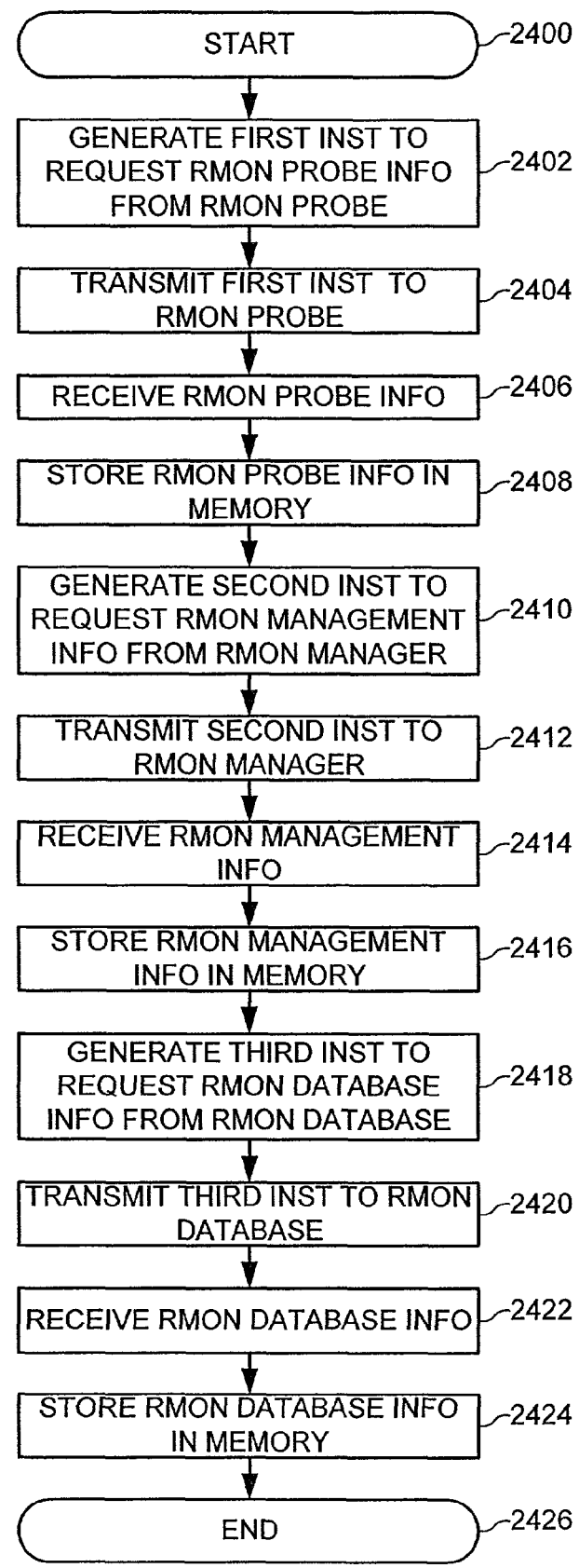
FIG. 24 is a flow chart of the RMON interface system in an example of the invention.

Remote Monitoring (RMON) Probe Management—FIGS. 22-24

FIG. 22 is a block diagram that illustrates an RMON system in the prior art. An RMON probe 2210 is connected to a NetScout Manager 2220. The NetScout Manager 2220 is connected to the RMON database 2230. The RMON probe 2210 is comprised of a tap and the probe server. The tap is a type of Gigabyte Ethernet repeater. The probe server is connected to the tap and listens to the traffic passing over the wire. The probe server stores the RMON probe information including RMON statistics. The NetScout Manager 2220 then accesses the raw RMON probe information. The NetScout Manager 2220 communicates with the probe server via a 10 MB Ethernet side-band data connection. The NetScout Manager 2220 generates and stores RMON management information. The RMON database 2230 also stores RMON database information.

Unfortunately, the performance systems do not have access to the information in the RMON probe 2210, the NetScout Manager 2220, and the RMON database 2230. Thus, performance systems at the market, regional, and national levels do not use RMON information for evaluating the performance of a communication network.

FIGS. 23 and 24 show one embodiment for RMON probe management in an example of the invention. An RMON interface system retrieves RMON information from the different RMON systems, such as the RMON probe, the NetScout Manager, and the RMON database. The RMON interface system then stores the RMON information in a database to provide access to the RMON information for other performance systems.

FIG. 23 a block diagram that illustrates the market hub 400 that includes an RMON system in an example of the invention. The market hub 400 includes the market performance management system 430. The market performance management system 430 includes an RMON interface system 2310 and the market database system 435. The market hub 400 is connected to an RMON probe 2210, a NetScout Manager 2220, and a RMON database 2230. The RMON probe 2210 is connected to the NetScout Manager 2220. The NetScout Manager 2220 is connected to the RMON database 2230.

FIG. 24 is a flow chart for the RMON interface system 2310 in an example of the invention. FIG. 24 begins in step 2400. In step 2402, the RMON interface system 2310 generates a first instruction to request RMON probe information from the RMON probe 2210. In step 2404, the RMON interface system 2310 transmits the first instruction to the RMON probe 2210. In step 2406, the RMON interface system 2310 receives the RMON probe information. The RMON interface system 2310 stores the RMON probe information in memory in step 2408. In this embodiment, the RMON interface system 2310 stores the RMON probe information in the market database system 435.

In step 2410, the RMON interface system 2310 generates a second instruction to request RMON management information from an RMON manager. In this embodiment, the RMON manager is the NetScout Manager 2220. In step 2412, the RMON interface system 2310 transmits the second instruction to the RMON Manager. In step 2414, the RMON interface system 2310 receives the RMON management information. The RMON interface system 2310 stores the RMON management information in memory in step 2416. In this embodiment, the RMON interface system 2310 stores the RMON management information in the market database system 435.

In step 2418, the RMON interface system 2310 generates a third instruction to request RMON database information from the RMON database 2230. In step 2420, the RMON interface system 2310 transmits the third instruction to the RMON database 2230. In step 2422, the RMON interface system 2310 receives the RMON database information. In step 2424, the RMON interface system 2310 stores the RMON database information in memory. In this embodiment, the RMON interface system 2310 stores the RMON database information in the market database system 435. FIG. 24 ends in step 2426.

Reporting System—FIGS. 25-48

The performance management systems in the broadband wireless system 100 provide the user with the performance information in a graphical format. The graphical format could be any user-friendly presentation such as reports, screens, and web pages. The performance management system performs various functions to provide the performance information such as interfacing with the user, retrieving performance information, polling probes for performance information, calculating performance information, and generating a graphical format of the performance information.

FIGS. 25-48 disclose one embodiment of the invention, but the invention is not restricted to the configuration provided below. Those skilled in the art will appreciate numerous variations in a performance management system configuration and operation that are within the scope of the invention. Those skilled in the art will also appreciate how the principles illustrated in this example can be used in other examples of the invention. In this embodiment, the performance management system in the broadband wireless system 100 is multi-level at a national, regional, and market level. Each performance management system may perform the same reporting functions as the other performance management system in the same or different level. In the embodiment in FIGS. 25-48, the market performance management system 430 performs the reporting functions. The performance management systems may comprise separate systems for the various functions such as an Apache web server, the market reporting system 440, the regional reporting system 340, or the national reporting system 240 to handle the user interface. However, for this embodiment, one market performance management system 430 performs all the reporting functions.

Figure 25:
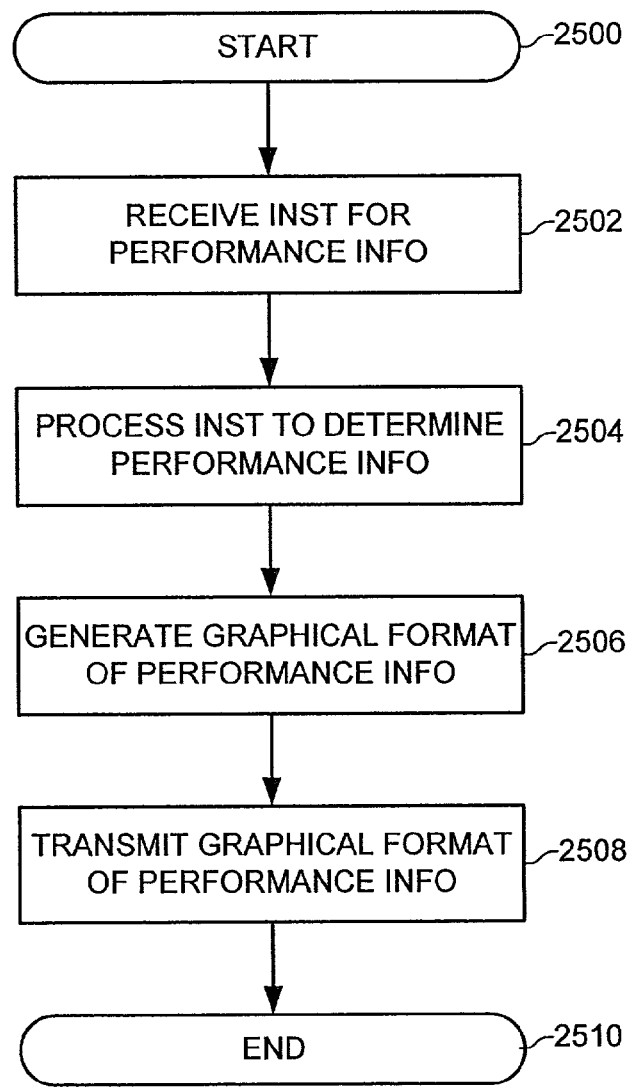
FIG. 25 is a flow chart of a market performance management system in an example of the invention.

FIG. 25 is a flow chart for the market performance management system 430 in an example of the invention. FIG. 25 begins in step 2500. In step 2502, the market performance management system 430 receives an instruction, including parameters, for the performance information from a user system. In step 2504, the market performance management system 430 processes the instruction, including the parameters, to determine the performance information. The market performance management system 430 generates a graphical format of the performance information in step 2506. The market performance management system 430 transmits the graphical format of the performance information of the user system in step 2508. FIG. 25 ends in step 2510.

Figure 26:
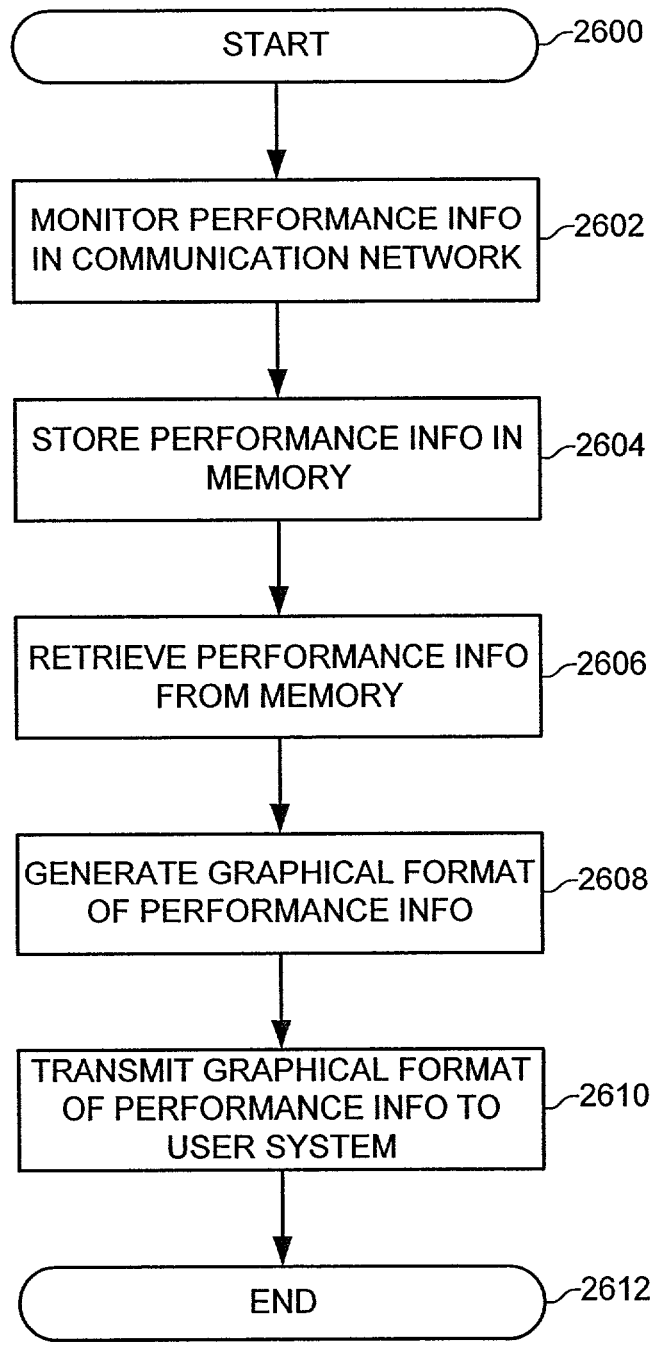
FIG. 26 is a flow chart of a market performance management system with monitoring performance information in an example of the invention.

FIG. 26 is a flow chart for the market performance management system 430 for monitoring performance information in an example of the invention. FIG. 26 begins in step 2600. In step 2602, the market performance management system 430 monitors performance information in a communication network. In step 2604, the market performance management system 430 stores the performance information in a memory. In step 2606, the market performance management system 430 retrieves the performance information from the memory. In step 2608, the market performance management system 430 generates a graphical format of the performance information. In step 2610, the market performance management system 430 transmits the graphical format of the performance information to a user system. FIG. 26 ends in step 2612.

Figure 27:
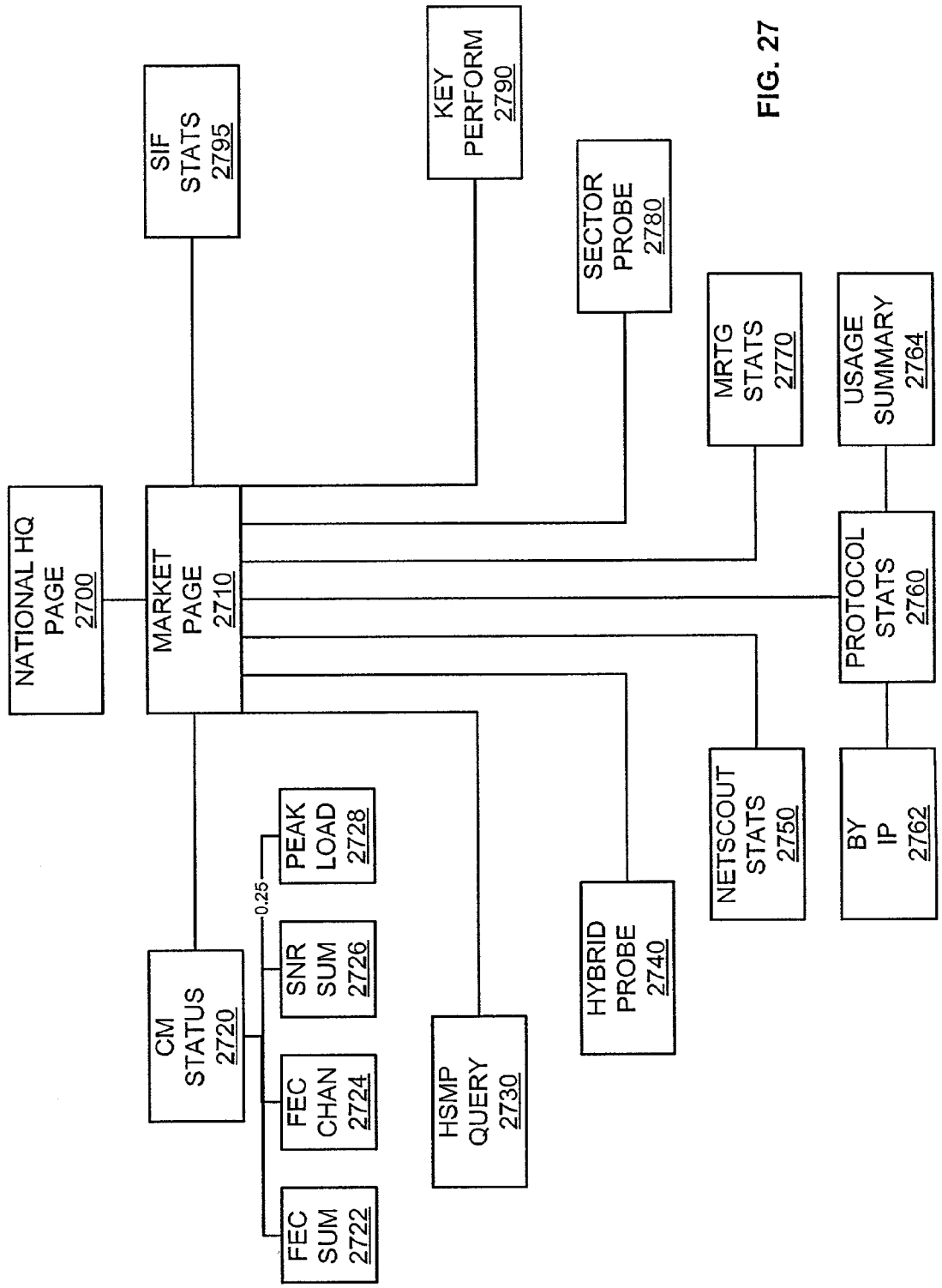
FIG. 27 is a map of web pages of a performance management system in an example of the invention.

FIG. 27 is a block diagram that illustrates a map of web pages of the performance management system in an example of the invention. A national headquarter page 2700 is connected to a market page 2710. The market page 2710 is connected to a Cyber Manager (CM) status page 2720, a Hybrid System Management Protocol (HSMP) query page 2730, a hybrid probe page 2740, a NetScout statistics page 2750, a protocol statistics page 2760, a Multi Router Traffic Grapher (MRTG) statistics page 2770, a sector probe page 2780, a key performance page 2790, and a SIF statistics page 2795. The CM status page 2720 is connected to an FEC summary page 2722, an FEC channel page 2724, an SNR summary page 2726, and a peak/load capacity page 2728. The protocol statistics page 2760 is connected to a protocol statistics by IP page 2762 and a usage summary page 2764. The web pages are discussed in greater detail below in FIGS. 31-48.

Figure 28:
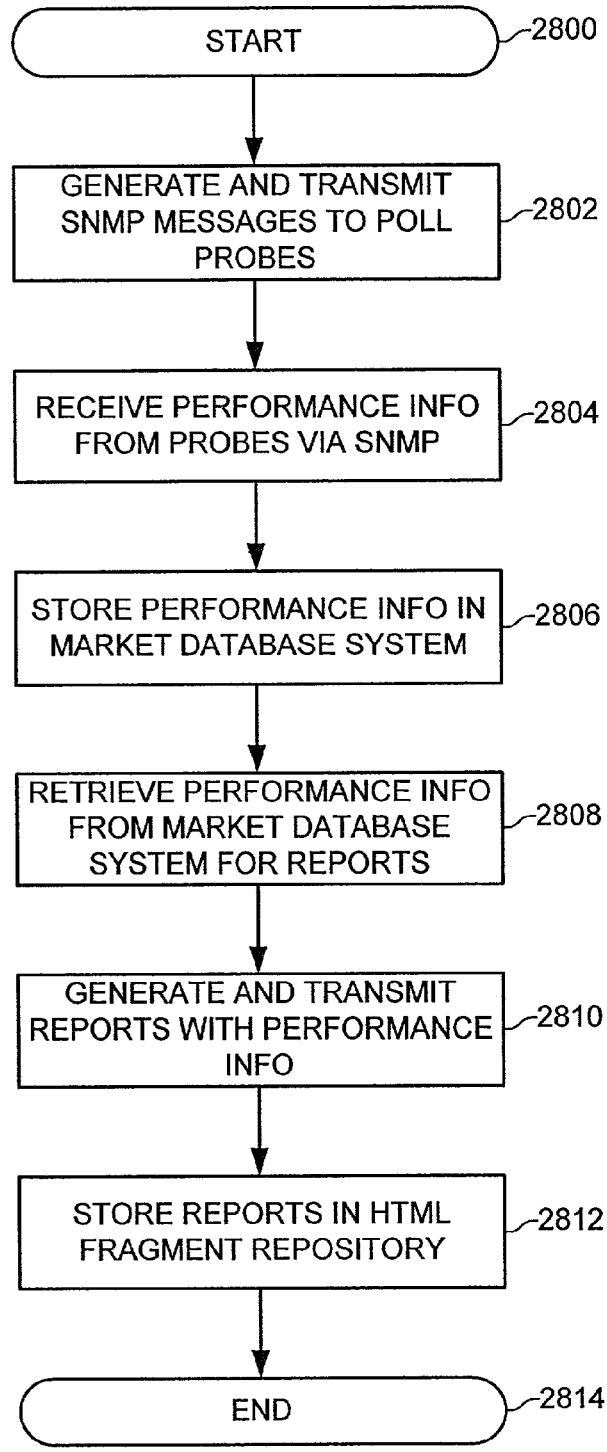
FIG. 28 is a flow chart of a market performance management system for polling all probes in an example of the invention.

FIG. 28 is a flow chart for the market performance management system 430 for polling probes in an example of the invention. FIG. 28 begins in step 2800. In step 2802, the market performance management system 430 generates and transmits a Simple Network Management Protocol (SNMP) message to poll the probes for performance information. The market performance management system 430 then receives the performance information from the probes via SNMP in step 2804. In step 2806, the market performance management system 430 stores the performance information in the market database system 435. In step 2808, the market performance management system 430 retrieves the performance information from the market database system 435 for generating reports. In step 2810, the market performance management system 430 generates and transmits reports in HTML with the performance information. The market performance management system 430 then stores the reports in an HTML fragment repository to be used for future reports in step 2812. FIG. 28 ends in step 2814.

Figure 29:
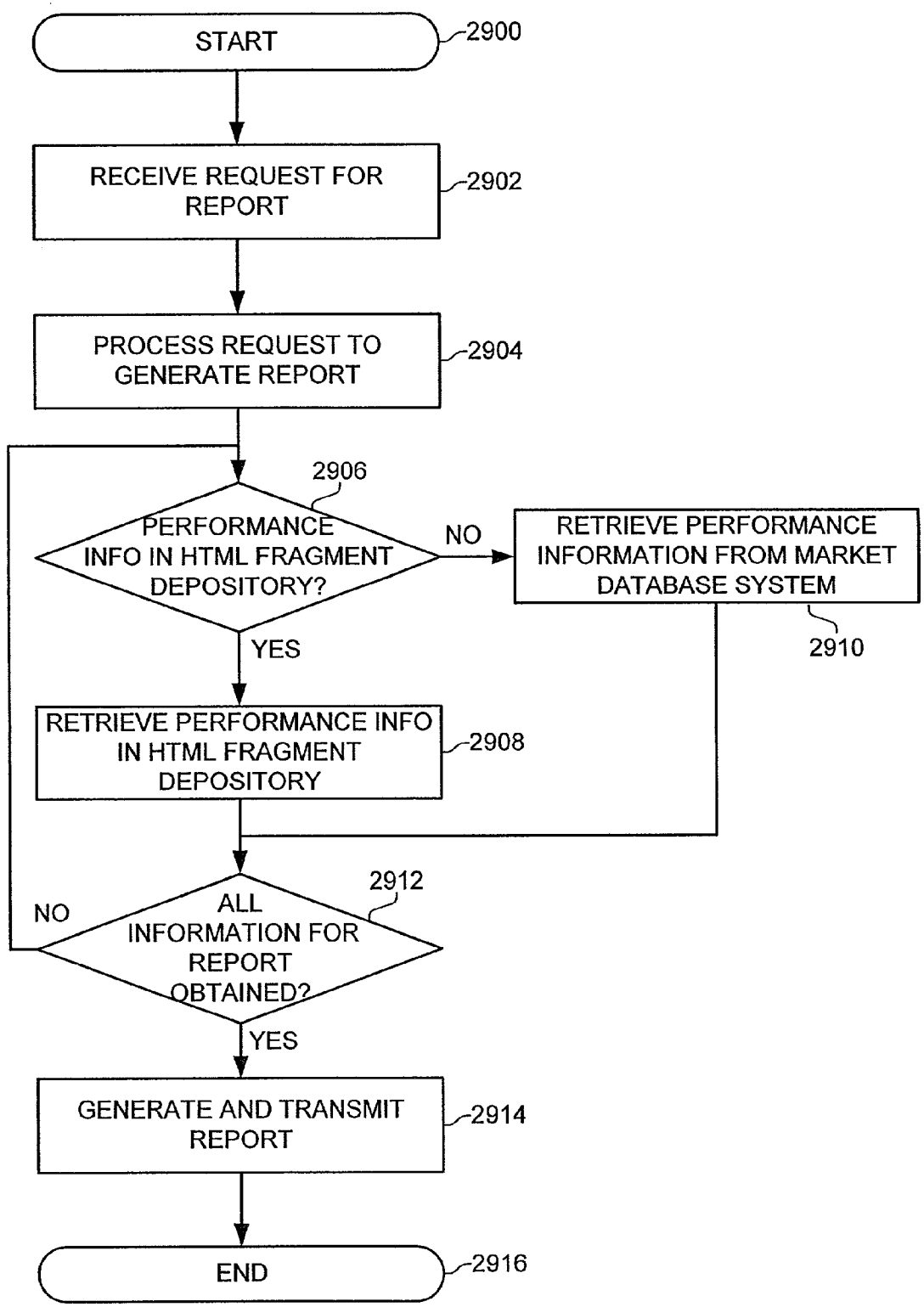
FIG. 29 is a flow chart of a market performance management system with an HTML fragment repository in an example of the invention.

FIG. 29 is a flow chart for a market performance management system 430 with an HTML fragment repository in an example of the invention. FIG. 29 begins in step 2900. In step 2902, the market performance management system 430 receives a request message for a report. The market performance management system 430 processes the request message to generate a report in step 2904. The market performance management system 430 then determines whether the performance information is in the HTML fragment depository in step 2906. If the performance information is in the HTML fragment depository, then the market performance management system 430 retrieves the performance information from the HTML fragment depository in step 2908. If the performance information is not in the HTML fragment depository, the market performance management system 430 retrieves the performance information from the market database system 435 in step 2910.

The market performance management system 430 then determines whether all the performance information has been obtained in step 2912. If all the performance information has not been obtained, then the market performance management system 430 returns to step 2906. If all the performance information has been obtained, then the market performance management system 430 generates and transmits a report based on the performance information in step 2914. FIG. 29 ends in step 2916.

Figure 30:
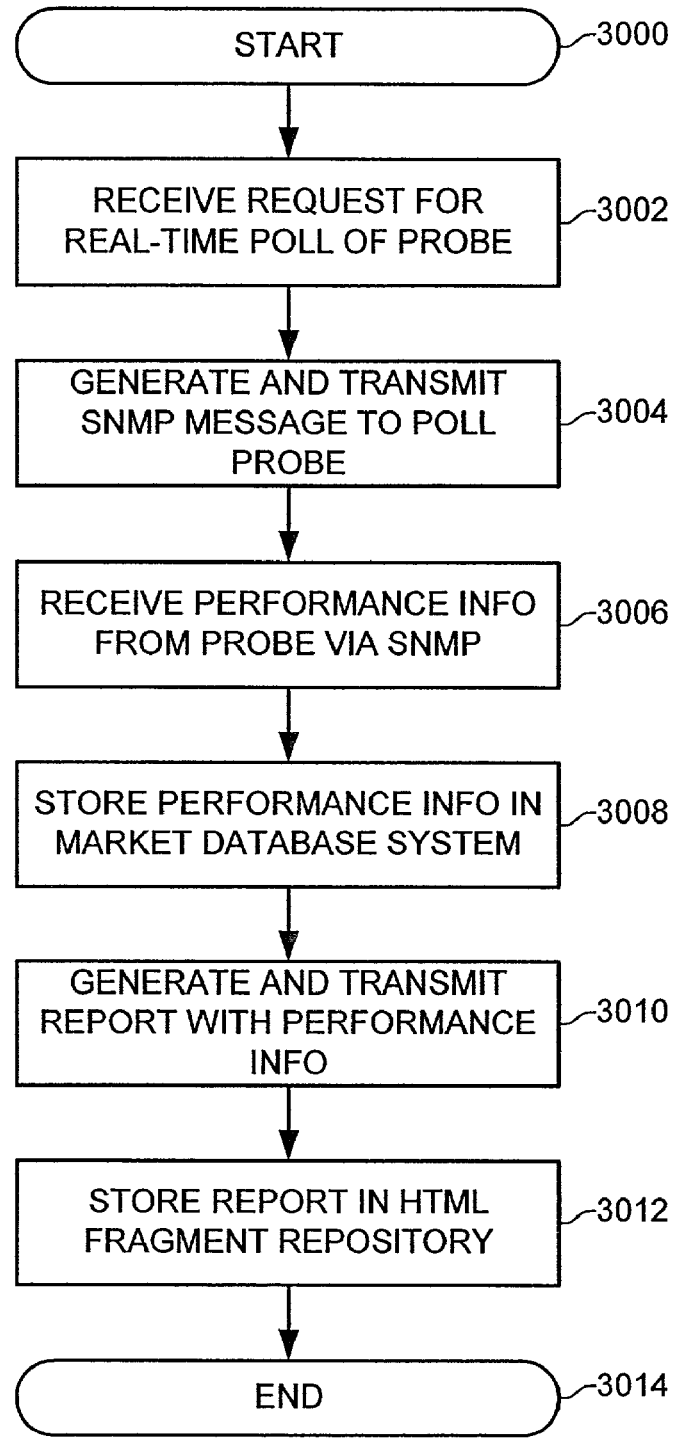
FIG. 30 is a flow chart of a market performance management system for real-time polling of a probe in an example of the invention.

FIG. 30 is a flow chart for a market performance management system 430 for real-time polling of a probe in an example of the invention. FIG. 30 begins in step 3000. In step 3002, the market performance management system 430 receives a request message for a real-time poll of a probe. In step 3004, the market performance management system 430 generates and transmits an SNMP message to poll a probe. In step 3006, the market performance management system 430 receives performance information from the probe via SNMP. In step 3008, the market performance management system 430 stores the performance information in the market database system 435. In step 3010, the market performance management system 430 generates and transmits a report with the performance information. The market performance management system 430 then stores the report in the HTML fragment repository in step 3012. FIG. 30 ends in step 3014.

Figure 31:
FIG. 31 is a national headquarter web page in an example of the invention.

FIG. 31 depicts a national headquarter web page in an example of the invention. The national performance management system 230 generates a national map, including active market sites, depicting the broadband wireless system 100 for access by a user. The user selects a market and the national performance management system 230 transfers control to the market performance management system 430 that the user selected. The market performance management system 430 then generates and transmits the market page 2710 as depicted in FIG. 32.

FIG. 32 depicts the market web page 2710 in an example of the invention. The market page 2710 also displays links to the CM status page 2720, the HSMP query page 2730, the hybrid probe page 2740, the NetScout statistics page 2750, the protocol statistics page 2760, the MRTG statistics page 2770, the sector probe page 2780, the key performance indicators page 2790, and the SIF statistics page 2795.

If the user selects the CM status page 2720, then the market performance management system 430 generates and transmits the CM status page 2720 as depicted in FIG. 33. FIG. 33 depicts a CM status web page 2720 in an example of the invention. The CM status page 2720 includes a field to change the date of a query for the graphs in FIG. 33. The top graph is a time vs. active modem percentage graph. The market performance management system 430 separately displays the different sectors in the market as lines and percentages of all active modems throughout a selected day. In this embodiment, the modems are the wireless broadband routers. The market performance management system 430 then displays the bottom graph of time vs. modem counts for a sector. The bottom graph illustrates the number of modems in polling, dedicated, and contention states for a specified time. Under the bottom graph, the CM status page 2720 includes links for the FEC summary page 2722, the FEC channel page 2724, the SNR page 2726, and the peak/load capacity page 2728. The second graph is repeated for every sector in the market but is not shown in FIG. 33 for simplicity.

Figure 34:
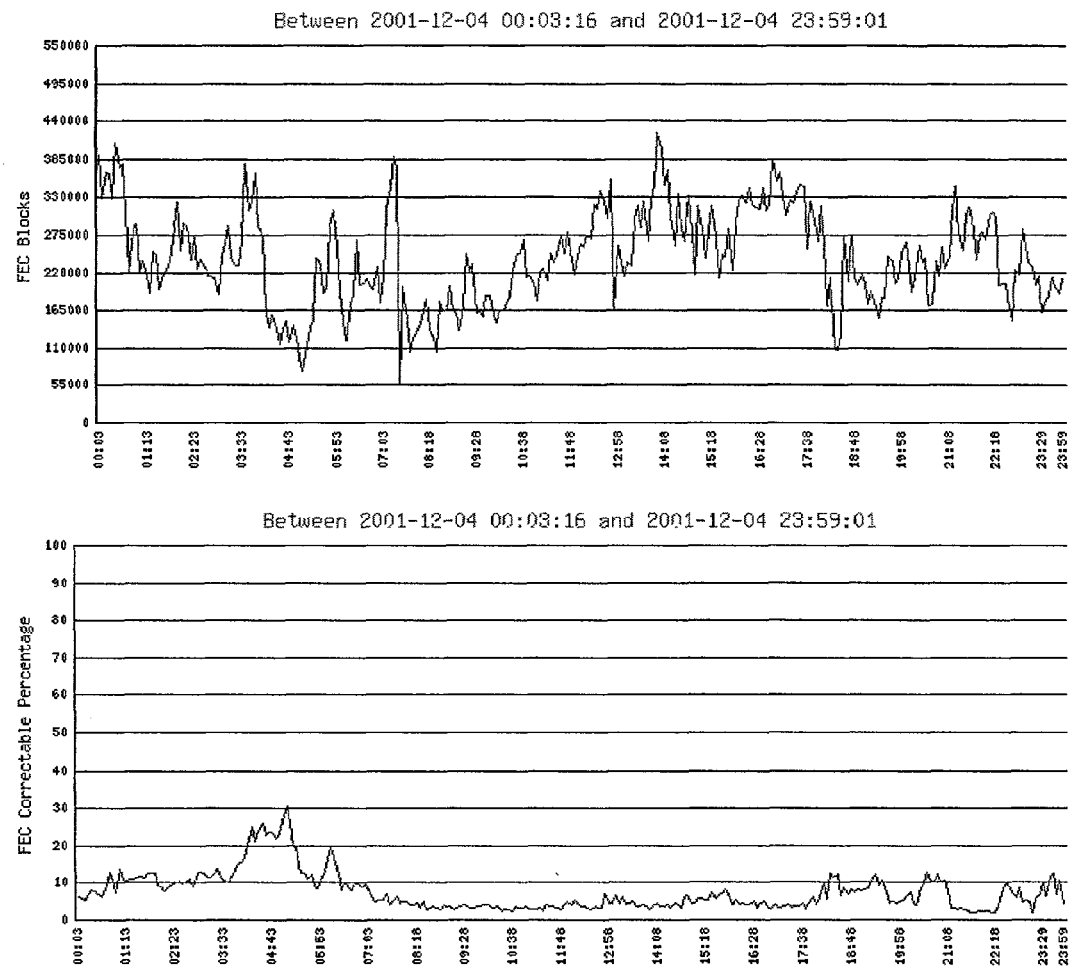
FIG. 34 is a forward error correction (FEC) summary web page in an example of the invention.

From the CM status page 2720, if the user selects the FEC summary page 2722 for the sector, then the market performance management system 430 generates and transmits the FEC summary page 2722 as depicted in FIG. 34. FIG. 34 depicts the FEC summary web page 2722 in an example of the invention. The top graph is a time vs. FEC blocks graph for a sector for a period of time. The FEC blocks are the number of FEC blocks that are detected by the demodulator. In this embodiment, the blocks represent 120 bytes. An upstream packet may be represented by one or more FEC blocks. The middle graph is a time vs. FEC correctable percentage graph for a sector for a period of time. In this embodiment with the Reed-Solomon code, up to 10 bytes can be corrected in a block. Thus, each FEC block may have 10 correctables. Having the FEC correctables greater than the FEC blocks is possible especially in the contention channel. The bottom graph is a time vs. FEC uncorrectable percentage graph for a sector for a period of time. The FEC uncorrectable errors are the number of FEC blocks that have uncorrectable errors. The demodulator realizes an FEC block is present contains to many errors to successfully recover the block.

From the CM status page 2720, if the user selects the FEC channel page 2724 for the sector and for a channel, then the market performance management system 430 generates and transmits the FEC channel page 2724 as depicted in FIG. 35. FIG. 35 depicts the FEC channel web page 2724 in an example of the invention. The top graph is a time vs. FEC blocks graph for a sector and a channel for a period of time. The second graph is a time vs. FEC correctable percentage for a sector and a channel for a period of time. The third graph is a time vs. FEC uncorrectable percentage for a sector and a channel for a period of time. The bottom graph is a time vs. SNR for a sector and a channel for a period of time.

Figure 36:
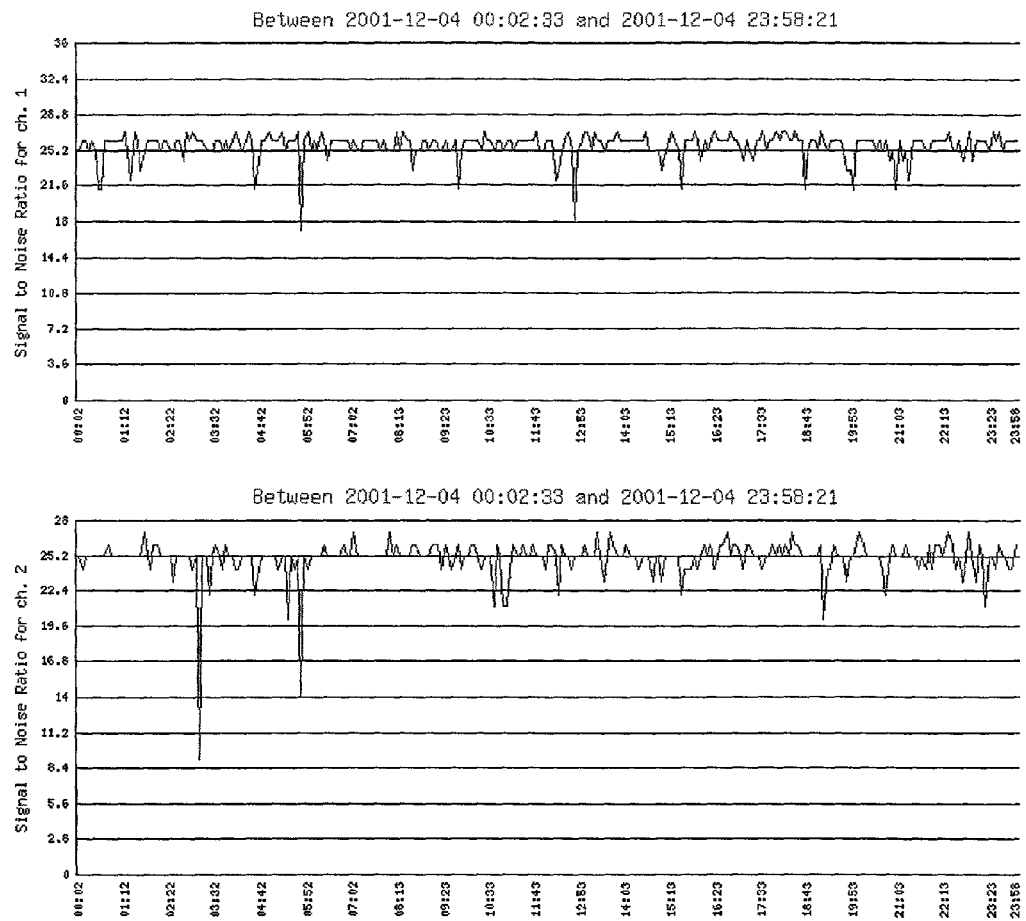
FIG. 36 is a signal to noise (SNR) summary web page in an example of the invention.

From the CM status page 2720, if the user selects the SNR summary page 2726 for the sector, then the market performance management system 430 generates and transmits the SNR summary page 2726 as depicted in FIG. 36. FIG. 36 depicts the SNR summary web page 2726 in an example of the invention. The graph is a time vs. SNR for a sector and a channel for a period of time. The remaining graphs for the other channels are not depicted for the sake of simplicity.

Figure 37:
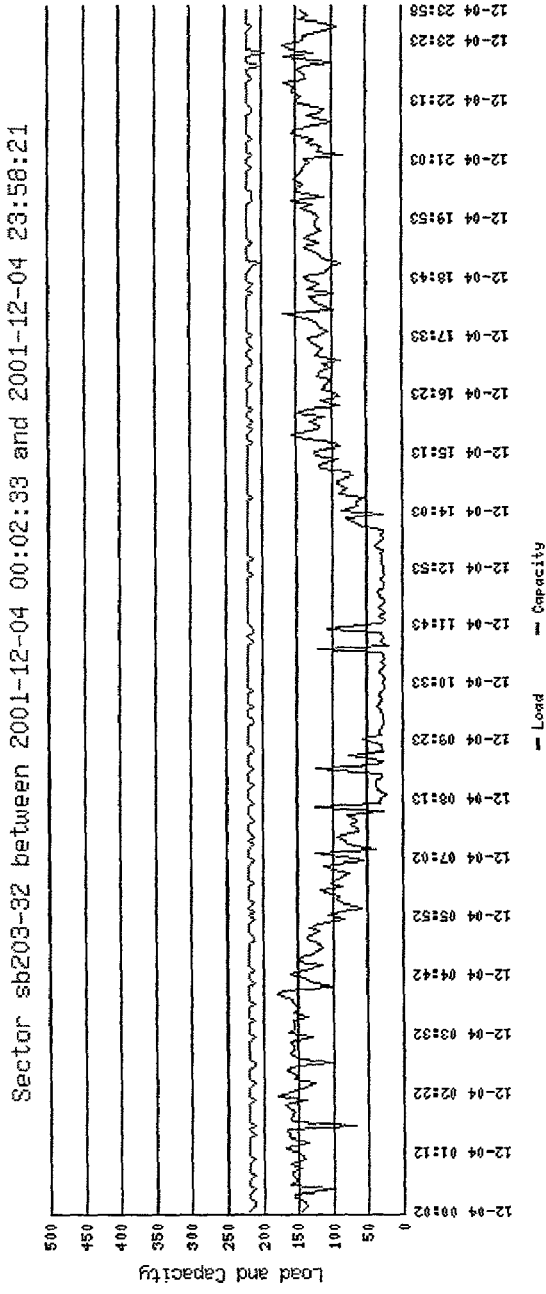
FIG. 37 is a peak/load capacity web page in an example of the invention.

From the CM status page 2720, if the user selects the peak/load capacity page 2728 for the sector, then the market performance management system 430 generates and transmits the peak/load capacity page 2728 as depicted in FIG. 37. FIG. 37 depicts the peak/load capacity web page 2728 in an example of the invention. The graph is a time vs. load graph for a sector for a period of time. The graph shows the load and capacity over time. If the number of dedicated channels exceeds 50% of the total number of channels, then the load is:

Load=(poll+ded+con)*1.1 where
poll=the number of polling modems;
ded=the number of dedicated modems; and
con=the number of contention modems.

If the number of dedicated channels is less than 50% of the total number of channels, then the load is:

$$\text{Load} = [(ded^*8) + poll]^* \left[1 + \frac{con}{poll + ded}\right]$$

The capacity is:

Capacity=(# channels−1)*8

From the market page 2710, if the user selects the HSMP query page 2730, then the market performance management system 430 generates and transmits the HSMP query page 2730 as depicted in FIG. 38. FIG. 38 depicts a HSMP query web page 2730 in an example of the invention. The HSMP query page 2730 allows users to enter IP addresses of any customer-owned equipment or the user ID of a customer's wireless broadband router to survey or troubleshoot any issues related to modem performance. The market performance management system 430 then retrieves the information from a customer database and establishes a secure session that is authenticated and encrypted with the broadcast equipment of the market. This facilitates communication between the user and the customer's wireless broadband router.

From the market page 2710, if the user selects the Hybrid probe page 2740, then the market performance management system 430 generates and transmits the Hybrid probe page 2740 as depicted in FIG. 39. FIG. 39 depicts the Hybrid probe web page 2740 in an example of the invention. The Hybrid probe is one example of the channel probe discussed earlier. The Hybrid probe page 2740 displays performance information from the Hybrid probe. Once the user enters the starting date and time and ending date and time, the market performance management system 430 generates the table in FIG. 39. The table displays performance information for individual IP addresses, totals of IP addresses, and averages of IP addresses. One row displays the IP address, the percentage of active modems that the IP address accounts for, the ratio to active modems, a timer for polling, a timer for dedicated, a number of transmitted bytes in polling, a ratio of transmitted bytes, a number of transmitted bytes for dedicated, a ratio of transmitted bytes, an index, and a ratio.

From the market page 2710, if the user selects the NetScout statistics page 2750, then the market performance management system 430 generates and transmits a NetScout statistics page 2750 with links for top talkers, bits per second (bps), and protocols. The NetScout statistics page 2750 provides performance information from the RMON probe 595. If the user selects the top talkers link with a specified date range, then the market performance management system 430 generates and transmits a top talkers page as depicted in FIG. 40. FIG. 40 depicts the top talker web page in an example of the invention. The top talker page includes the total number of users, total number of upstream bytes for all users, total number of downstream bytes for all users, average number of upstream bytes per user, and average number of downstream bytes per user.

The top talker page also includes a table by specific Cyber-Master ID (CMID) number. The table includes the upstream CMID, the upstream megabytes, the upstream percentage of total, upstream information, the downstream CMID, the downstream megabytes, the downstream percentage of total, and downstream information. The upstream and downstream information include links to detail information and customer information such as name, address, and phone number. The detail information is depicted in FIG. 41. FIG. 41 depicts the detail information of the top talker web page in an example of the invention. The detail information breaks down the CMID into table for protocol, IP address, and protocol/IP address. The tables include upstream bytes, upstream percentage of total, downstream bytes, and downstream percentage of total.

From the NetScout statistics page 2750, if the user selects the bps link, then the user may enter date ranges for statistics for market ID and/or sector. After the user enters the date range, the market performance management system 430 displays tables as depicted in FIG. 42. FIG. 42 depicts the bps web page for the NetScout statistics web page 2750 in an example of the invention. The top table shows the statistics by market ID. The table includes market ID, date, hour, number of subscribers, megabits per hour, average per subscriber, average megabits per second, and peak number of megabits per second. The lower table shows the statistics per sector. The lower table includes the sector ID, date, hour, active subscribers, megabits per hour, average per subscriber per second, and peak number of megabits per second.

From the NetScout statistics page 2750, if the user selects the protocol link, then the user may enter date ranges for protocol by IP address and protocol summary. FIG. 43 depicts protocol information for the NetScout statistics web page 2750 in an example of the invention. The top table shows a protocol breakdown for an IP address. The table includes the protocol, the number of downstream kilobytes, and the upstream kilobytes. The lower table shows a protocol summary for the market with the protocol name and the number of megabytes transferred.

From the market page 2710, if the user selects the MRTG page 2770, then the market performance management system 430 generates and transmits the MRTG page 2770 as depicted in FIG. 44. FIG. 44 depicts the MRTG web page 2770 in an example of the invention. The top graph is a time vs. a bytes per second graph for an Ethernet connection. The MRTG page 2770 displays various connections such as Ethernet, DS3, and serial connection in the broadband wireless system 100. Other connections are not shown in FIG. 44 for the sake of simplicity. If the user selects the connection link for more detail, then the market performance management system 430 displays the system, the maintainer, the description, the ifType, the ifName, the maximum speed, and the IP address. The lower graph is the daily graph of time vs. bytes per second for incoming and outgoing traffic. Other graphs, such as weekly, monthly, and yearly graphs, are not shown in FIG. 44 for the sake of simplicity. The lower graph also includes maximum traffic in/out, average traffic in/out, and current traffic in/out.

From the market page 2710, if the user selects the sector probe page 2780, then the market performance management system 430 generates and transmits the sector probe page 2780 as depicted in FIGS. 45 and 46. FIGS. 45 and FIG. 46 depict the sector probe web page 2780 in an example of the invention. In FIG. 45, the top two graphs show a time vs. transfer rate in bits per second for downstream and upstream data throughput. The lower graph in FIG. 45 shows a graph of time vs. transfer rate in bits per second for web site throughput in an example of the invention. In FIG. 46, the top graph shows a graph of time vs. delay in milliseconds for roundtrip latency from the wireless broadband router to the head-end for 1 ping. The middle graphs shows a graph of time vs. delay in milliseconds for roundtrip latency for a 10 ping average. The lower graph shows a graph of time vs. SNR.

From the market page 2710, if the user selects the key performance indicator page 2790 by sector or market with a date range, then the market performance management system 430 generates and transmits the key performance indicator page 2790 as depicted in FIGS. 47*a* and 47*b*. FIG. 47*a* depicts the key performance indicator web page 2790 in an example of the invention. One example of peak time is 6:00 pm to midnight where, non-peak time is midnight to 6:00 pm. For peak time and non-peak time, the key performance indicator page 2790 displays the peak active modems, the sampled modems, activity ratio, contention modem counts, polling modem counts, and dedicated modem counts. For individual peak time, the key performance indicator page 2790 displays the contention modem count, the polling modem count, and the dedicated modem count. The key performance indicator page 2790 also displays the average time per user spent in contention, polling, and dedicated states.

FIG. 47*b* depicts the key performance indicator web page 2790 in an example of the invention. The key performance indicator page 2790 also displays the FTP rate for peak and off-peak, the peak FTP rate for upstream and downstream, and the average FTP rate for peak and off-peak downstream and upstream. The key performance indicator page 2790 also displays the average HTTP rate of peak and off-peak, the FEC corrections, the FEC uncorrectables, available channels, signal to noise ratio, and requested to scheduled modem calibration ratio. The key performance indicator page 2790 includes the maximum, minimum, and average for functioning and non-functioning channels. The key performance indicator page 2790 includes the downstream to upstream bit ratio for different time intervals.

Figure 48:
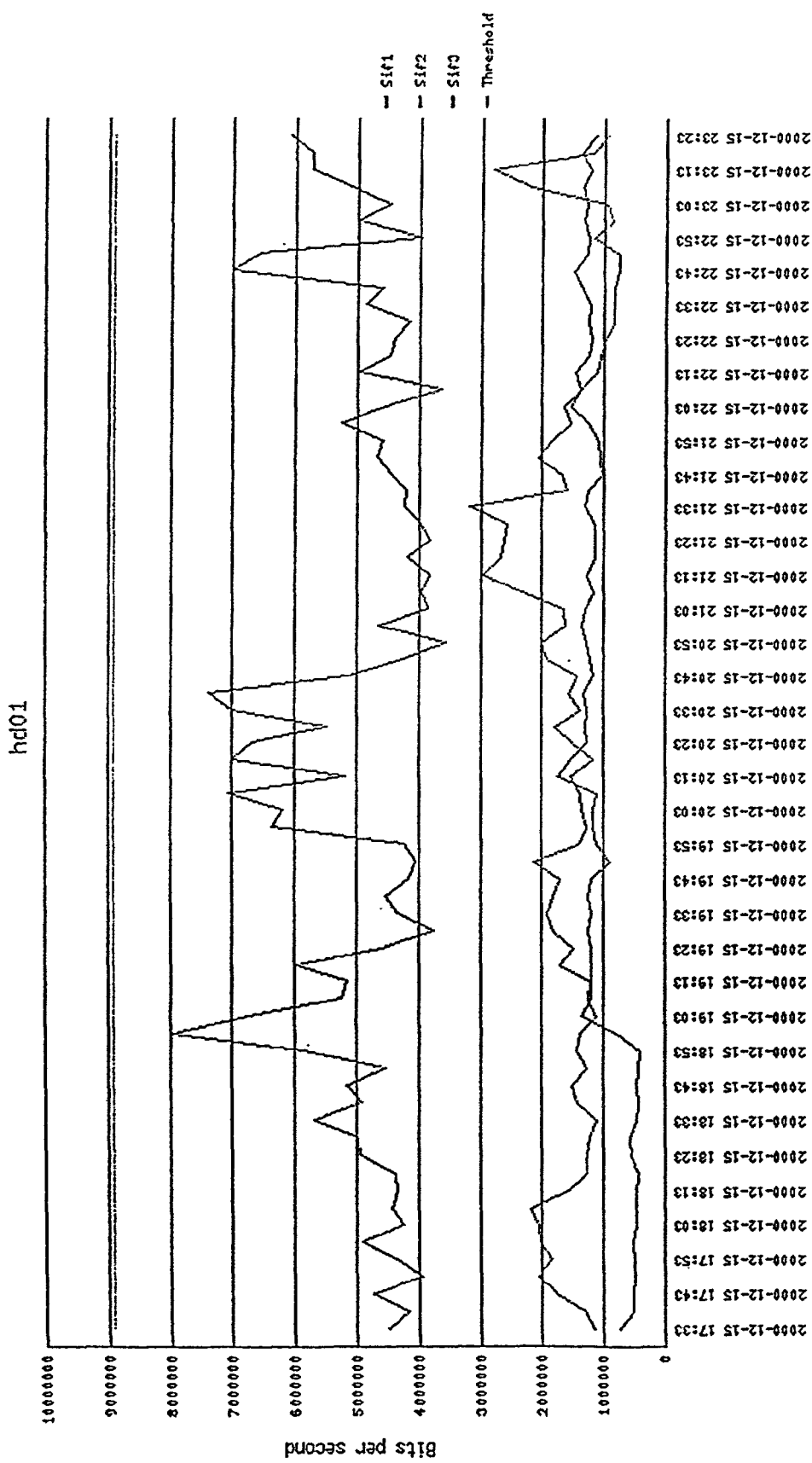
FIG. 48 depicts a SIF web page in an example of the invention.

From the market page 2710, if the user selects the SIF statistics page 2795, then the user may select between the last 6 hours, the last 24 hours, a week, or a custom graph. If the user selects a time period, then the market performance management system 430 generates and transmits the SIF statistics page 2790 as depicted in FIG. 48. FIG. 48 depicts the SIF statistics page 2795 in an example of the invention. The graph in FIG. 48 is a graph of time vs. bits per second for 3 different SIF with a threshold.

Those skilled in the art will appreciate variations of the above-described embodiments that fall within the scope of the invention. As a result, the invention is not limited to the specific examples and illustrations discussed above, but only by the following claims and their equivalents.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

We claim:

1. A method of operating a probe device for testing a broadband wireless system, the method comprising:
   receiving an instruction into the probe device through a wireless broadband router coupled with the broadband wireless system to execute a plurality of tests, wherein the probe device and the wireless broadband router are located on a customer premises;
   executing the plurality of tests to measure performance of the broadband wireless system based on the instruction;
   determining performance information from the plurality of tests; and
   storing the performance information in a memory of the probe device.

2. The method of claim 1 wherein one of the plurality of tests comprises a web surfing test.

3. The method of claim 2 wherein the web surfing test comprises:
   transferring a request for a web page; and
   receiving the web page.

4. The method of claim 1 wherein one of the plurality of tests comprises a bulk file transfer test.

5. The method of claim 4 wherein the bulk file transfer test comprises:
   generating and transmitting a request to retrieve files from a file server; and
   receiving the files from the file server.

6. The method of claim 4 wherein the bulk file transfer test comprises transmitting files to a file server.

7. The method of claim 1 wherein one of the plurality of tests comprises a ping test to measure delay.

8. The method of claim 1 wherein one of the plurality of tests comprises a raw channel capacity test.

9. The method of claim 8 wherein the raw channel capacity test comprises a bit-error-rate test.

10. The method of claim 1 wherein one of the plurality of tests comprises a forward error correction test.

11. The method of claim 1 wherein one of the plurality of tests comprises an out of lock indicator test.

12. The method of claim 11 wherein the out of lock indicator test comprises determining a presence of a clean Quadrature Amplitude Modulation signal.

13. The method of claim 1 further comprising:
    transmitting the performance information from the probe device.

14. The method of claim 1 further comprising:
    retrieving the performance information from the memory.

15. The method of claim 1 wherein the performance information comprises delay.

16. The method of claim 1 wherein the performance information comprises download speed.

17. The method of claim 1 wherein the performance information comprises a number of dropped packets.

18. The method of claim 1 wherein the performance information comprises a number of acknowledgement packets.

19. A software product, stored on a computer hardware, for operating a probe device for testing a broadband wireless system, the software product comprising:
    probe device software operational when executed by a processor to direct the processor to receive an instruction into the probe device through a wireless broadband router coupled with the broadband wireless system to execute a plurality of tests, execute the plurality of tests to measure performance of the broadband wireless system based on the instruction, determine performance information from the plurality of tests, and store the performance information in a memory of the probe device, wherein the probe device and the wireless broadband router are located on a customer premises; and
    a software storage medium operational to store the probe device software.

20. The software product of claim 19 wherein one of the plurality of tests comprises a web surfing test.

21. The software product of claim 20 wherein the probe device software is operational when executed by the processor to direct the processor to transfer a request for a web page and receive the web page.

22. The software product of claim 19 wherein one of the plurality of tests comprises a bulk file transfer test.

23. The software product of claim 22 wherein the probe device software is operational when executed by the processor to direct the processor to generate and transmit a request to retrieve files from a file server and receive the files from the file server.

24. The software product of claim 22 wherein the probe device software is operational when executed by the processor to direct the processor to transmit files to a file server.

25. The software product of claim 19 wherein one of the plurality of tests comprises a ping test to measure delay.

26. The software product of claim 19 wherein one of the plurality of tests comprises a raw channel capacity test.

27. The software product of claim 26 wherein the raw channel capacity test comprises a bit-error-rate test.

28. The software product of claim 19 wherein one of the plurality of tests comprises a forward error correction test.

29. The software product of claim 19 wherein one of the plurality of tests comprises an out of lock indicator test.

30. The software product of claim 29 wherein the probe device software is operational when executed by the processor to direct the processor to determine a presence of a clean Quadrature Amplitude Modulation signal.

31. The software product of claim 19 wherein the probe device software is operational when executed by the processor to direct the processor to transmit the performance information from the probe device.

32. The software product of claim 19 wherein the probe device software is operational when executed by the processor to direct the processor to retrieve the performance information from the memory.

33. The software product of claim 19 wherein the performance information comprises delay.

34. The software product of claim 19 wherein the performance information comprises download speed.

35. The software product of claim 19 wherein the performance information comprises a number of dropped packets.

36. The software product of claim 19 wherein the performance information comprises a number of acknowledgement packets.

37. A probe device for testing a broadband wireless system, the probe device comprising:
    an interface configured to transfer an instruction into the probe device through a wireless broadband router coupled with the broadband wireless system to execute a plurality of tests; and
    a processor connected to the interface and configured to receive the instruction, execute the plurality of tests to measure performance of the broadband wireless system based on the instruction, determine performance information from the plurality of tests, and store the performance information in a memory of the probe device;

wherein the probe device and the wireless broadband router are located on a customer premises.

38. The probe device of claim 37 wherein one of the plurality of tests comprises a web surfing test.

39. The probe device of claim 38 wherein:
the interface is configured to transfer a request for a web page from the processor and transfer the web page to the processor; and
the processor is configured to transfer the request for the web page and receive the web page.

40. The probe device of claim 37 wherein one of the plurality of tests comprises a bulk file transfer test.

41. The probe device of claim 40 wherein:
the processor is configured to generate and transmit a request to retrieve files from a file server and receive the files from the interface; and
the interface is configured to transfer the request from the processor to the file server and transfer the files from the file server to the processor.

42. The probe device of claim 41 wherein:
the processor is configured to transmit the files to the interface; and
the interface is configured to transfer the files from the processor to the file server.

43. The probe device of claim 37 wherein one of the plurality of tests comprises a ping test to measure delay.

44. The probe device of claim 37 wherein one of the plurality of tests comprises a raw channel capacity test.

45. The probe device of claim 44 wherein the raw channel capacity test comprises a bit-error-rate test.

46. The probe device of claim 37 wherein one of the plurality of tests comprises a forward error correction test.

47. The probe device of claim 37 wherein one of the plurality of tests comprises an out of lock indicator test.

48. The probe device of claim 47 wherein the processor is configured to determine a presence of a clean Quadrature Amplitude Modulation signal.

49. The probe device of claim 37 wherein:
the processor is configured to transmit the performance information; and
the interface is configured to transfer the performance information from the processor to the probe device.

50. The probe device of claim 37 wherein the processor is configured to retrieve the performance information from the memory.

51. The probe device of claim 37 wherein the performance information comprises delay.

52. The probe device of claim 37 wherein the performance information comprises download speed.

53. The probe device of claim 37 wherein the performance information comprises a number of dropped packets.

54. The probe device of claim 37 wherein the performance information comprises a number of acknowledgement packets.

* * * * *